(12) United States Patent
Pan

(10) Patent No.: US 12,225,553 B2
(45) Date of Patent: Feb. 11, 2025

(54) METHOD AND APPARATUS FOR SUPPORTING UNICAST LINK ESTABLISHMENT FOR SIDELINK POSITIONING IN A WIRELESS COMMUNICATION SYSTEM

(71) Applicant: ASUS Technology Licensing Inc., Taipei (TW)

(72) Inventor: Li-Te Pan, Taipei (TW)

(73) Assignee: ASUS Technology Licensing Inc., Taipei (TW)

( * ) Notice: Subject to any disclaimer, the term of this patent is extended or adjusted under 35 U.S.C. 154(b) by 0 days.

(21) Appl. No.: 18/242,866

(22) Filed: Sep. 6, 2023

(65) Prior Publication Data

US 2024/0121803 A1    Apr. 11, 2024

Related U.S. Application Data

(60) Provisional application No. 63/413,148, filed on Oct. 4, 2022, provisional application No. 63/413,160, filed on Oct. 4, 2022.

(51) Int. Cl.
| | |
|---|---|
| H04W 72/25 | (2023.01) |
| H04W 64/00 | (2009.01) |
| H04W 76/14 | (2018.01) |

(52) U.S. Cl.
CPC ........... *H04W 72/25* (2023.01); *H04W 64/00* (2013.01); *H04W 76/14* (2018.02)

(58) Field of Classification Search
None
See application file for complete search history.

(56) References Cited

U.S. PATENT DOCUMENTS

| | | | |
|---|---|---|---|
| 11,805,552 B2* | 10/2023 | Choi | H04W 74/0816 |
| 2022/0183030 A1* | 6/2022 | Lee | H04L 5/0053 |
| 2022/0229146 A1* | 7/2022 | Ko | G01S 5/02216 |
| 2022/0381873 A1* | 12/2022 | Vassilovski | H04W 76/14 |
| 2023/0047361 A1* | 2/2023 | Bao | H04W 60/04 |
| 2023/0232363 A1* | 7/2023 | Nam | H04W 4/02 |
| | | | 455/456.1 |
| 2023/0362641 A1* | 11/2023 | Edge | H04W 12/63 |

* cited by examiner

*Primary Examiner* — Nguyen H Ngo
(74) *Attorney, Agent, or Firm* — Skaar Ulbrich Macari, P.A.

(57) ABSTRACT

A method and device for a first User Equipment (UE) are disclosed. In one embodiment, the first UE initiates a procedure for establishing a PC5 connection with a second UE. Furthermore, the first UE sends a first PC5 message to the second UE for request of establishment of the PC5 connection in the procedure, wherein the first PC5 message includes a first Sidelink (SL) positioning or ranging related information.

18 Claims, 40 Drawing Sheets

| IEI | Information Element | Type/Reference | Presence | Format | Length |
|---|---|---|---|---|---|
| | PROSE DIRECT LINK ESTABLISHMENT REQUEST message identity | ProSe PC5 signalling message type 11.3.1 | M | V | 1 |
| | Sequence number | Sequence number 11.3.2 | M | V | 1 |
| | Source user info | Application layer ID 11.3.4 | M | LV | 2-256 |
| | UE security capabilities | UE security capabilities 11.3.11 | M | LV | 3-9 |
| | UE PC5 unicast signalling security policy | UE PC5 unicast signalling security policy 11.3.12 | M | V | 1 |
| 4F | MIC | MIC 11.3.y | O | TV | 5 |
| 7B | ProSe identifiers | ProSe identifier 11.3.3 | O | TLV-E | 21-65538 |
| 74 | Key establishment information container | Key establishment information container 11.3.9 | O | TLV-E | 4-65538 |
| 56 | Nonce_1 | Nonce 11.3.10 | O | TV | 17 |
| 5C | MSB of $K_{NRP\text{-}sess}$ ID | MSB of $K_{NRP\text{-}sess}$ ID 11.3.13 | O | TV | 2 |
| 28 | Target user info | Application layer ID 11.3.4 | O | TLV | 3-257 |
| 58 | $K_{NRP}$ ID | $K_{NRP}$ ID 11.3.14 | O | TV | 5 |
| 54 | Relay service code | Relay service code 11.3.26 | O | TV | 4 |
| 7D | UE identity | 5GS mobile identity 11.3.30 | O | TLV-E | 4-n |
| 64 | User security key ID | User security key ID 11.3.32 | O | TLV | 3-n |
| 2A | HPLMN ID | PLMN ID 11.3.33 | O | TLV | 5 |
| 2B | UTC-based counter LSB | UTC-based counter LSB 11.2.14 | O | TV | 2 |

FIG. 9 (PRIOR ART)

| IEI | Information Element | Type/Reference | Presence | Format | Length |
|---|---|---|---|---|---|
| | PROSE DIRECT LINK ESTABLISHMENT ACCEPT message identity | ProSe PC5 signalling message type 11.3.1 | M | V | 1 |
| | Sequence number | Sequence number 11.3.2 | M | V | 1 |
| | Source user info | Application layer ID 11.3.4 | M | LV | 2-256 |
| | Configuration of UE PC5 unicast user plane security protection | Configuration of UE PC5 unicast user plane security protection 11.3.23 | M | V | 1 |
| 79 | QoS flow descriptions | PC5 QoS flow descriptions 11.3.5 | O | TLV-E | 6-65538 |
| 7C | QoS rules | PC5 QoS rules 11.3.29 | O | TLV-E | 7-65538 |
| 62 | IP address configuration | IP address configuration 11.3.6 | O | TV | 2 |
| 61 | Target link local IPv6 address | Link local IPv6 address 11.3.7 | O | TV | 17 |

FIG. 10 (PRIOR ART)

| IEI | Information Element | Type/Reference | Presence | Format | Length |
|---|---|---|---|---|---|
| | PROSE DIRECT LINK SECURITY MODE COMMAND message identity | ProSe PC5 signalling message type 11.3.1. | M | V | 1 |
| | Sequence number | Sequence number 11.3.2 | M | V | 1 |
| | Selected security algorithms | Selected security algorithms 11.3.22 | M | V | 1 |
| | UE security capabilities | UE security capabilities 11.3.11 | M | LV | 3-9 |
| 59 | UE PC5 unicast signalling security policy | UE PC5 unicast signalling security policy 11.3.12 | O | TV | 2 |
| 57 | Nonce_2 | Nonce 11.3.10 | O | TV | 17 |
| 5D | LSB of $K_{NRP\text{-}sess}$ ID | LSB of $K_{NRP\text{-}sess}$ ID 11.3.15 | O | TV | 2 |
| 74 | Key establishment information container | Key establishment information container 11.3.9 | O | TLV-E | 4-65538 |
| 5A | MSBs of $K_{NRP}$ ID | MSBs of $K_{NRP}$ ID 11.3.16 | O | TV | 3 |
| 7A | GPI | GPI 11.3.35 | O | TLV-E | n-65538 |
| ZY | EAP message | EAP message 11.3.31 | O | TLV-E | 7-1503 |

FIG. 11 (PRIOR ART)

| IEI | Information Element | Type/Reference | Presence | Format | Length |
|---|---|---|---|---|---|
| | PROSE DIRECT LINK SECURITY MODE COMPLETE message identity | ProSe PC5 signalling message type 11.3.1. | M | V | 1 |
| | Sequence number | Sequence number 11.3.2 | M | V | 1 |
| | UE PC5 unicast user plane security policy | UE PC5 unicast user plane security policy 11.3.23 | M | V | 1 |
| 79 | QoS flow descriptions | PC5 QoS flow descriptions 11.3.5 | O | TLV-E | 6-65538 |
| 62 | IP address configuration | IP address configuration 11.3.6 | O | TV | 2 |
| 61 | Target link local IPv6 address | Link local IPv6 address 11.3.7 | O | TV | 17 |
| 5B | LSBs of $K_{NRP}$ ID | LSBs of $K_{NRP}$ ID 11.3.17 | O | TV | 3 |
| 7C | QoS rules | PC5 QoS rules 11.3.29 | O | TLV-E | 7-65538 |

FIG. 12

|  | Capability interaction | Measurement report | Assistance data interaction (exclude SL-PRS configuration) | SL-PRS configuration |
|---|---|---|---|---|
| Broadcast | ✓ | × | ✓ | ✓ |
| groupcast | ✓ | × | ✓ | ✓ |
| unicast | ✓ | ✓ | ✓ | ✓ |

FIG. 38 (PRIOR ART)

METHOD AND APPARATUS FOR SUPPORTING UNICAST LINK ESTABLISHMENT FOR SIDELINK POSITIONING IN A WIRELESS COMMUNICATION SYSTEM

CROSS-REFERENCE TO RELATED APPLICATIONS

The present Application claims the benefit of U.S. Provisional Patent Application Ser. Nos. 63/413,148 and 63/413,160 filed on Oct. 4, 2022, the entire disclosures of which are incorporated herein in their entirety by reference.

FIELD

This disclosure generally relates to wireless communication networks, and more particularly, to a method and apparatus for supporting unicast link establishment for sidelink positioning in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device for a first User Equipment (UE) are disclosed. In one embodiment, the first UE initiates a procedure for establishing a PC5 connection with a second UE. Furthermore, the first UE sends a first PC5 message to the second UE for request of establishment of the PC5 connection in the procedure, wherein the first PC5 message includes a first Sidelink (SL) positioning or ranging related information.

BRIEF DESCRIPTION OF THE DRAWINGS

FIG. 9 is a reproduction of Table 10.3.1.1.1 of 3GPP TS 24.554 V17.2.1.

FIG. 10 is a reproduction of Table 10.3.2.1.1 of 3GPP TS 24.554 V17.2.1.

FIG. 11 is a reproduction of Table 10.3.13.1.1 of 3GPP TS 24.554 V17.2.1.

FIG. 12 is a reproduction of Table 10.3.14.1.1 of 3GPP TS 24.554 V17.2.1.

FIG. 38 is a reproduction of Table 1 of 3GPP R2-2207586.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: TS 23.304 V17.3.0, "Proximity based Services (ProSe) in the 5G System (5GS) (Release 17)"; TS 24.554 V17.2.1, "Proximity-services (ProSe) in 5G System (5GS) protocol aspects; Stage 3 (Release 17)"; TS 38.331 V17.1.0, "NR; Radio Resource Control (RRC) protocol specification (Release 17)"; TS 37.355 V17.1.0, "LTE Positioning Protocol (LPP) (Release 17)"; TS 38.305 V17.1.0, "Stage 2 functional specification of User Equipment (UE) positioning in NG-RAN (Release 17)"; TR 23.700-86 V1.0.0, "Study on Architecture Enhancement to support Ranging based services and sidelink positioning (Release 18)"; 3GPP email discussion [Post119-e][406][POS] Sidelink positioning protocol issues (Intel), "draftReport_[Post119-e][406][POS] Sidelink positioning protocol issues (Intel)_v0.docx"; and R2-2207586, ZTE, Sanechips, "Discussion on sidelink positioning". The standards and documents listed above are hereby expressly incorporated by reference in their entirety.

Figure 1:
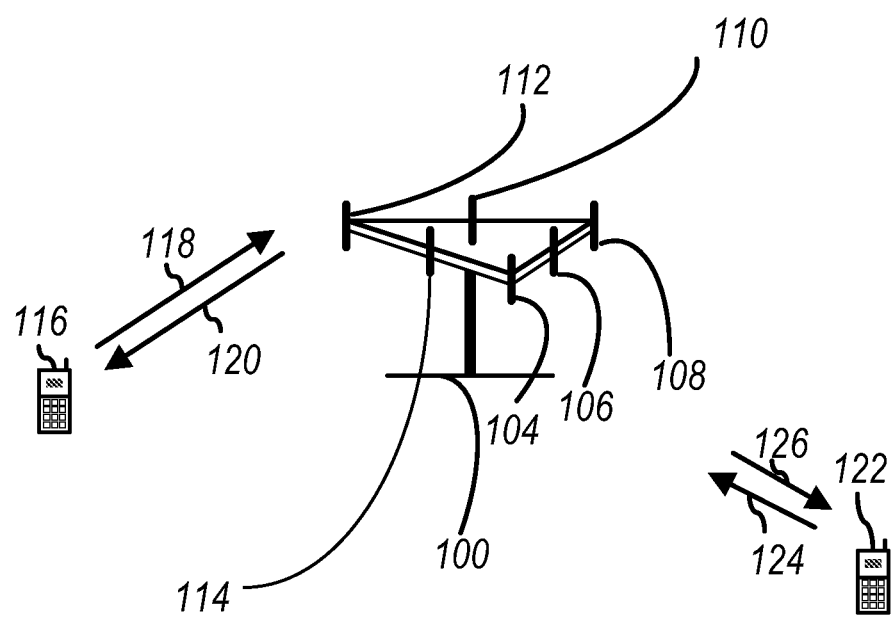
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
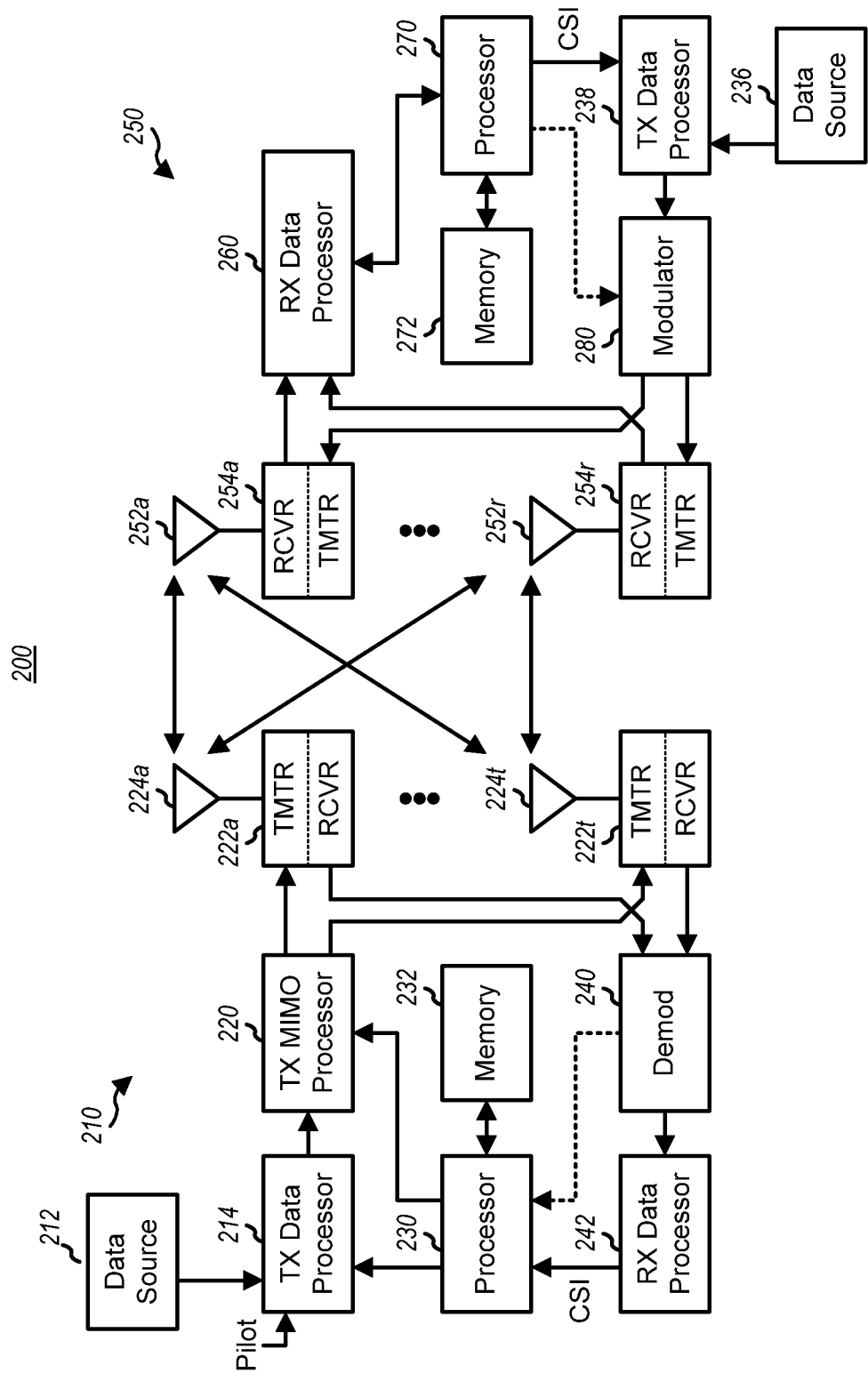
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
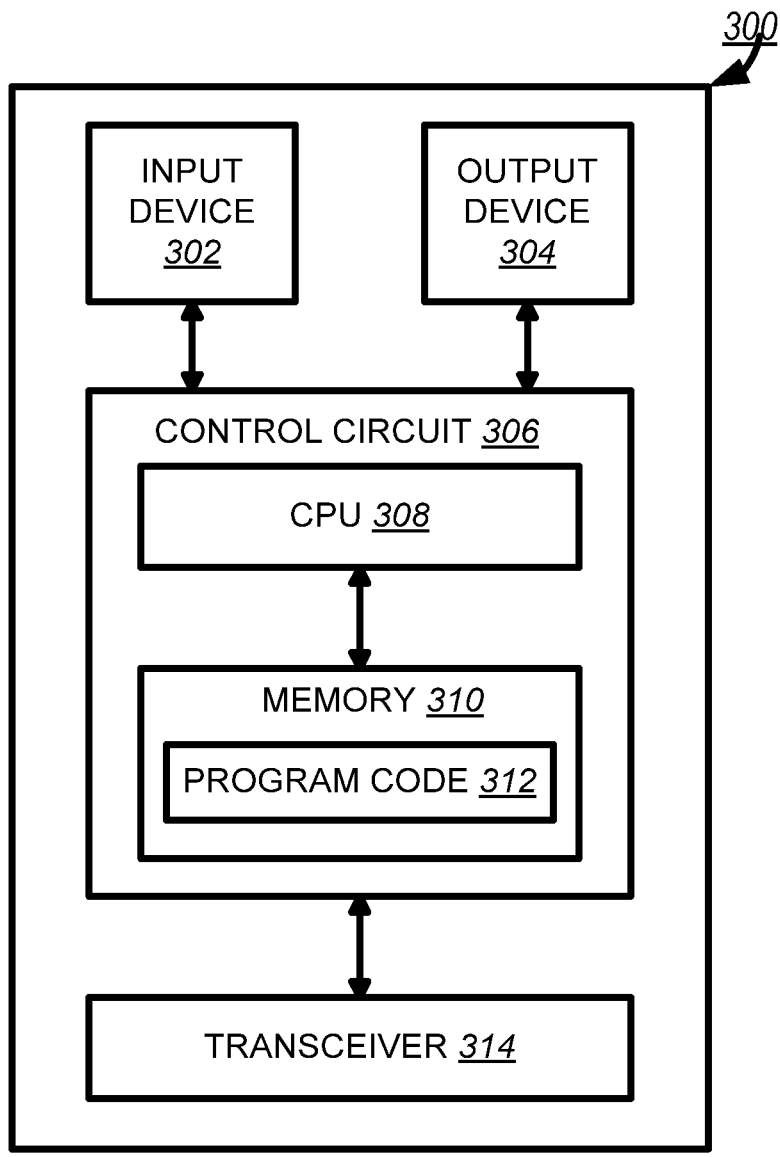
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
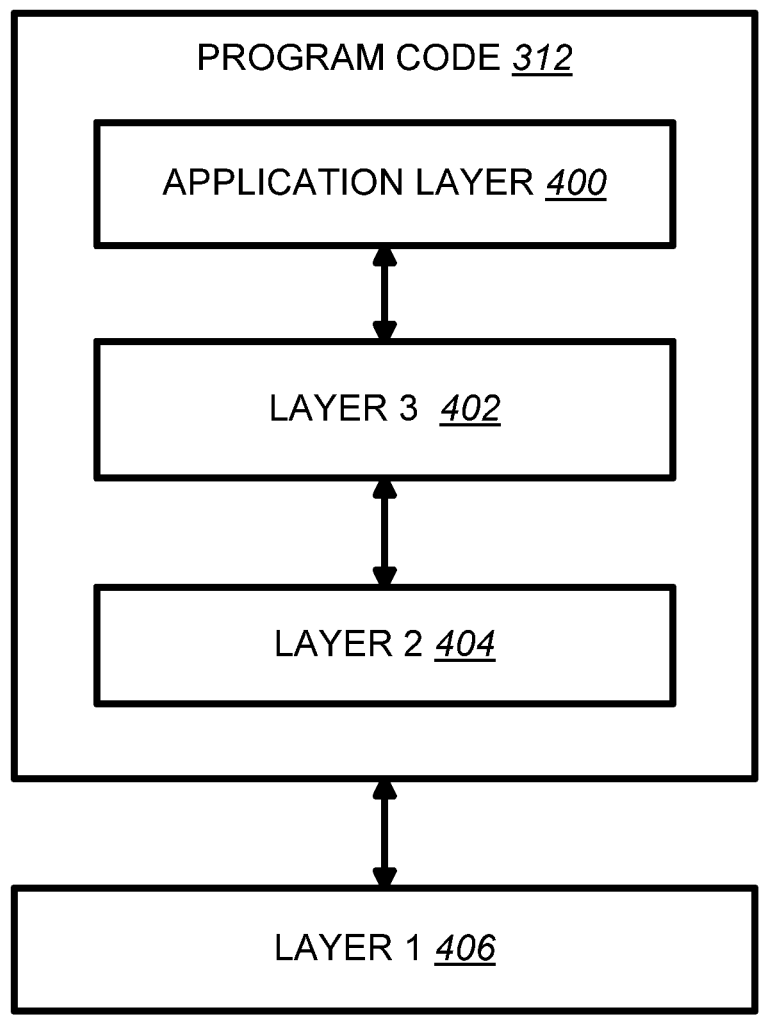
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 23.304 introduced the following:

6.4.3 Unicast Mode 5G ProSe Direct Communication 6.4.3.1 Layer-2 Link Establishment Over PC5 Reference Point To perform unicast mode of ProSe Direct communication over PC5 reference point, the UE is configured with the related information as described in clause 5.1.3.

Figure 6:
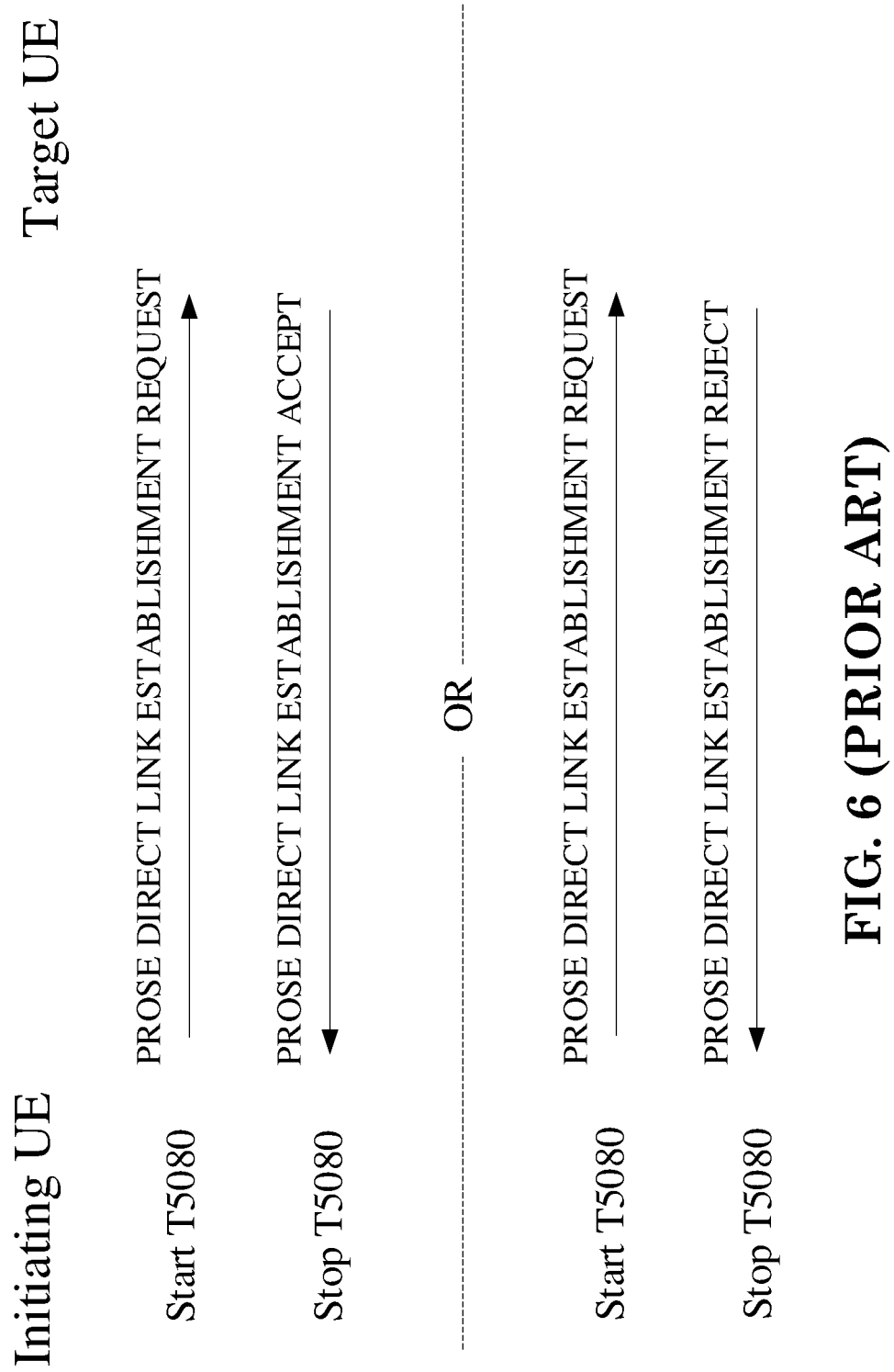
FIG. 6 is a reproduction of Figure 7.2.2.2.1 of 3GPP TS 24.554 V17.2.1.

Figure 6.4.3.1-1 shows the layer-2 link establishment procedure for the unicast mode of ProSe Direct communication over PC5 reference point.

Figure 5:
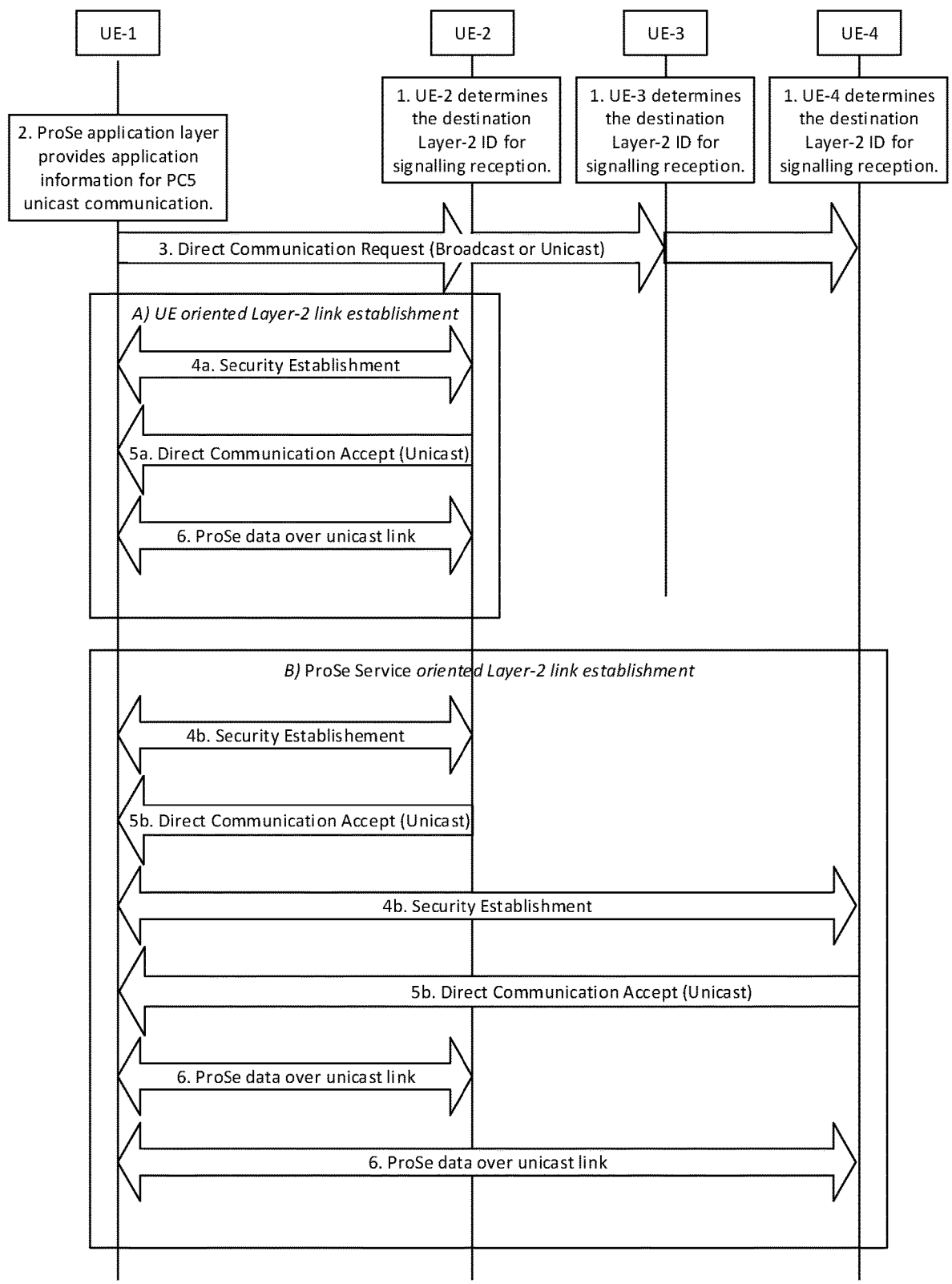
FIG. 5 is a reproduction of Figure 6.4.3.1-1 of 3GPP TS 23.304 V17.3.0.

[Figure 6.4.3.1-1 of 3GPP TS 23.304 V17.3.0, entitled "Layer-2 link establishment procedure", is reproduced as FIG. 5]

1. The UE(s) determine the destination Layer-2 ID for signalling reception for PC5 unicast link establishment as specified in clause 5.8.2.4.

2. The ProSe application layer in UE-1 provides application information for PC5 unicast communication. The application information includes the ProSe Service Info, UE's Application Layer ID. The target UE's Application Layer ID may be included in the application information.

The ProSe application layer in UE-1 may provide ProSe Application Requirements for this unicast communication. UE-1 determines the PC5 QoS parameters and PFI as specified in clause 5.6.1.

If UE-1 decides to reuse the existing PC5 unicast link as specified in clause 5.3.4, the UE triggers the Layer-2 link modification procedure as specified in clause 6.4.3.4.

3. UE-1 sends a Direct Communication Request message to initiate the unicast layer-2 link establishment procedure. The Direct Communication Request message includes:

Source User Info: the initiating UE's Application Layer ID (i.e. UE-1's Application Layer ID).

If the ProSe application layer provided the target UE's Application Layer ID in step 2, the following information is included:

Target User Info: the target UE's Application Layer ID (i.e. UE-2's Application Layer ID).

ProSe Service Info: the information about the ProSe identifier(s) requesting Layer-2 link establishment.

Security Information: the information for the establishment of security.

NOTE 1: The Security Information and the necessary protection of the Source User Info and Target User Info are defined by SA WG3.

The source Layer-2 ID and destination Layer-2 ID used to send the Direct Communication Request message are determined as specified in clauses 5.8.2.1 and 5.8.2.4. The destination Layer-2 ID may be broadcast or unicast Layer-2 ID. When unicast Layer-2 ID is used, the Target User Info shall be included in the Direct Communication Request message.

UE-1 sends the Direct Communication Request message via PC5 broadcast or unicast using the source Layer-2 ID and the destination Layer-2 ID.

A default PC5 DRX configuration may be used for transmitting and receiving of this message.

4. Security with UE-1 is established as below:

4a. If the Target User Info is included in the Direct Communication Request message, the target UE, i.e. UE-2, responds by establishing the security with UE-1.

4b. If the Target User Info is not included in the Direct Communication Request message, the UEs that are interested in using the announced ProSe Service(s) over a PC5 unicast link with UE-1 responds by establishing the security with UE-1.

NOTE 2: The signalling for the Security Procedure is defined by SA WG3.

When the security protection is enabled, UE-1 sends the following information to the target UE:

If IP communication is used:

IP Address Configuration: For IP communication, IP address configuration is required for this link and indicates one of the following values:

"DHCPv4 server" if only IPv4 address allocation mechanism is supported by the initiating UE, i.e., acting as a DHCPv4 server; or "IPv6 Router" if only IPv6 address allocation mechanism is supported by the initiating UE, i.e., acting as an IPv6 Router; or "DHCPv4 server & IPv6 Router" if both IPv4 and IPv6 address allocation mechanism are supported by the initiating UE; or "address allocation not supported" if neither IPv4 nor IPv6 address allocation mechanism is supported by the initiating UE.

Link-Local IPv6 Address: a link-local IPv6 address formed locally based on RFC 4862 [17] if UE-1 does not support the IPv6 IP address allocation mechanism, i.e. the IP Address Configuration indicates"address allocation not supported".

QoS Info: the information about PC5 QoS Flow(s). For each PC5 QoS Flow, the PFI and the corresponding PC5 QoS parameters (i.e. PQI and conditionally other parameters such as MFBR/GFBR, etc.) and optionally the associated ProSe identifier(s).

Optional PC5 QoS Rule(s).

The source Layer-2 ID used for the security establishment procedure is determined as specified in clauses 5.8.2.1 and 5.8.2.4. The destination Layer-2 ID is set to the source Layer-2 ID of the received Direct Communication Request message.

Upon receiving the security establishment procedure messages, UE-1 obtains the peer UE's Layer-2 ID for future communication, for signalling and data traffic for this unicast link.

5. A Direct Communication Accept message is sent to UE-1 by the target UE(s) that has successfully established security with UE-1:

5a. (UE oriented Layer-2 link establishment) If the Target User Info is included in the Direct Communication Request message, the target UE, i.e. UE-2 responds with a Direct Communication Accept message if the Application Layer ID for UE-2 matches.

5b. (ProSe Service oriented Layer-2 link establishment) If the Target User Info is not included in the Direct Communication Request message, the UEs that are interested in using the announced ProSe Service(s) respond to the request by sending a Direct Communication Accept message (UE-2 and UE-4 in Figure 6.4.3.1-1).

The Direct Communication Accept message includes:

Source User Info: Application Layer ID of the UE sending the Direct Communication Accept message.

QoS Info: the information about PC5 QoS Flow(s). For each PC5 QoS Flow, the PFI and the corresponding PC5 QoS parameters requested by UE-1 (i.e. PQI and conditionally other parameters such as MFBR/GFBR, etc.) and optionally the associated ProSe identifiers(s).

Optional PC5 QoS Rule(s).

If IP communication is used:

IP Address Configuration: For IP communication, IP address configuration is required for this link and indicates one of the following values:

"DHCPv4 server" if only IPv4 address allocation mechanism is supported by the target UE, i.e., acting as a DHCPv4 server; or "IPv6 Router" if only IPv6 address allocation mechanism is supported by the target UE, i.e., acting as an IPv6 Router; or "DHCPv4 server & IPv6 Router" if both IPv4 and IPv6 address allocation mechanism are supported by the target UE; or "address allocation not supported" if neither IPv4 nor IPv6 address allocation mechanism is supported by the target UE.

Link-Local IPv6 Address: a link-local IPv6 address formed locally based on RFC 4862 [17] if the target UE does not support the IPv6 IP address allocation mechanism, i.e. the IP Address Configuration indicates "address allocation not supported", and UE-1 included a link-local IPv6 address in the Direct Communication Request message. The target UE shall include a non-conflicting link-local IPv6 address.

If both UEs (i.e. the initiating UE and the target UE) are selected to use link-local IPv6 address, they shall disable the duplicate address detection defined in RFC 4862 [17].

NOTE 3: When either the initiating UE or the target UE indicates the support of IPv6 routing, the corresponding address configuration procedure would be carried out after the establishment of the layer 2 link, and the link-local IPv6 addresses are ignored.

The ProSe layer of the UE that established PC5 unicast link passes the PC5 Link Identifier assigned for the unicast link and the PC5 unicast link related information down to the AS layer. The PC5 unicast link related information includes Layer-2 ID information (i.e. source Layer-2 ID and destination Layer-2 ID). This enables the AS layer to maintain the PC5 Link Identifier together with the PC5 unicast link related information.

Two UEs may negotiate the PC5 DRX configuration in the AS layer, and the PC5 DRX parameter values can be configured per pair of source and destination Layer-2 IDs in the AS layer.

6. ProSe data is transmitted over the established unicast link as below:

The PC5 Link Identifier and PFI are provided to the AS layer, together with the ProSe data. Optionally in addition, the Layer-2 ID information (i.e. source Layer-2 ID and destination Layer-2 ID) is provided to the AS layer.

NOTE 4: It is up to UE implementation to provide the Layer-2 ID information to the AS layer. UE-1 sends the ProSe data using the source Layer-2 ID (i.e. UE-1's Layer-2 ID for this unicast link) and the destination Layer-2 ID (i.e. the peer UE's Layer-2 ID for this unicast link).

NOTE 5: PC5 unicast link is bi-directional, therefore the peer UE of UE-1 can send the ProSe data to UE-1 over the unicast link with UE-1.

3GPP TS 24.554 introduced the following:

7.2.2 5G ProSe Direct Link Establishment Procedure 7.2.2.1 General

Depending on the type of the 5G ProSe direct link establishment procedure (i.e., UE oriented layer-2 link establishment or ProSe service oriented layer-2 link establishment in 3GPP TS 23.304 [2]), the 5G ProSe direct link establishment procedure is used to establish a 5G ProSe direct link between two UEs or to establish multiple 5G ProSe direct links. The UE sending the request message is called the "initiating UE" and the other UE is called the "target UE". If the request message does not indicate the specific target UE (i.e., target user info is not included in the request message) and multiple target UEs are interested in the ProSe application(s) indicated in the request message, then the initiating UE shall handle corresponding response messages received from those target UEs. The maximum number of 5G ProSe direct links established in a UE at a time shall not exceed an implementation-specific maximum number of established 5G ProSe direct links.

NOTE: The recommended maximum number of established 5G ProSe direct link is 8. When the 5G ProSe direct link establishment procedure for a 5G ProSe layer-3 remote UE completes successfully and if there is a PDU session established for relaying the traffic of the 5G ProSe remote UE, the 5G ProSe layer-3 UE-to-network relay UE shall perform the remote UE report procedure as specified in 3GPP TS 24.501 [11].

7.2.2.2 5G ProSe Direct Link Establishment Procedure Initiation by Initiating UE The initiating UE shall meet the following pre-conditions before initiating this procedure:
- a) a request from upper layers to transmit the packet for ProSe application over PC5 or a request from lower layers to trigger ProSe direct link establishment;
- b) the communication mode is unicast mode (e.g., pre-configured as specified in clause 5.2.4 or indicated by upper layers);
- c) the link layer identifier for the initiating UE (i.e., layer-2 ID used for unicast communication) is available (e.g., pre-configured or self-assigned) and is not being used by other existing 5G ProSe direct links within the initiating UE;
- d) the link layer identifier for the destination UE (i.e., the unicast layer-2 ID of the target UE or the broadcast layer-2 ID) is available to the initiating UE (e.g., pre-configured, obtained as specified in clause 5.2, known via prior ProSe direct communication or indicated by lower layers);

NOTE 1: In the case where different ProSe applications are mapped to distinct default destination layer-2 IDs, when the initiating UE intends to establish a single unicast link that can be used for more than one ProSe identifiers, the UE can select any of the default destination layer-2 ID for unicast initial signalling.

- e) the initiating UE is either authorised for 5G ProSe direct communication over PC5 in NR-PC5 in the serving PLMN, has a valid authorization for 5G ProSe direct communication over PC5 in NR-PC5 when not served by NG-RAN, or is authorized to use a 5G ProSe UE-to-network relay UE. The UE considers that it is not served by NG-RAN if the following conditions are met:
  1) not served by NG-RAN for ProSe direct communication over PC5;
  2) in limited service state as specified in 3GPP TS 23.122 [14], if the reason for the UE being in limited service state is one of the following;
     i) the UE is unable to find a suitable cell in the selected PLMN as specified in 3GPP TS 38.304 [15];
     ii) the UE received a REGISTRATION REJECT message or a SERVICE REJECT message with the 5GMM cause #11 "PLMN not allowed" as specified in 3GPP TS 24.501 [11]; or
     iii) the UE received a REGISTRATION REJECT message or a SERVICE REJECT message with the 5GMM cause #7 "5GS services not allowed" as specified in 3GPP TS 24.501 [11]; or
  3) in limited service state as specified in 3GPP TS 23.122 [14] for reasons other than i), ii) or iii) above and located in a geographical area for which the UE is provisioned with "non-operator managed" radio parameters as specified in clause 5.2;
- f) there is no existing 5G ProSe direct link for the pair of peer application layer IDs, or there is an existing 5G ProSe direct link for the pair of peer application layer IDs and:
  1) the network layer protocol of the existing 5G ProSe direct link is not identical to the network layer protocol required by the upper layer in the initiating UE for this ProSe application;
  2) the security policy (either signalling security policy or user plane security policy) corresponding to the ProSe identifier is not compatible with the security policy of the existing 5G ProSe direct link; or
  3) in case of the 5G ProSe direct link establishment procedure is for direct communication between the 5G ProSe remote UE and the 5G ProSe UE-to-network relay UE, the existing 5G ProSe direct link for the peer UE is established with a different RSC or without an RSC;
- g) the number of established 5G ProSe direct links is less than the implementation-specific maximum number of established 5G ProSe direct links allowed in the UE at a time; and
- h) timer T5088 is not associated with the link layer identifier for the destination UE or timer T5088 associated with the link layer identifier for the destination UE has already expired or stopped.

After receiving the service data or request from the upper layers, the initiating UE shall derive the PC5 QoS parameters and assign the PQFI(s) for the PC5 QoS flows(s) to be established as specified in clause 7.2.7.

If the 5G ProSe direct link establishment procedure is for direct communication between the 5G ProSe remote UE and the 5G ProSe UE-to-network relay UE, then the UE shall apply the DUCK or DUSK with the associated encrypted bitmask used for UE-to-network relay discovery along with the UTC-based counter for encrypting the relay service code and the PRUK ID, if available, (see clause 6.3.5.2 of 3GPP TS 33.503 [34]) and the UE shall use the security protected relay service code or the security protected PRUK ID for creating a PROSE DIRECT LINK ESTABLISHMENT REQUEST message.

NOTE 2: If the UE is neither configured with DUCK nor DUSK, the relay service code and the PRUK ID are not encrypted.

In order to initiate the 5G ProSe direct link establishment procedure, the initiating UE shall create a PROSE DIRECT LINK ESTABLISHMENT REQUEST message. The initiating UE: ting UE shall create a PROSE DIRECT LINK ESTABLISHMENT REQUEST message. The initiating UE:

a) shall include the source user info set to the initiating UE's application layer ID received from upper layers;
b) shall include the ProSe identifier(s) received from upper layer if the 5G ProSe direct link establishment procedure is not for 5G ProSe direct communication between the 5G ProSe remote UE and the 5G ProSe UE-to-network relay UE;
c) shall include the target user info set to the target UE's application layer ID if received from upper layers, or to the identity of the 5G ProSe UE-to-network relay UE obtained during the 5G ProSe UE-to-network relay discovery procedure, or if the destination layer-2 ID is the unicast layer-2 ID of target UE;
d) if the 5G ProSe direct link is not for direct communication between the 5G ProSe remote UE and the 5G ProSe UE-to-network relay UE:
   1) shall include the key establishment information container if the UE PC5 unicast signalling integrity protection policy is set to "Signalling integrity protection required" or "Signalling integrity protection preferred" and may include the key establishment information container if the UE PC5 unicast signalling integrity protection policy is set to "Signalling integrity protection not needed"; NOTE 3: The key establishment information container is provided by upper layers.
e) shall include:
   1) a Nonce_1, if the direct communication is not between the 5G ProSe remote UE and the 5G ProSe UE-to-network relay UE, or if the direct communication is between the 5G ProSe remote UE and the 5G ProSe UE-to-network relay UE and the security procedure over control plane is used as specified in 3GPP TS 33.503 [34]; or
   2) a $K_{NRP}$ freshness parameter 1, if the direct communication is between the 5G ProSe remote UE and the 5G ProSe UE-to-network relay UE and the security procedure over user plane is used as specified in 3GPP TS 33.503 [34];
   set to the 128-bit nonce value generated by the initiating UE for the purpose of session key establishment over this 5G ProSe direct link if the UE PC5 unicast signalling integrity protection policy is set to "Signalling integrity protection required" or "Signalling integrity protection preferred";
NOTE 4: The Nonce_1 IE in the PROSE DIRECT LINK ESTABLISHMENT REQUEST message is used to hold the value of Nonce_1 or $K_{NRP}$ freshness parameter 1.
f) shall include its UE security capabilities indicating the list of algorithms that the initiating UE supports for the security establishment of this 5G ProSe direct link;
g) shall include the MSB of $K_{NRP\text{-}sess}$ ID chosen by the initiating UE as specified in 3GPP TS 33.503 [34] if the UE PC5 unicast signalling integrity protection policy is set to "Signalling integrity protection required" or "Signalling integrity protection preferred";
h) may include a $K_{NRP}$ ID if the initiating UE has an existing $K_{NRP}$ for the target UE;
i) shall include its UE PC5 unicast signalling security policy. In the case where the different ProSe applications are mapped to the different PC5 unicast signalling security policies, when the initiating UE intends to establish a single unicast link that can be used for more than one ProSe application, each of the signalling security polices of those ProSe applications shall be compatible, e.g., "Signalling integrity protection not needed" and "Signalling integrity protection required" are not compatible. In case the 5G ProSe direct link establishment procedure is for direct communication between 5G ProSe remote UE and 5G ProSe UE-to-network relay UE, the Signalling integrity protection policy shall be set to "Signalling integrity protection required";
j) shall include the Relay service code IE set to the relay service code of the target relay UE if the 5G ProSe direct link establishment procedure is for direct communication between the 5G ProSe remote UE and the 5G ProSe UE-to-network relay UE;
k) shall include the UTC-based counter LSB set to the four least significant bits of the UTC-based counter if the 5G ProSe direct link establishment procedure is for direct communication between the 5G ProSe remote UE and the 5G ProSe UE-to-network relay UE;
l) shall include the UE identity IE set to the SUCI of the initiating UE if:
   1) the 5G ProSe direct link establishment procedure is for direct communication between the 5G ProSe remote UE and the 5G ProSe UE-to-network relay UE; and
   2) the security for 5G ProSe UE-to-network relay uses the security procedure over control plane and the initiating UE does not have a valid 5GPRUK as specified in 3GPP TS 33.503 [34], or, the security for 5G ProSe UE-to-network relay uses the security procedure over user plane and the initiating UE does not have a valid PRUK as specified in 3GPP TS 33.503 [34];
m) shall include the User security key ID IE set to:
   1) PRUK ID of the initiating UE if:
      i) the 5G ProSe direct link establishment procedure is for direct communication between the 5G ProSe remote UE and the 5G ProSe UE-to-network relay UE;
      ii) the initiating UE has a valid PRUK; and
      iii) the security for 5G ProSe UE-to-network relay uses the security procedure over user plane as specified in 3GPP TS 33.503 [34]; or
   2) 5GPRUK ID of the initiating UE if:
      i) the 5G ProSe direct link establishment procedure is for direct communication between the 5G ProSe remote UE and the 5G ProSe UE-to-network relay UE;
      ii) the initiating UE has a valid 5GPRUK; and
      iii) the security for 5G ProSe UE-to-network relay uses the security procedure over control plane as specified in 3GPP TS 33.503 [34];
n) shall include the HPLMN ID of the initiating UE, if the PRUK ID of the initiating UE is included and is not in NAI format (see 3GPP TS 33.503 [34]); and
o) shall include the MIC IE set to the calculated MIC value as specified in clause 6.3.5.3 of 3GPP TS 33.503 [34] if the 5G ProSe direct link establishment procedure is for direct communication between the 5G ProSe remote UE and the 5G ProSe UE-to-network relay UE and the UE has the DUIK.

After the PROSE DIRECT LINK ESTABLISHMENT REQUEST message is generated, the initiating UE shall pass this message to the lower layers for transmission along with the source layer-2 ID and destination layer-2 ID as follows:
  a) if the 5G ProSe direct communication is in a consequence of 5G ProSe direct discovery as defined in clause 6.2.14, clause 6.2.15, and clause 8.2.1:
    self-assign a source layer-2 ID, and the destination layer-2 ID set to the source layer-2 ID in the received PROSE PC5 DISCOVERY message for discovery procedure; or
  b) otherwise:
    self-assign a source layer-2 ID, and the destination layer-2 ID set to the destination layer-2 ID used for unicast initial signalling as specified in clause 5.2.4,
    NOTE 5: The UE implementation ensures that any value of the self-assigned source layer-2 ID in a) and b) is different from any other self-assigned source layer-2 ID(s) in use for 5G ProSe direct discovery as specified in clause 6.2.14, clause 6.2.15 and clause 8.2.1, and is different from any other provisioned destination layer-2 ID(s) as specified in clause 5.2.
    NOTE 6: It is possible for the initiating UE to reuse the initiating UE's layer-2 ID used in previous 5G ProSe direct link with the same peer UE.
and start timer T5080.
  NOTE 7: A default PC5 DRX configuration is used for transmitting this message as specified in 3GPP TS 38.300 [21].
The UE shall not send a new PROSE DIRECT LINK ESTABLISHMENT REQUEST message to the same target UE identified by the same application layer ID while timer T5080 is running. If the target user info IE is not included in the PROSE DIRECT LINK ESTABLISHMENT REQUEST message (i.e., ProSe application oriented 5G ProSe direct link establishment procedure), the initiating UE shall handle multiple PROSE DIRECT LINK ESTABLISHMENT ACCEPT messages, if any, received from different target UEs for the establishment of multiple 5G ProSe direct links before the expiry of timer T5080.
  NOTE 8: In order to ensure successful 5G ProSe direct link establishment, T5080 should be set to a value larger than the sum of T5089 and T5092.
  [Figure 7.2.2.2.1 of 3GPP TS 24.554 V17.2.1, entitled "UE oriented 5G ProSe direct link establishment procedure", is reproduced as FIG. 6]
  [Figure 7.2.2.2.2 of 3GPP TS 24.554 V17.2.1, entitled "ProSe service oriented 5G ProSe direct link establishment procedure", is reproduced as FIG. 7]
7.2.2.3 5G ProSe Direct Link Establishment Procedure Accepted by the Target UE
Upon receipt of a PROSE DIRECT LINK ESTABLISHMENT REQUEST message, if the target UE accepts this request, the target UE shall uniquely assign a PC5 link identifier, create a 5G ProSe direct link context.
If the PROSE DIRECT LINK ESTABLISHMENT REQUEST message is for 5G ProSe direct communication between the 5G ProSe remote UE and the 5G ProSe UE-to-network relay UE, the target UE shall verify the MIC field in the received PROSE DIRECT LINK ESTABLISHMENT REQUEST with the DUIK, if any, and decrypts the encrypted relay service code and PRUK ID, if received, using the DUCK, or DUSK with the associated encrypted bitmask used for 5G ProSe UE-to-network relay discovery (see clause 6.3.5.2 of 3GPP TS 33.503 [34]) and verifies if the relay service code matches with the one that the target UE has sent during 5G ProSe UE-to-network relay discovery procedure.
  NOTE 1: If the UE is neither configured with DUCK nor DUSK, the relay service code and the PRUK ID are not encrypted.
If the 5G ProSe direct link establishment procedure is not for direct communication between the 5G ProSe remote UE and the 5G ProSe UE-to-network relay UE, the target UE may initiate 5G ProSe direct link authentication procedure as specified in clause 7.2.12 and shall initiate 5G ProSe direct link security mode control procedure as specified in clause 7.2.10.
If the 5G ProSe direct link establishment procedure is for direct communication between the 5G ProSe remote UE and the 5G ProSe UE-to-network relay UE, the target UE shall proceed with either the security procedure over control plane or the security procedure over user plane as specified in 3GPP TS 33.503 [34].
The target UE shall set the source layer-2 ID and the destination layer-2 ID as specified in clause 7.2.12 and clause 7.2.10, and store the corresponding source layer-2 ID for unicast communication and the destination layer-2 ID for unicast communication in the 5G ProSe direct link context.
If:
  a) the target user info IE is included in the PROSE DIRECT LINK ESTABLISHMENT REQUEST message and this IE includes the target UE's application layer ID; or
  b) the target user info IE is not included in the PROSE DIRECT LINK ESTABLISHMENT REQUEST message and the target UE is interested in the ProSe application(s) identified by the ProSe identifier IE in the PROSE DIRECT LINK ESTABLISHMENT REQUEST message;
then the target UE shall either:
  a) identify an existing $K_{NRP}$ based on the $K_{NRP}$ ID included in the PROSE DIRECT LINK ESTABLISHMENT REQUEST message; or
  b) if $K_{NRP}$ ID is not included in the PROSE DIRECT LINK ESTABLISHMENT REQUEST message, the target UE does not have an existing $K_{NRP}$ for the $K_{NRP}$ ID included in PROSE DIRECT LINK ESTABLISHMENT REQUEST message or the target UE wishes to derive a new $K_{NRP}$, derive a new $K_{NRP}$. This may require performing one or more 5G ProSe direct link authentication procedures as specified in clause 7.2.12.
  NOTE 2: How many times the 5G ProSe direct link authentication procedure needs to be performed to derive a new $K_{NRP}$ depends on the authentication method used.
After an existing $K_{NRP}$ was identified or a new $K_{NRP}$ was derived, the target UE shall initiate a 5G ProSe direct link security mode control procedure as specified in clause 7.2.10.
Upon successful completion of the 5G ProSe direct link security mode control procedure, in order to determine whether the PROSE DIRECT LINK ESTABLISHMENT REQUEST message can be accepted or not, in case of IP communication, the target UE checks whether there is at least one common IP address configuration option supported by both the initiating UE and the target UE.
Before sending the PROSE DIRECT LINK ESTABLISHMENT ACCEPT message to the 5G ProSe remote UE, the target UE acting as a 5G ProSe layer-3 UE-to-network relay UE shall inform the lower layer to initiate the UE requested PDU session establishment procedure as specified in 3GPP TS 24.501 [11] if:
  1) the PDU session for relaying the service associated with the RSC has not been established yet; or
  2) the PDU session for relaying the service associated with the RSC has been established but the PDU session type is Unstructured.

If the target UE accepts the 5G ProSe direct link establishment procedure, the target UE shall create a PROSE DIRECT LINK ESTABLISHMENT ACCEPT message. The target UE:
  a) shall include the source user info set to the target UE's application layer ID received from upper layers;
  b) shall include PQFI(s), the corresponding PC5 QoS parameters and optionally the ProSe identifier(s) that the target UE accepts, if the target UE is not acting as a 5G ProSe layer-2 UE-to-network relay UE;
  c) may include the PC5 QoS rule(s) if the target UE is not acting as a 5G ProSe layer-2 UE-to-network relay UE;
  d) shall include an IP address configuration IE set to one of the following values if IP communication is used and the target UE is not acting as a 5G ProSe layer-2 UE-to-network relay UE:
    1) "DHCPv4 server" if only IPv4 address allocation mechanism is supported by the target UE, i.e., acting as a DHCPv4 server; or
    2) "IPv6 router" if only IPv6 address allocation mechanism is supported by the target UE, i.e., acting as an IPv6 router; or
    3) "DHCPv4 server & IPv6 Router" if both IPv4 and IPv6 address allocation mechanism are supported by the target UE; or
    4) "address allocation not supported" if neither IPv4 nor IPv6 address allocation mechanism is supported by the target UE and the target UE is not acting as a 5G ProSe layer-3 UE-to-network relay UE;
  NOTE 3: The UE doesn't include an IP address configuration IE nor a link local IPv6 address IE if Ethernet or Unstructured data unit type is used for communication.
  e) shall include a link local IPv6 address IE formed locally based on IETF RFC 4862 [25] if IP address configuration IE is set to "address allocation not supported", the received PROSE DIRECT LINK SECURITY MODE COMPLETE message included a link local IPv6 address IE and the target UE is neither acting as a 5G ProSe layer-2 UE-to-network relay UE nor acting as a 5G ProSe layer-3 relay UE; and
  f) shall include the configuration of UE PC5 unicast user plane security protection based on the agreed user plane security policy, as specified in 3GPP TS 33.503 [34].

After the PROSE DIRECT LINK ESTABLISHMENT ACCEPT message is generated, the target UE shall pass this message to the lower layers for transmission along with the initiating UE's layer-2 ID for unicast communication and the target UE's layer-2 ID for unicast communication and shall start timer T5090 if:
  a) at least one of ProSe identifiers for the 5G ProSe direct links satisfies the privacy requirements as specified in clause 5.2.4; or
  b) T5090 is configured as specified in clause 5.2.5.
  NOTE 4: Two UEs negotiate the PC5 DRX configuration in the AS layer, and the PC5 DRX parameter values are configured per pair of source and destination Layer-2 IDs in the AS layer, as specified in 3GPP TS 38.300 [21].

After sending the PROSE DIRECT LINK ESTABLISHMENT ACCEPT message, the target UE shall provide the following information along with the layer-2 IDs to the lower layer, which enables the lower layer to handle the coming PC5 signalling or traffic data:
  a) the PC5 link identifier self-assigned for this 5G ProSe direct link;
  b) PQFI(s) and its corresponding PC5 QoS parameters, if available; and
  c) an indication of activation of the PC5 unicast user plane security protection for the 5G ProSe direct link, if applicable.

If the target UE accepts the 5G ProSe direct link establishment request and the 5G ProSe direct link is established not for 5G ProSe direct communication between the 5G ProSe remote UE and the 5G ProSe UE-to-network relay UE, then the target UE may perform the PC5 QoS flow establishment over 5G ProSe direct link as specified in clause 7.2.7. If the 5G ProSe direct link is established for 5G ProSe direct communication between the 5G ProSe layer-3 remote UE and the 5G ProSe layer-3 UE-to-network relay UE, then the target UE may perform the PC5 QoS flow establishment over 5G ProSe direct link as specified in clause 8.2.6.

7.2.2.4 5G ProSe Direct Link Establishment Procedure Completion by the Initiating UE If the Target user info IE is included in the PROSE DIRECT LINK ESTABLISHMENT REQUEST message, upon receipt of the PROSE DIRECT LINK ESTABLISHMENT ACCEPT message, the initiating UE shall stop timer T5080. If the Target user info IE is not included in the PROSE DIRECT LINK ESTABLISHMENT REQUEST message the initiating UE may keep the timer T5080 running and continue to handle multiple response messages (i.e., the PROSE DIRECT LINK ESTABLISHMENT ACCEPT message) from multiple target UEs.

For each of the PROSE DIRECT LINK ESTABLISHMENT ACCEPT message received, the initiating UE shall uniquely assign a PC5 link identifier and create a 5G ProSe direct link context for each of the 5G ProSe direct link(s). Then the initiating UE shall store the source layer-2 ID and the destination layer-2 ID used in the transport of this message provided by the lower layers in the 5G ProSe direct link context(s) to complete the establishment of the 5G ProSe direct link with the target UE(s). From this time onward the initiating UE shall use the established link(s) for ProSe direct communication over PC5 and additional PC5 signalling messages to the target UE(s).

After receiving the PROSE DIRECT LINK ESTABLISHMENT ACCEPT message, the initiating UE shall provide the following information along with the layer-2 IDs to the lower layer, which enables the lower layer to handle the coming PC5 signalling or traffic data:
  a) the PC5 link identifier self-assigned for this 5G ProSe direct link;
  b) PQFI(s) and its corresponding PC5 QoS parameters, if available; and
  c) an indication of activation of the PC5 unicast user plane security protection for the 5G ProSe direct link, if applicable.

The initiating UE shall start timer T5090 if:
  a) at least one of ProSe identifiers for the 5G ProSe direct links satisfies the privacy requirements as specified in clause 5.2.4; or
  b) T5090 is configured as specified in clause 5.2.5.

In addition, the initiating UE may perform the PC5 QoS flow establishment over 5G ProSe direct link as specified in clause 7.2.7.

Upon expiry of the timer T5080, if the PROSE DIRECT LINK ESTABLISHMENT REQUEST message did not include the Target user info IE and the initiating UE received at least one PROSE DIRECT LINK ESTABLISHMENT ACCEPT message, it is up to the UE implementation to consider the 5G ProSe direct link establishment procedure as complete or to restart the timer T5080.

[ . . . ]

7.2.10 5G ProSe Direct Link Security Mode Control Procedure 7.2.10.1 General

The 5G ProSe direct link security mode control procedure is used to establish security between two UEs during a 5G ProSe direct link establishment procedure or a 5G ProSe direct link re-keying procedure. Security is not established if the UE PC5 signalling integrity protection is not activated. After successful completion of the 5G ProSe direct link security mode control procedure, the selected security algorithms and their non-null associate keys are used to integrity protect and cipher all PC5 signalling messages exchanged over this 5G ProSe direct link between the UEs and the security context can be used to protect all PC5 user plane data exchanged over this 5G ProSe direct link between the UEs. The UE sending the PROSE DIRECT LINK SECURITY MODE COMMAND message is called the "initiating UE" and the other UE is called the "target UE".

7.2.10.2 5G ProSe Direct Link Security Mode Control Procedure Initiation by the Initiating UE The initiating UE shall meet the following pre-conditions before initiating the 5G ProSe direct link security mode control procedure:
  a) the target UE has initiated a 5G ProSe direct link establishment procedure toward the initiating UE by sending a PROSE DIRECT LINK ESTABLISHMENT REQUEST message and:
    1) the PROSE DIRECT LINK ESTABLISHMENT REQUEST message:
      i) includes a target user info IE which includes the application layer ID of the initiating UE; or
      ii) does not include a target user info IE and the initiating UE is interested in the ProSe service identified by the ProSe identifier in the PROSE DIRECT LINK ESTABLISHMENT REQUEST message; and
    2) the initiating UE:
      i) if the direct communication is not between the 5G ProSe remote UE and the 5G ProSe UE-to-network relay UE has either identified an existing $K_{NRP}$ based on the $K_{NRP}$ ID included in the PROSE DIRECT LINK ESTABLISHMENT REQUEST message or derived a new $K_{NRP}$;
      ii) if the direct communication is between the 5G ProSe remote UE and the 5G ProSe UE-to-network relay UE with the security procedure over user plane being used, has received a new $K_{NRP}$ according to the security procedure over user plane as specified in 3GPP TS 33.503 [34];
      iii) if the direct communication is between the 5G ProSe remote UE and the 5G ProSe UE-to-network relay UE with the security procedure over control plane being used, has received a new $K_{NR\_ProSe}$ according to the security procedure over control plane as specified in 3GPP TS 33.503 [34]; or
      iv) has decided not to activate security protection based on its UE 5G ProSe direct signalling security policy and the target UE's 5G ProSe direct signalling security policy; or
  b) the target UE has initiated a 5G ProSe direct link re-keying procedure toward the initiating UE by sending a PROSE DIRECT LINK REKEYING REQUEST message and:
    1) if the target UE has included a Re-authentication indication in the PROSE DIRECT LINK REKEYING REQUEST message, the initiating UE has derived a new $K_{NRP}$.

When:
  a) the direct communication is not between the 5G ProSe remote UE and the 5G ProSe UE-to-network relay UE, if a new $K_{NRP}$ has been derived by the initiating UE; or
  b) the direct communication is between the 5G ProSe remote UE and the 5G ProSe UE-to-network relay UE, if a new $K_{NRP}$ or $K_{NR\_ProSe}$ has been received by the initiating UE according to the security procedure over user plane or the security procedure over control plane, respectively, as specified in 3GPP TS 33.503 [34];

the initiating UE shall generate the 2 MSBs of $K_{NRP}$ ID to ensure that the resultant $K_{NRP}$ ID will be unique in the initiating UE.

The initiating UE shall select security algorithms in accordance with its UE 5G ProSe direct signalling security policy and the target UE's 5G ProSe direct signalling security policy. If the 5G ProSe direct link security mode control procedure was triggered during a 5G ProSe direct link establishment procedure, the initiating UE shall not select the null integrity protection algorithm if the initiating UE or the target UE's 5G ProSe direct signalling integrity protection policy is set to "Signalling integrity protection required". If the 5G ProSe direct link security mode control procedure was triggered during a 5G ProSe direct link re-keying procedure, the initiating UE:
  a) shall not select the null integrity protection algorithm if the integrity protection algorithm currently in use for the 5G ProSe direct link is different from the null integrity protection algorithm;
  b) shall not select the null ciphering protection algorithm if the ciphering protection algorithm currently in use for the 5G ProSe direct link is different from the null ciphering protection algorithm;
  c) shall select the null integrity protection algorithm if the integrity protection algorithm currently in use is the null integrity protection algorithm; and
  d) shall select the null ciphering protection algorithm if the ciphering protection algorithm currently in use is the null ciphering protection algorithm.

Then the initiating UE shall:
  a) if the direct communication is not between the 5G ProSe remote UE and the 5G ProSe UE-to-network relay UE:
    1) generate a 128-bit Nonce_2 value;
    2) derive $K_{NRP-sess}$ from $K_{NRP}$, Nonce_2 and Nonce_1 received in the PROSE DIRECT LINK ESTABLISHMENT REQUEST message as specified in 3GPP TS 33.536 [37]; and
    3) derive the NR PC5 encryption key NRPEK and the NR PC5 integrity key NRPIK from $K_{NRP-sess}$ and the selected security algorithms as specified in 3GPP TS 33.536 [37];
  b) if the direct communication is between the 5G ProSe remote UE and the 5G ProSe UE-to-network relay UE and the security procedure over control plane as specified in 3GPP TS 33.503 [34] is used:
    1) derive $K_{relay-sess}$ from $K_{NR\_ProSe}$, Nonce_2 and Nonce_1 received in the PROSE DIRECT LINK ESTABLISHMENT REQUEST message as specified in 3GPP TS 33.503 [34]; and 2) derive the NR PC5 encryption key $K_{relay-enc}$ and the NR PC5 integrity key $K_{relay-int}$ from $K_{relay-sess}$ and the selected security algorithms as specified in 3GPP TS 33.503 [34]; or c) if the direct communication is between the 5G ProSe remote UE and the 5G ProSe UE-to-network relay UE and the security procedure over user plane as specified in 3GPP TS 33.503 [34] is used:

1) derive $K_{NRP-sess}$ from $K_{NRP}$, $K_{NRP}$ freshness parameter 2 and $K_{NRP}$ freshness parameter 1 received in the PROSE DIRECT LINK ESTABLISHMENT REQUEST message as specified in 3GPP TS 33.503 [34]; and 2) derive the NR PC5 encryption key NRPEK and the NR PC5 integrity key NRPIK from $K_{NRP-sess}$ and the selected security algorithms as specified in 3GPP TS 33.503 [34]; and d) create a PROSE DIRECT LINK SECURITY MODE COMMAND message. In this message, the initiating UE:

1) shall include the key establishment information container IE if the 5G ProSe direct link is not for direct communication between the 5G ProSe remote UE and the 5G ProSe UE-to-network relay UE and a new $K_{NRP}$ has been derived at the initiating UE and the authentication method used to generate $K_{NRP}$ requires sending information to complete the 5G ProSe direct link authentication procedure;

NOTE 1: The key establishment information container is provided by upper layers.

2) shall include the MSBs of $K_{NRP}$ ID IE if a new $K_{NRP}$ has been derived or received at the initiating UE;

3) shall include a Nonce_2 IE set to:
  i) the 128-bit nonce value generated by the initiating UE when the direct communication is not between the 5G ProSe remote UE and the 5G ProSe UE-to-network relay UE;
  ii) the $K_{NRP}$ freshness parameter 2 value received by the initiating UE when the direct communication is between the 5G ProSe remote UE and the 5G ProSe UE-to-network relay UE with the security procedure over user plane as specified in 3GPP TS 33.503 [34] being used; or
  iii) the Nonce_2 value received by the initiating UE when the direct communication is between the 5G ProSe remote UE and the 5G ProSe UE-to-network relay UE with the security procedure over control plane as specified in 3GPP TS 33.503 [34] being used;
  for the purpose of session key establishment over this 5G ProSe direct link if the selected integrity protection algorithm is not the null integrity protection algorithm;

4) shall include the selected security algorithms;

5) shall include the UE security capabilities received from the target UE in the PROSE DIRECT LINK ESTABLISHMENT REQUEST message or PROSE DIRECT LINK REKEYING REQUEST message;

6) shall include the UE 5G ProSe direct signalling security policy received from the target UE in the PROSE DIRECT LINK ESTABLISHMENT REQUEST message;

7) shall include the LSB of $K_{NRP-sess}$ ID chosen by the initiating UE as specified in 3GPP TS 33.536 [37] if the selected integrity protection algorithm is not the null integrity protection algorithm;

8) shall include the GPI if received from the 5G PKMF according to the security procedure over user plane as specified in 3GPP TS 33.503 [34], when the direct communication is between the 5G ProSe remote UE and the 5G ProSe UE-to-network relay UE; and 9) shall include the EAP message if received from the network according to the security procedure over control plane as specified in 3GPP TS 33.503 [34], when the direct communication is between the 5G ProSe remote UE and the 5G ProSe UE-to-network relay UE.

If the security protection of this 5G ProSe direct link is activated by using non-null integrity protection algorithm or non-null ciphering protection algorithm, the initiating UE shall form the $K_{NRP-sess}$ ID from the MSB of $K_{NRP-sess}$ ID received in the PROSE DIRECT LINK ESTABLISHMENT REQUEST message or PROSE DIRECT LINK REKEYING REQUEST message and the LSB of $K_{NRP-sess}$ ID included in the PROSE DIRECT LINK SECURITY MODE COMMAND message. The initiating UE shall use the $K_{NRP-sess}$ ID to identify the new security context.

The initiating UE shall set the source layer-2 ID and destination layer-2 ID as follows:

1) if the initiating UE is acting as a 5G ProSe layer-3 UE-to-network relay UE, and the EAP-AKA' based authentication method is used as specified in clause 6.3.3.3 of 3GPP TS 33.503 [34],
  the source layer-2 ID set to the source layer-2 ID used in PROSE AA MESSAGE TRANSPORT REQUEST message, and the destination layer-2 ID set to the the destination layer-2 ID used in PROSE AA MESSAGE TRANSPORT REQUEST message;

2) if the initiating UE is not acting as a 5G ProSe UE-to-network relay UE, and a 5G ProSe direct link authentication procedure has been initiated:
  the source layer-2 ID set to the source layer-2 ID used in PROSE DIRECT LINK AUTHENTICATION REQUEST message, and the destination layer-2 ID set to the the destination layer-2 ID used in PROSE DIRECT LINK AUTHENTICATION REQUEST message;

3) otherwise,
  self-assign a source layer-2 ID, and the destination layer-2 ID set to the source layer-2 ID in the PROSE DIRECT LINK ESTABLISHMENT REQUEST message.

NOTE 2: The UE implementation ensures that any value of the self-assigned source layer-2 ID is different from any other self-assigned source layer-2 ID(s) in use for 5G ProSe direct discovery as specified in clause 6.2.14, clause 6.2.15 and clause 8.2.1, and is different from any other provisioned destination layer-2 ID(s) as specified in clause 5.2.

NOTE 3: It is possible for the target UE to reuse the target UE's layer-2 ID used in previous 5G ProSe direct link with the same peer UE.

After the PROSE DIRECT LINK SECURITY MODE COMMAND message is generated, the initiating UE shall pass this message to the lower layers for transmission along with the source layer-2 ID and the destination layer-2 ID, NRPIK (or $K_{relay-int}$ when applicable), NRPEK (or $K_{relay-enc}$ when applicable) if applicable, $K_{NRP-sess}$ ID, the selected security algorithm as specified in TS 33.536 [37]; an indication of activation of the 5G ProSe direct signalling security protection for the 5G ProSe direct link with the new security context, if applicable and start timer T5089. The initiating UE shall not send a new PROSE DIRECT LINK SECURITY MODE COMMAND message to the same target UE while timer T5089 is running.

NOTE 4: The PROSE DIRECT LINK SECURITY MODE COMMAND message is integrity protected (and not ciphered) at the lower layer using the new security context.

If the 5G ProSe direct link security mode control procedure was triggered during a 5G ProSe direct link re-keying procedure, the initiating UE shall provide to the lower layers an indication of activation of the 5G ProSe direct user plane security protection for the 5G ProSe direct link with the new security context, if applicable, along with the initiating UE's layer-2 ID for 5G ProSe direct communication and the target UE's layer-2 ID for 5G ProSe direct communication.

Figure 7:
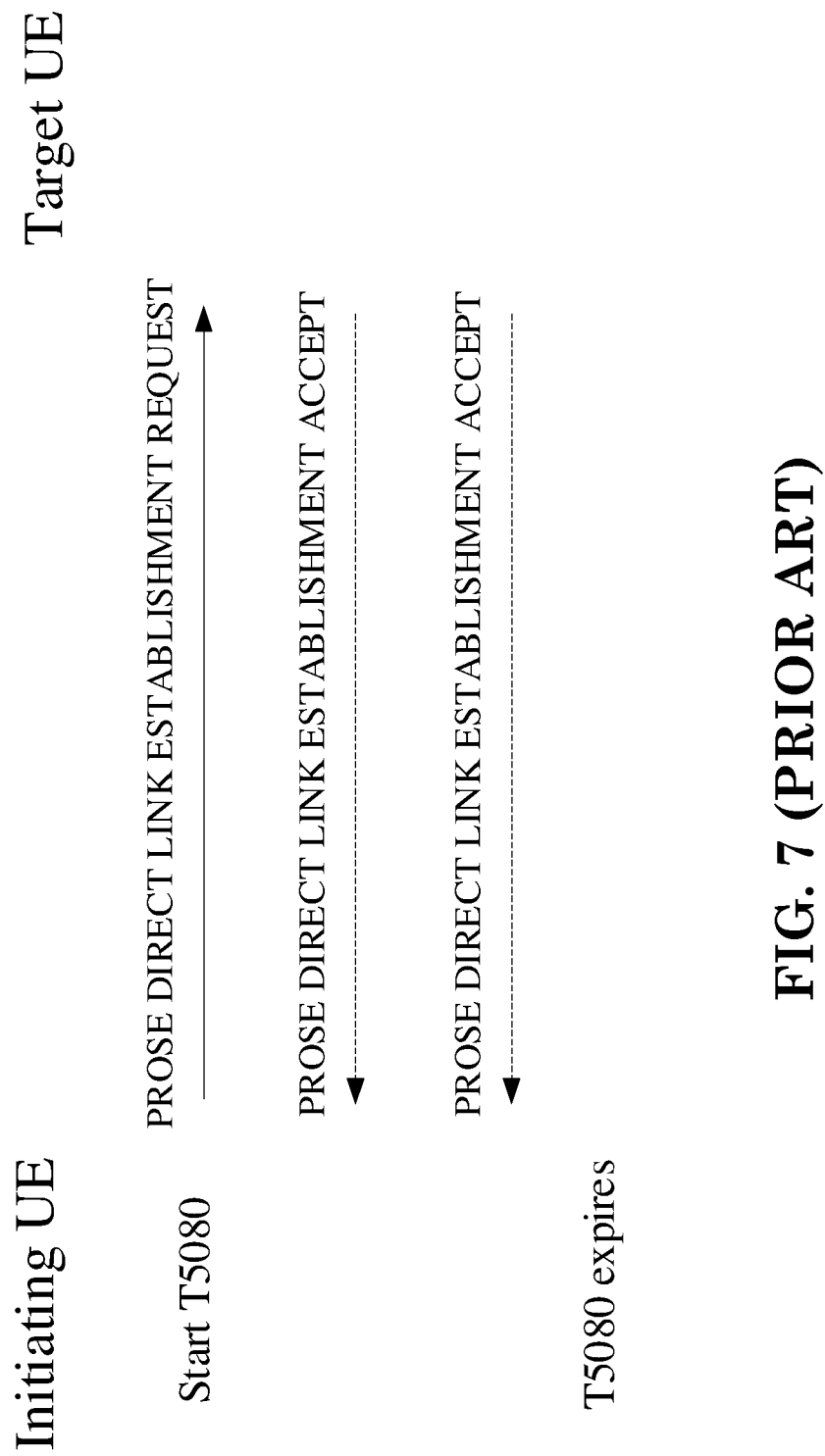
FIG. 7 is a reproduction of Figure 7.2.2.2.2 of 3GPP TS 24.554 V17.2.1.
Figure 8:
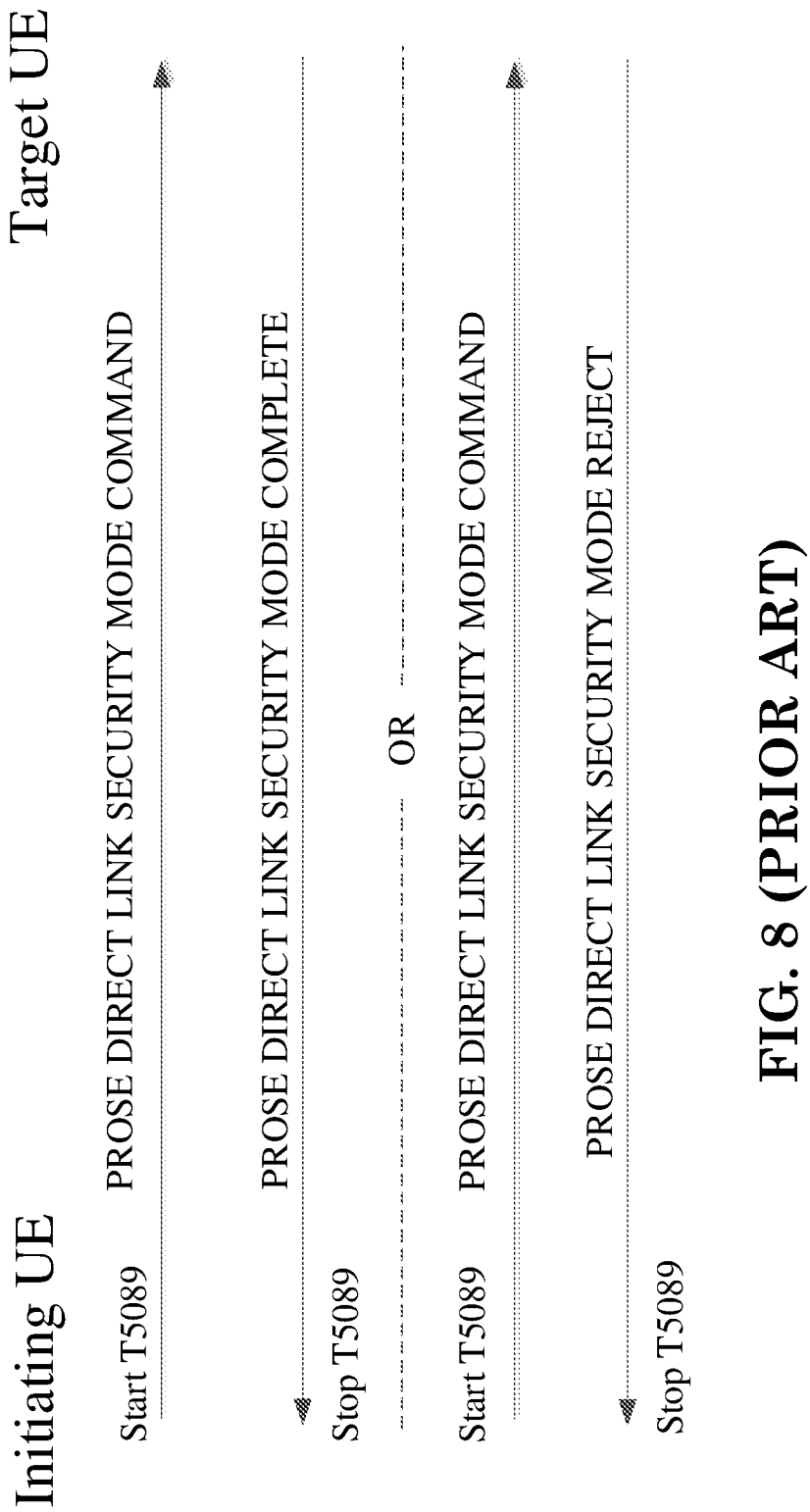
FIG. 8 is a reproduction of Figure 7.2.10.2.1 of 3GPP TS 24.554 V17.2.1.

[Figure 7.2.10.2.1 of 3GPP TS 24.554 V17.2.1, entitled "5G ProSe direct link security mode control procedure", is reproduced as FIG. 8]

7.2.10.3 5G ProSe Direct Link Security Mode Control Procedure Accepted by the Target UE Upon receipt of a PROSE DIRECT LINK SECURITY MODE COMMAND message, if a new assigned initiating UE's layer-2 ID is included and if the 5G ProSe direct link authentication procedure has not been executed, the target UE shall replace the original initiating UE's layer-2 ID with the new assigned initiating UE's layer-2 ID for 5G ProSe direct communication. The target UE shall check the selected security algorithms IE included in the PROSE DIRECT LINK SECURITY MODE COMMAND message. If "null integrity algorithm" is included in the selected security algorithms IE, the integrity protection is not offered for this 5G ProSe direct link and the signalling messages are transmitted unprotected. If "null ciphering algorithm" and an integrity algorithm other than "null integrity algorithm" are included in the selected algorithms IE, the ciphering protection is not offered for this 5G ProSe direct link and the signalling messages are transmitted unprotected. If the target UE's 5G ProSe direct signalling integrity protection policy is set to "Signalling integrity protection required", the target UE shall check the selected security algorithms IE in the PROSE DIRECT LINK SECURITY MODE COMMAND message does not include the null integrity protection algorithm. If the selected integrity protection algorithm is not the null integrity protection algorithm, the target UE shall:

a) if the direct communication is not between the 5G ProSe remote UE and the 5G ProSe UE-to-network relay UE:
   1) derive $K_{NRP\text{-}sess}$ from $K_{NRP}$, Nonce_1 and Nonce_2 received in the PROSE DIRECT LINK SECURITY MODE COMMAND message as specified in 3GPP TS 33.536 [37];
   2) derive NRPIK from $K_{NRP\text{-}sess}$ and the selected integrity algorithm as specified in 3GPP TS 33.536 [37]; and
   3) if the $K_{NRP\text{-}sess}$ is derived and the selected ciphering protection algorithm is not the null ciphering protection algorithm, then the target UE shall derive NRPEK from $K_{NRP\text{-}sess}$ and the selected ciphering algorithm as specified in 3GPP TS 33.536 [37]; or b) if the direct communication is between the 5G ProSe remote UE and the 5G ProSe UE-to-network relay UE:
   1) if the security procedure over control plane as specified in 3GPP TS 33.503 [34] is used, derive $K_{relay\text{-}sess}$ according to the security procedure over control plane, and derive $K_{relay\ int}$ from $K_{relay\text{-}sess}$ and the selected integrity algorithm as specified in 3GPP TS 33.503 [34]. If the $K_{relay\text{-}sess}$ is derived and the selected ciphering protection algorithm is not the null ciphering protection algorithm, then the target UE shall derive $K_{relay\text{-}enc}$ from $K_{relay\text{-}sess}$ and the selected ciphering algorithm as specified in 3GPP TS 33.503 [34]; or
   2) if security procedure over user plane as specified in 3GPP TS 33.503 [34] is used, derive $K_{NRP\text{-}sess}$ according to the security procedure over user plane, and derive NRPIK from $K_{NRP\text{-}sess}$ and the selected integrity algorithm as specified in 3GPP TS 33.503 [34]. If the $K_{NRP\text{-}sess}$ is derived and the selected ciphering protection algorithm is not the null ciphering protection algorithm, then the target UE shall derive NRPEK from $K_{NRP\text{-}sess}$ and the selected ciphering algorithm as specified in 3GPP TS 33.503 [34].

The target UE shall determine whether or not the PROSE DIRECT LINK SECURITY MODE COMMAND message can be accepted by:

a) checking that the selected security algorithms in the PROSE DIRECT LINK SECURITY MODE COMMAND message does not include the null integrity protection algorithm if the target UE's 5G ProSe direct signalling integrity protection policy is set to "Signalling integrity protection required";

b) asking the lower layers to check the integrity of the PROSE DIRECT LINK SECURITY MODE COMMAND message using NRPIK (or $K_{relay\text{-}int}$ when applicable) and the selected integrity protection algorithm, if the selected integrity protection algorithm is not the null integrity protection algorithm;

c) checking that the received UE security capabilities have not been altered compared to the values that the target UE sent to the initiating UE in the PROSE DIRECT LINK ESTABLISHMENT REQUEST message or PROSE DIRECT LINK REKEYING REQUEST message;

d) if the 5G ProSe direct link security mode control procedure was triggered during a 5G ProSe direct link establishment procedure,
   1) checking that the received UE 5G ProSe direct signalling security policy has not been altered compared to the values that the target UE sent to the initiating UE in the PROSE DIRECT LINK ESTABLISHMENT REQUEST message; and
   2) checking that the LSB of $K_{NRP\text{-}sess}$ ID included in the PROSE DIRECT LINK SECURITY MODE COMMAND message are not set to the same value as those received from another UE in response to the target UE's PROSE DIRECT LINK ESTABLISHMENT REQUEST message; and e) if the 5G ProSe direct link security mode control procedure was triggered during a 5G ProSe direct link re-keying procedure and the integrity protection algorithm currently in use for the 5G ProSe direct link is different from the null integrity protection algorithm, checking that the selected security algorithms in the PROSE DIRECT LINK SECURITY MODE COMMAND message do not include the null integrity protection algorithm.

If the target UE did not include a $K_{NRP}$ ID in the PROSE DIRECT LINK ESTABLISHMENT REQUEST message, the target UE included a Re-authentication indication in the PROSE DIRECT LINK REKEYING REQUEST message or the initiating UE has chosen to derive:

a) a new $K_{NRP}$ if the direct communication is not between the 5G ProSe remote UE and the 5G ProSe UE-to-network relay UE; the target UE shall derive $K_{NRP}$ as specified in 3GPP TS 33.536 [37];

b) a new $K_{NRP}$, if the direct communication is between the 5G ProSe remote UE and the 5G ProSe UE-to-network relay UE and the security procedure over user plane as specified in 3GPP TS 33.503 [34] is used, the target UE shall derive $K_{NRP}$ as specified in 3GPP TS 33.536 [37]; or c) a new $K_{NR\_ProSe}$, if the direct communication is between the 5G ProSe remote UE and the 5G ProSe UE-to-network relay UE and the security procedure over control plane as specified in 3GPP TS 33.503 [34] is used, the target UE shall derive $K_{NR\_ProSe}$ as specified in 3GPP TS 33.536 [37]; and the target UE shall choose the 2 LSBs of $K_{NRP}$ ID to ensure that the resultant $K_{NRP}$ ID will be unique in the target UE. The target UE shall form $K_{NRP}$ ID from the received MSB of $K_{NRP}$ ID and its chosen 2 LSBs of $K_{NRP}$ ID and shall store the complete $K_{NRP}$ ID with $K_{NRP}$.

If the GPI is included in the PROSE DIRECT LINK SECURITY MODE COMMAND message and the direct communication is between the 5G ProSe remote UE and the 5G ProSe UE-to-network relay UE, the target UE shall derive the PRUK and obtain the PRUK ID from the GPI, and use the PRUK in deriving the $K_{NRP}$, according to the security procedure over user plane as specified in 3GPP TS 33.503 [34].

If the target UE accepts the PROSE DIRECT LINK SECURITY MODE COMMAND message, the target UE shall create a PROSE DIRECT LINK SECURITY MODE COMPLETE message. In this message, the target UE:

a) shall include the PQFI and the corresponding PC5 QoS parameters if the direct communication is not for 5G ProSe direct communication between the 5G ProSe layer-2 remote UE and the 5G ProSe layer-2 UE-to-network relay UE;

b) if IP communication is used and the 5G ProSe direct link security mode control procedure was triggered during a 5G ProSe direct link establishment procedure, shall include an IP address configuration IE set to one of the following values:
  1) "IPv6 router" if IPv6 address allocation mechanism is supported by the target UE, i.e., acting as an IPv6 router; or
  2) "address allocation not supported" if IPv6 address allocation mechanism is not supported by the target UE;

c) if IP communication is used, the IP address configuration IE is set to "address allocation not supported" and the 5G ProSe direct link security mode control procedure was triggered during a 5G ProSe direct link establishment procedure, shall include a link local IPv6 address IE formed locally based on IETF RFC 4862 [25];

d) if a new $K_{NRP}$ was derived, shall include the 2 LSBs of $K_{NRP}$ ID; and e) if the 5G ProSe direct link security mode control procedure was triggered during a 5G ProSe direct link establishment procedure, shall include its UE 5G ProSe direct user plane security policy for this 5G ProSe direct link. In the case where the different ProSe services are mapped to the different 5G ProSe direct user plane security policies, when more than one ProSe identifier is included in the PROSE DIRECT LINK ESTABLISHMENT REQUEST message, each of the user plane security polices of those ProSe services shall be compatible, e.g., "user plane integrity protection not needed" and "user plane integrity protection required" are not compatible.

If the selected integrity protection algorithm is not the null integrity protection algorithm, the target UE shall form the $K_{NRP-sess}$ ID from the MSB of $K_{NRP-sess}$ ID it had sent in the PROSE DIRECT LINK ESTABLISHMENT REQUEST message or PROSE DIRECT LINK REKEYING REQUEST message and the LSB of $K_{NRP-sess}$ ID received in the PROSE DIRECT LINK SECURITY MODE COMMAND message. The target UE shall use the $K_{NRP-sess}$ ID to identify the new security context.

After the PROSE DIRECT LINK SECURITY MODE COMPLETE message is generated, the target UE shall pass this message to the lower layers for transmission along with the target UE's layer-2 ID for 5G ProSe direct communication and the initiating UE's layer-2 ID for 5G ProSe direct communication, NRPIK (or $K_{relay-int}$ when applicable), NRPEK (or $K_{relay-enc}$ when applicable) if applicable, $K_{NRP-sess}$ ID, the selected security algorithm as specified in 3GPP TS 33.536 [37] and an indication of activation of the 5G ProSe direct signalling security protection for the 5G ProSe direct link with the new security context, if applicable.

NOTE: The PROSE DIRECT LINK SECURITY MODE COMPLETE message and further 5G ProSe direct signalling messages are integrity protected and ciphered (if applicable) at the lower layer using the new security context.

If the 5G ProSe direct link security mode control procedure was triggered during a 5G ProSe direct link re-keying procedure, the target UE shall provide to the lower layers an indication of activation of the 5G ProSe direct user plane security protection for the 5G ProSe direct link with the new security context, if applicable, along with the initiating UE's layer-2 ID for 5G ProSe direct communication and the target UE's layer-2 ID for 5G ProSe direct communication.

7.2.10.4 5G ProSe Direct Link Security Mode Control Procedure Completion by the Initiating UE Upon receiving a PROSE DIRECT LINK SECURITY MODE COMPLETE message, the initiating UE shall stop timer T5089. If the selected integrity protection algorithm is not the null integrity protection algorithm, the UE checks the integrity of the PROSE DIRECT LINK SECURITY MODE COMPLETE message. If the integrity check passes, the initiating UE shall then continue the procedure which triggered the 5G ProSe direct link security mode control procedure. If the selected integrity protection algorithm is the null integrity protection algorithm, the UE continues the procedure without checking the integrity protection.

After receiving the PROSE DIRECT LINK SECURITY MODE COMPLETE message, the initiating UE shall delete the old security context it has for the target UE, if any.

[ . . . ]

10.3.1 ProSe Direct Link Establishment Request 10.3.1.1 Message Definition

This message is sent by a UE to another peer UE to establish a direct link. See table 10.3.1.1.1.

Message type: PROSE DIRECT LINK ESTABLISHMENT REQUEST
  Significance: dual
  Direction: UE to peer UE
  [Table 10.3.1.1.1 of 3GPP TS 24.554 V17.2.1, entitled "PROSE DIRECT LINK ESTABLISHMENT REQUEST message content", is reproduced as FIG. 9]

[ . . . ]
10.3.2 ProSe Direct Link Establishment Accept
10.3.2.1 Message Definition
This message is sent by a UE to another peer UE to accept the received PROSE DIRECT LINK ESTABLISHMENT REQUEST message. See table 10.3.2.1.1.
   Message type: PROSE DIRECT LINK ESTABLISHMENT ACCEPT
   Significance: dual
   Direction: UE to peer UE
   [Table 10.3.2.1.1 of 3GPP TS 24.554 V17.2.1, entitled "PROSE DIRECT LINK ESTABLISHMENT ACCEPT message content", is reproduced as FIG. 10]
[ . . . ]
10.3.2.4 QoS Flow Descriptions
The UE shall include this IE if:
   a) the 5G ProSe direct link establishment procedure is not for 5G ProSe direct communication between the 5G ProSe remote UE and the 5G ProSe UE-to-network relay UE; or
   b) the 5G ProSe direct link establishment procedure is for 5G ProSe direct communication between the 5G ProSe layer-3 remote UE and the 5G ProSe layer-3 UE-to-network relay UE.
10.3.2.5 QoS Rules
The UE may include this IE to indicate the PC5 QoS rules for the established PC5 QoS flow(s).
[ . . . ]
10.3.13 ProSe Direct Link Security Mode Command
10.3.13.1 Message Definition
This message is sent by a UE to another peer UE when a 5G ProSe direct link security mode control procedure is initiated. See table 10.3.13.1.1.
   Message type: PROSE DIRECT LINK SECURITY MODE COMMAND
   Significance: dual
   Direction: UE to peer UE
   Table 10.3.13.1.1 of 3GPP TS 24.554 V17.2.1, entitled "PROSE DIRECT LINK SECURITY MODE COMMAND message content", is reproduced as FIG. 11]
[ . . . ]
10.3.14 ProSe Direct Link Security Mode Complete
10.3.14.1 Message Definition
This message is sent by a UE to another peer UE to respond to a PROSE DIRECT LINK SECURITY MODE COMMAND message. See table 10.3.14.1.1.
   Message type: PROSE DIRECT LINK SECURITY MODE COMPLETE
   Significance: dual
   Direction: UE to peer UE
   [Table 10.3.14.1.1 of 3GPP TS 24.554 V17.2.1, entitled "PROSE DIRECT LINK SECURITY MODE COMPLETE message content", is reproduced as FIG. 12]
[ . . . ]
10.3.14.5 QoS Rules
The UE may include this IE to indicate the PC5 QoS rules for the PC5 QoS flow(s) to be added.
10.3.14.6 QoS Flow Descriptions
The UE shall include this IE if:
   a) the 5G ProSe direct link security mode control procedure is not for 5G ProSe direct communication between a 5G ProSe remote UE and a 5G ProSe UE-to-network relay UE; or
   b) the 5G ProSe direct link security mode control procedure is for 5G ProSe direct communication between the 5G ProSe layer-3 remote UE and the 5G ProSe layer-3 UE-to-network relay UE.

Figure 13:
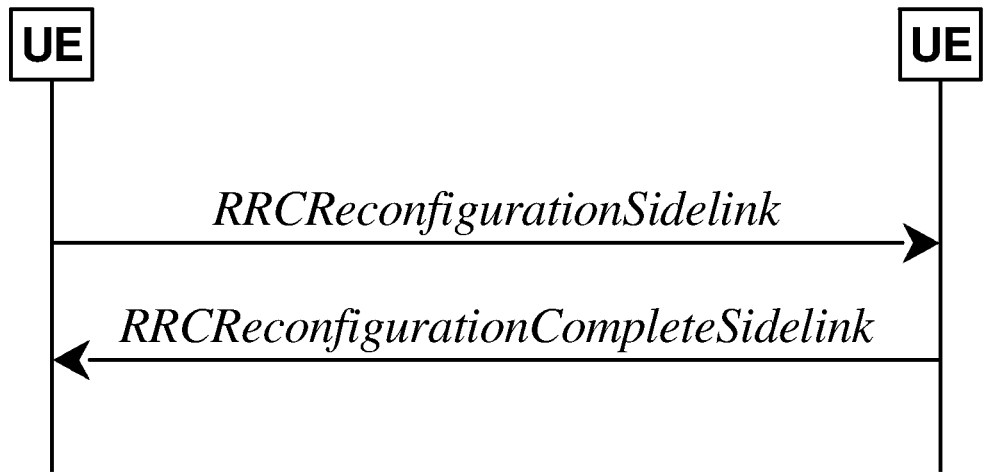
FIG. 13 is a reproduction of Figure 5.8.9.1.1-1 of 3GPP TS 38.331 V17.1.0.
Figure 14:
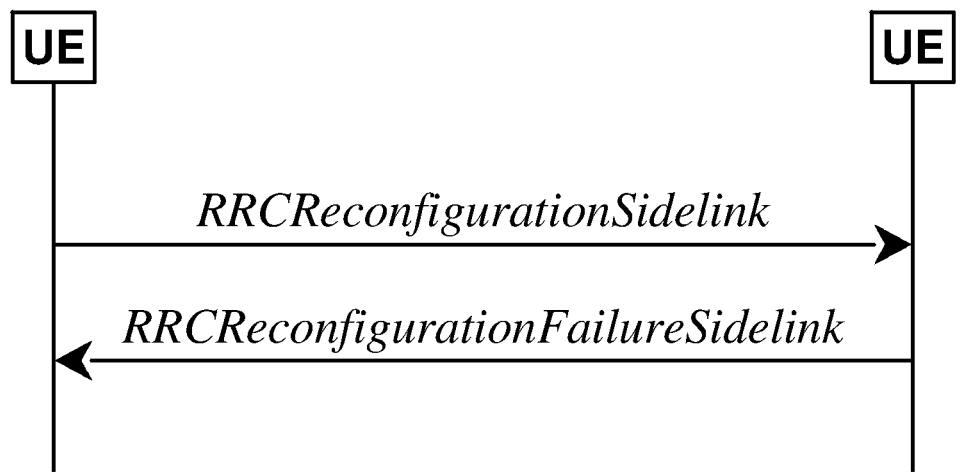
FIG. 14 is a reproduction of Figure 5.8.9.1.1-2 of 3GPP TS 38.331 V17.1.0.

3GPP TS 38.331 introduced the following:
5.8.9 Sidelink RRC Procedure
5.8.9.1 Sidelink RRC Reconfiguration
5.8.9.1.1 General
   [Figure 5.8.9.1.1-1 of 3GPP TS 38.331 V17.1.0, entitled "Sidelink RRC reconfiguration, successful", is reproduced as FIG. 13]
   Figure 5.8.9.1.1-2 of 3GPP TS 38.331 V17.1.0, entitled "Sidelink RRC reconfiguration, failure", is reproduced as FIG. 14]
The purpose of this procedure is to modify a PC5-RRC connection, e.g. to establish/modify/release sidelink DRBs or PC5 Relay RLC channels, to (re-)configure NR sidelink measurement and reporting, to (re-)configure sidelink CSI reference signal resources, to (re)configure CSI reporting latency bound, to (re)configure sidelink DRX, and to (re-)configure the latency bound of SL Inter-UE coordination report.
The UE may initiate the sidelink RRC reconfiguration procedure and perform the operation in clause 5.8.9.1.2 on the corresponding PC5-RRC connection in following cases:
   the release of sidelink DRBs associated with the peer UE, as specified in clause 5.8.9.1a.1;
   the establishment of sidelink DRBs associated with the peer UE, as specified in clause 5.8.9.1a.2;
   the modification for the parameters included in SLRB-Config of sidelink DRBs associated with the peer UE, as specified in clause 5.8.9.1a.2;
   the release of PC5 Relay RLC channels for L2 U2N Relay UE and Remote UE, as specified in clause 5.8.9.7.1;
   the establishment of PC5 Relay RLC channels for L2 U2N Relay UE and Remote UE, as specified in clause 5.8.9.7.2;
   the modification for the parameters included in SL-RLC-ChannelConfigPC5 of PC5 Relay RLC channels for L2 U2N Relay UE and Remote UE, as specified in clause 5.8.9.7.2;
   the (re-)configuration of the peer UE to perform NR sidelink measurement and report.
   the (re-)configuration of the sidelink CSI reference signal resources and CSI reporting latency bound;
   the (re-)configuration of the peer UE to perform sidelink DRX;
   the (re-)configuration of the latency bound of SL Inter-UE coordination report.
In RRC_CONNECTED, the UE applies the NR sidelink communications parameters provided in RRCReconfiguration (if any). In RRC_IDLE or RRC_INACTIVE, the UE applies the NR sidelink communications parameters provided in system information (if any). For other cases, UEs apply the NR sidelink communications parameters provided in SidelinkPreconfigNR (if any). When UE performs state transition between above three cases, the UE applies the NR sidelink communications parameters provided in the new state, after acquisition of the new configurations. Before acquisition of the new configurations, UE continues applying the NR sidelink communications parameters provided in the old state.
3GPP TS 37.355 V17.1.0 introduced the following:
5 LPP Procedures
5.1 Procedures Related to Capability Transfer
The purpose of the procedures that are grouped together in this clause is to enable the transfer of capabilities from the target device to the server. Capabilities in this context refer to positioning and protocol capabilities related to LPP and the positioning methods supported by LPP.

These procedures instantiate the Capability Transfer transaction from TS 36.305 [2] and TS 38.305 [40].

5.1.1 Capability Transfer Procedure

The Capability Transfer procedure is shown in Figure 5.1.1-1.

Figure 15:
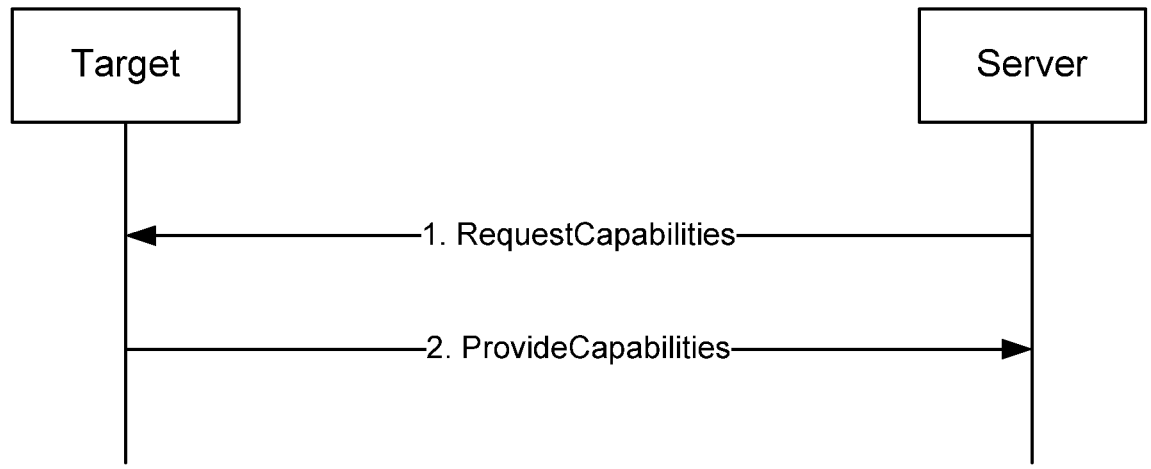
FIG. 15 is a reproduction of Figure 5.1.1-1 of 3GPP TS 37.355 V17.1.0.

[Figure 5.1.1-1 of 3GPP TS 37.355 V17.1.0, entitled "LPP Capability Transfer procedure", is reproduced as FIG. 15]

1. The server sends a RequestCapabilities message to the target. The server may indicate the types of capability needed.
2. The target responds with a ProvideCapabilities message to the server. The capabilities shall correspond to any capability types specified in step 1. This message shall include the endTransaction IE set to TRUE.

5.1.2 Capability Indication Procedure

The Capability Indication procedure allows the target to provide unsolicited capabilities to the server and is shown in Figure 5.1.2-1.

Figure 16:
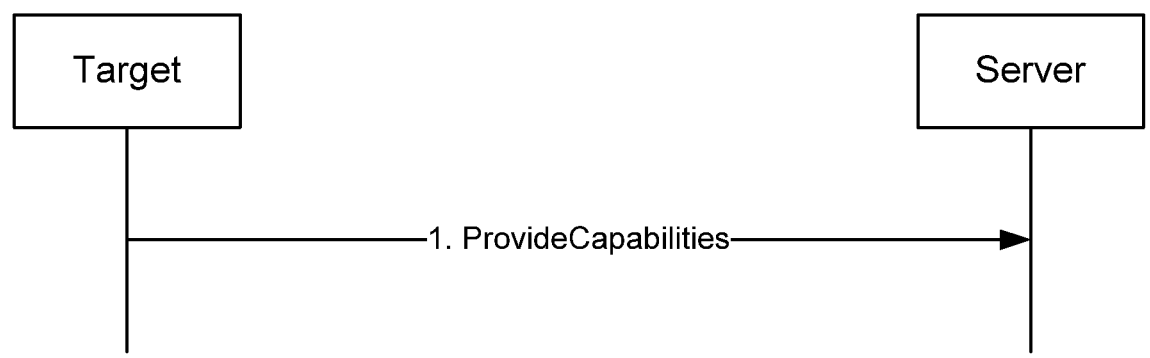
FIG. 16 is a reproduction of Figure 5.1.2-1 of 3GPP TS 37.355 V17.1.0.

[Figure 5.1.2-1 of 3GPP TS 37.355 V17.1.0, entitled "LPP Capability Indication procedure", is reproduced as FIG. 16]

1. The target sends a ProvideCapabilities message to the server. This message shall include the endTransaction IE set to TRUE.

5.1.3 Reception of LPP Request Capabilities

Upon receiving a RequestCapabilities message, the target device shall generate a ProvideCapabilities message as a response.

The target device shall:

1>for each positioning method for which a request for capabilities is included in the message:
  2>if the target device supports this positioning method:
    3>include the capabilities of the device for that supported positioning method in the response message;
1>set the IE LPP-Transaction/D in the response message to the same value as the IE LPP-Transaction/D in the received message;
1>deliver the response message to lower layers for transmission.

5.1.4 Transmission of LPP Provide Capabilities

When triggered to transmit a ProvideCapabilities message, the target device shall:

1>for each positioning method whose capabilities are to be indicated:
  2>set the corresponding IE to include the device's capabilities;
  2>if OTDOA capabilities are to be indicated:
    3>include the IE supportedBandListEUTRA;
1>deliver the response to lower layers for transmission.

5.2 Procedures Related to Assistance Data Transfer

The purpose of the procedures in this clause is to enable the target to request assistance data from the server to assist in positioning, and to enable the server to transfer assistance data to the target in the absence of a request.

These procedures instantiate the Assistance Data Transfer transaction from TS 36.305 [2] and TS 38.305 [40].

5.2.1 Assistance Data Transfer Procedure

The Assistance Data Transfer procedure is shown in Figure 5.2.1-1.

Figure 17:
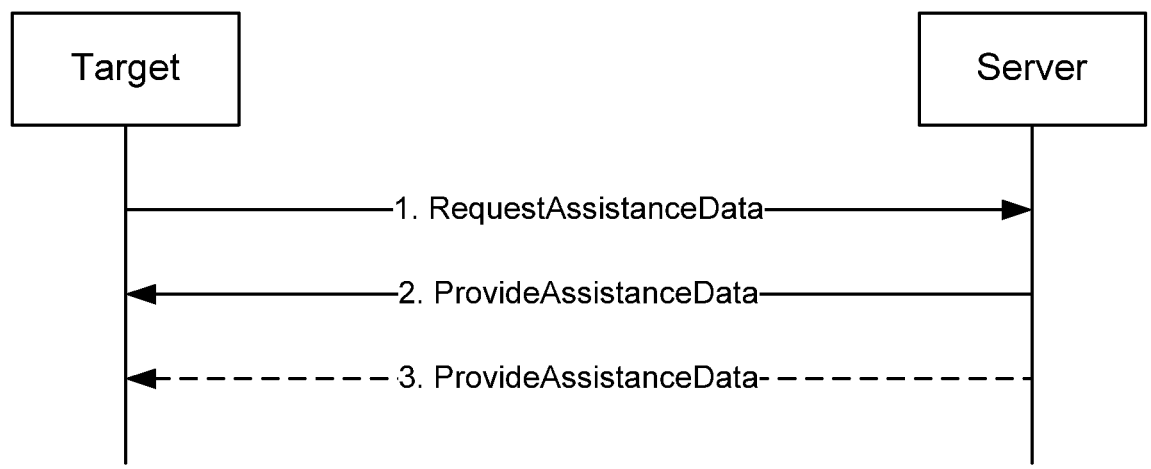
FIG. 17 is a reproduction of Figure 5.2.1-1 of 3GPP TS 37.355 V17.1.0.

[Figure 5.2.1-1 of 3GPP TS 37.355 V17.1.0, entitled "LPP Assistance data transfer procedure", is reproduced as FIG. 17]

1. The target sends a RequestAssistanceData message to the server.
2. The server responds with a ProvideAssistanceData message to the target containing assistance data. The transferred assistance data should match or be a subset of the assistance data requested in step 1. The server may also provide any not requested information that it considers useful to the target. If step 3 does not occur, this message shall set the endTransaction IE to TRUE.
3. The server may transmit one or more additional ProvideAssistanceData messages to the target containing further assistance data. The transferred assistance data should match or be a subset of the assistance data requested in step 1. The server may also provide any not requested information that it considers useful to the target. The last message shall include the endTransaction IE set to TRUE.

5.2.1a Periodic Assistance Data Transfer Procedure

The Periodic Assistance Data Transfer procedure is shown in Figure 5.2.1a-1. This procedure enables a target to request a server to send assistance data periodically.

NOTE 1: In this version of the specification, periodic assistance data transfer is supported for HA GNSS (e.g., RTK) positioning only.

Figure 18:
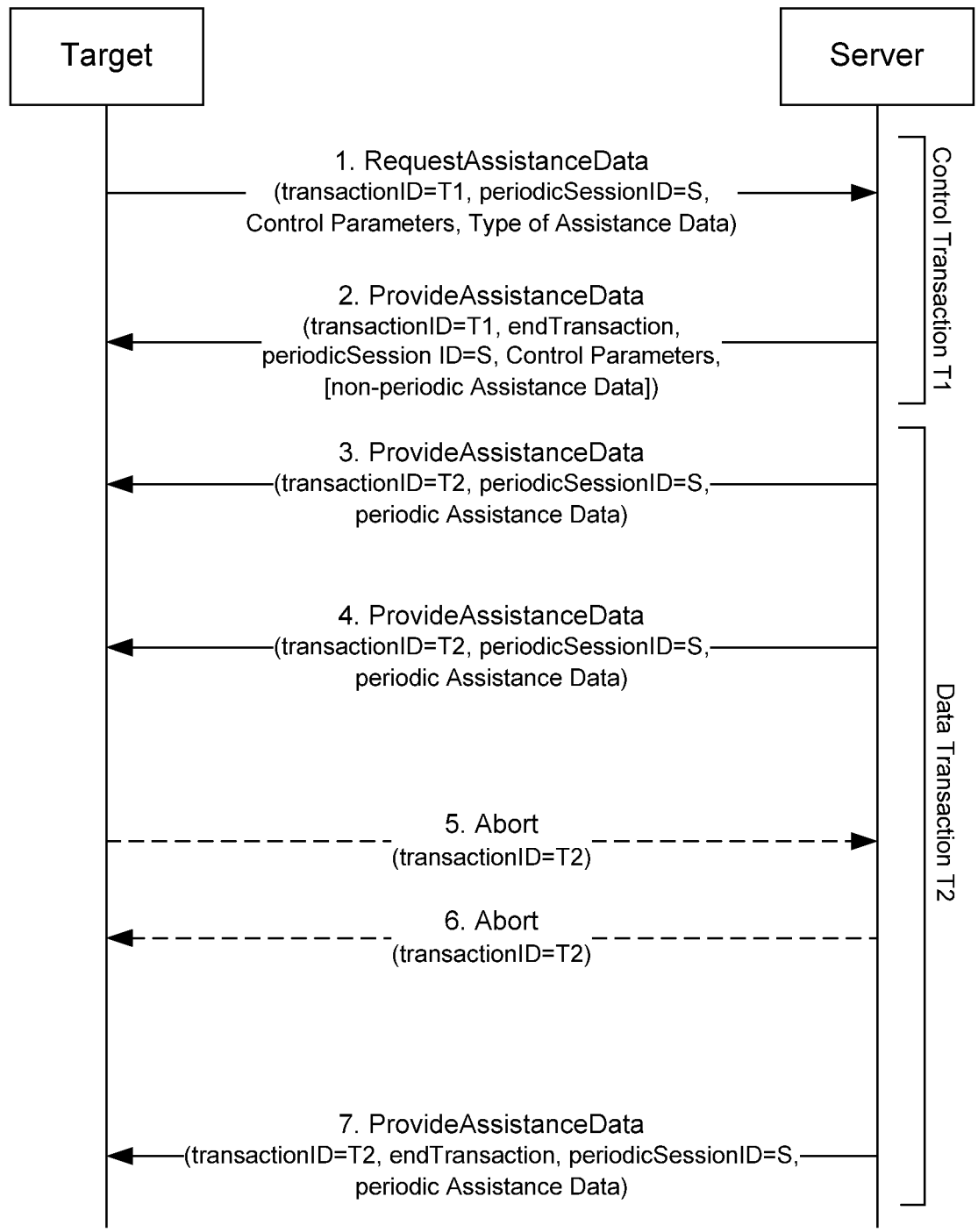
FIG. 18 is a reproduction of Figure 5.2.1a-1 of 3GPP TS 37.355 V17.1.0.

[Figure 5.2.1a-1 of 3GPP TS 37.355 V17.1.0, entitled "LPP Periodic Assistance data transfer procedure", is reproduced as FIG. 18]

1. The target sends a RequestAssistanceData message to the server using some available transactionID T1. The message contains a periodicSessionID S (different to any other periodicSessionID currently in use between the target and server) in the IE CommonIEs-RequestAssistanceData. The message also includes a positioning method specific assistance data request element (e.g., IE A-GNSS-RequestAssistanceData) identifying the type of assistance data being requested together with desired periodicity conditions for sending it and a duration for ending the assistance data transfer (e.g., in IE GNSS-PeriodicAssistDataReq).
2. The server responds with a ProvideAssistanceData message to the target. The message uses the transactionID T1 in step 1 and indicates the end of this transaction. The message contains the periodicSessionID S in IE CommonIEsProvideAssistanceData. If the request can be supported, the message contains the control parameters in the positioning method specific assistance data (e.g., IE A-GNSS-ProvideAssistanceData) which may confirm or redefine the type of assistance data or periodicity parameters requested at step 1 (e.g., in IE GNSS-PeriodicAssistData). If the target requested non-periodic assistance data in addition to the periodic assistance data in step 1, the ProvideAssistanceData message may also include the non-periodic assistance data in this step 2 (but not any periodic assistance data).

If the request cannot be supported (fully or partly), an error reason is provided in the positioning method specific IE (e.g., IE A-GNSS-Error). If the request cannot even partly be supported remaining steps are then not performed.

NOTE 2: The target device infers from an absence of the periodicSessionID that the location server does not support periodic assistance data delivery. In that case, the target device does not expect the Data Transaction (Steps 3-7).

3. When the first periodic message is available, the server sends an unsolicited ProvideAssistanceData message to the target containing the periodicSessionID S and the periodic assistance data confirmed in step 2. The message uses some available transactionID T2 that may be different to T1.

NOTE 3: The positioning method specific control parameters (e.g., IE GNSS-PeriodicAssistData) are not included in the data transaction.

4. The server may continue to send further ProvideAssistanceData messages to the target containing the periodic assistance data confirmed or redefined in step 2 when each additional periodicity condition occurs.

NOTE 4: The target device expects a ProvideAssistanceData messages at the in Step 2 confirmed interval(s). If some or all of the assistance data is not available at each periodic interval, an error indication is provided in the positioning method specific IE (e.g., IE A-GNSS-Error).

5. If the target requires the session to end, the target sends an Abort message to the server for transaction T2 that may optionally include an abortCause. Remaining steps are then omitted.

6. If the server requires the session to end, the server sends an Abort message to the target for transaction T2 that may optionally include an abortCause. Remaining steps are then omitted.

7. When the duration or other conditions for ending the periodic assistance data transfer occur, the last ProvideAssistanceData message transferred indicates the end of transaction T2.

5.2.1b Periodic Assistance Data Transfer with Update Procedure

Figure 19:
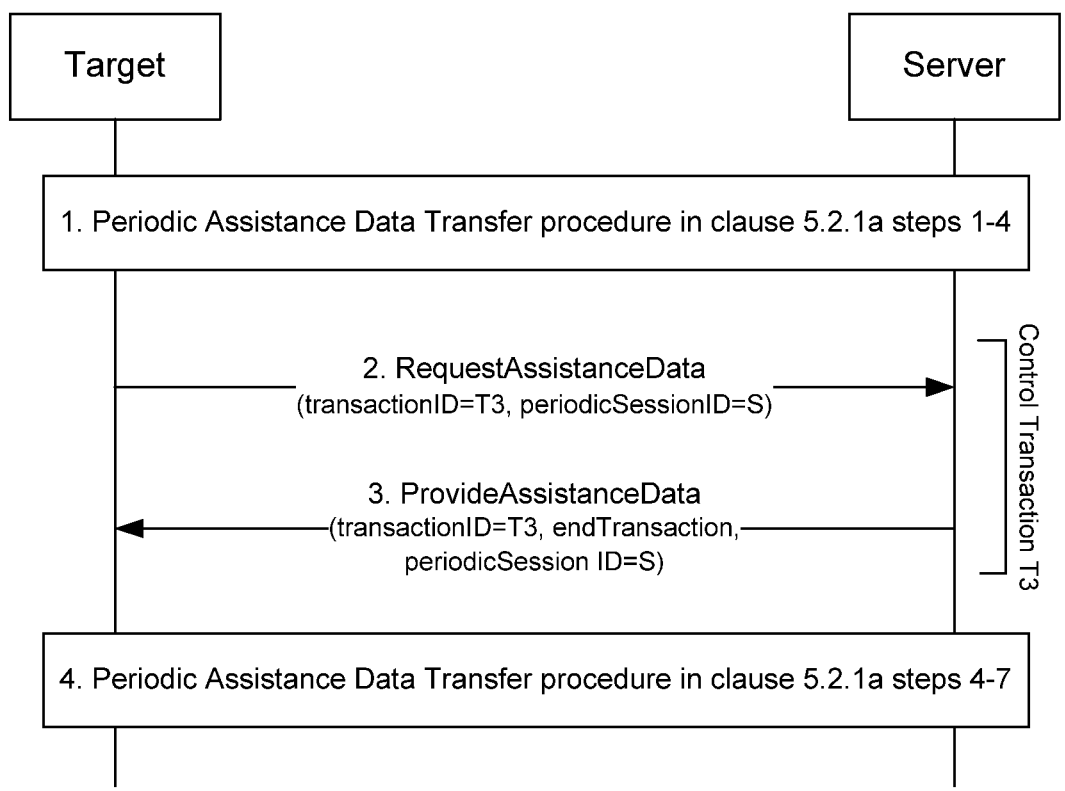
FIG. 19 is a reproduction of Figure 5.2.1b-1 of 3GPP TS 37.355 V17.1.0.

[Figure 5.2.1b-1 of 3GPP TS 37.355 V17.1.0, entitled "LPP Periodic Assistance data transfer with update procedure", is reproduced as FIG. 19]

1. Steps 1-2 and optionally steps 3-4 are performed for the Periodic Assistance Data Transfer procedure in clause 5.2.1a with the following exceptions:
   The RequestAssistanceData message in step 1 indicates the update capabilities of the target device.
   The ProvideAssistanceData message in step 2 indicates the update capabilities of the target device which are supported by the server.

2. If the target device changes its primary cell and if the update capabilities of the target device supported by the server in step 1 include update of a primary cell ID, the target device sends a RequestAssistanceData message to the server using some available transactionID T3, which is different from T2 (previously used in step 2). The message contains the periodicSessionID S (previously used in step 1) and the new primary cell ID in the IE CommonIEsRequestAssistanceData.

3. The server responds with a ProvideAssistanceData message to the target. The message uses the transactionID T3 in step 2 and indicates the end of this transaction. The message contains the periodicSessionID S in IE CommonIEsProvideAssistanceData. Steps 2-3 are repeated each time the target device changes its primary cell.

4. Steps 4-7 are performed for the Periodic Assistance Data Transfer procedure in clause 5.2.1a.

5.2.2 Assistance Data Delivery Procedure

The Assistance Data Delivery procedure allows the server to provide unsolicited assistance data to the target and is shown in Figure 5.2.2-1.

Figure 20:
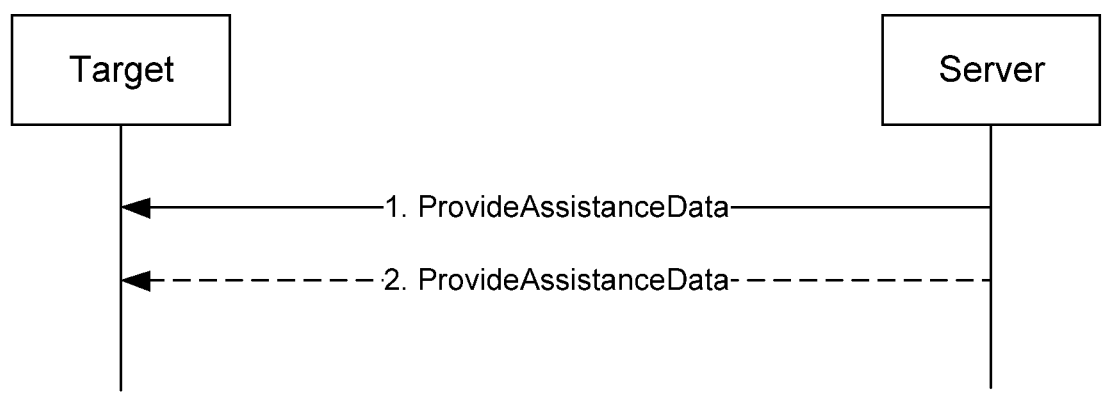
FIG. 20 is a reproduction of Figure 5.2.2-1 of 3GPP TS 37.355 V17.1.0.

[Figure 5.2.2-1 of 3GPP TS 37.355 V17.1.0, entitled "LPP Assistance data transfer procedure", is reproduced as FIG. 20]

1. The server sends a ProvideAssistanceData message to the target containing assistance data. If step 2 does not occur, this message shall set the endTransaction IE to TRUE.

2. The server may transmit one or more additional ProvideAssistanceData messages to the target containing additional assistance data. The last message shall include the endTransaction IE set to TRUE.

5.2.2a Periodic Assistance Data Delivery Procedure

The Periodic Assistance Data Delivery procedure allows the server to provide unsolicited periodic assistance data to the target and is shown in Figure 5.2.2a-1.

NOTE 1: In this version of the specification, periodic assistance data delivery is supported for HA GNSS (e.g., RTK) positioning only.

Figure 21:
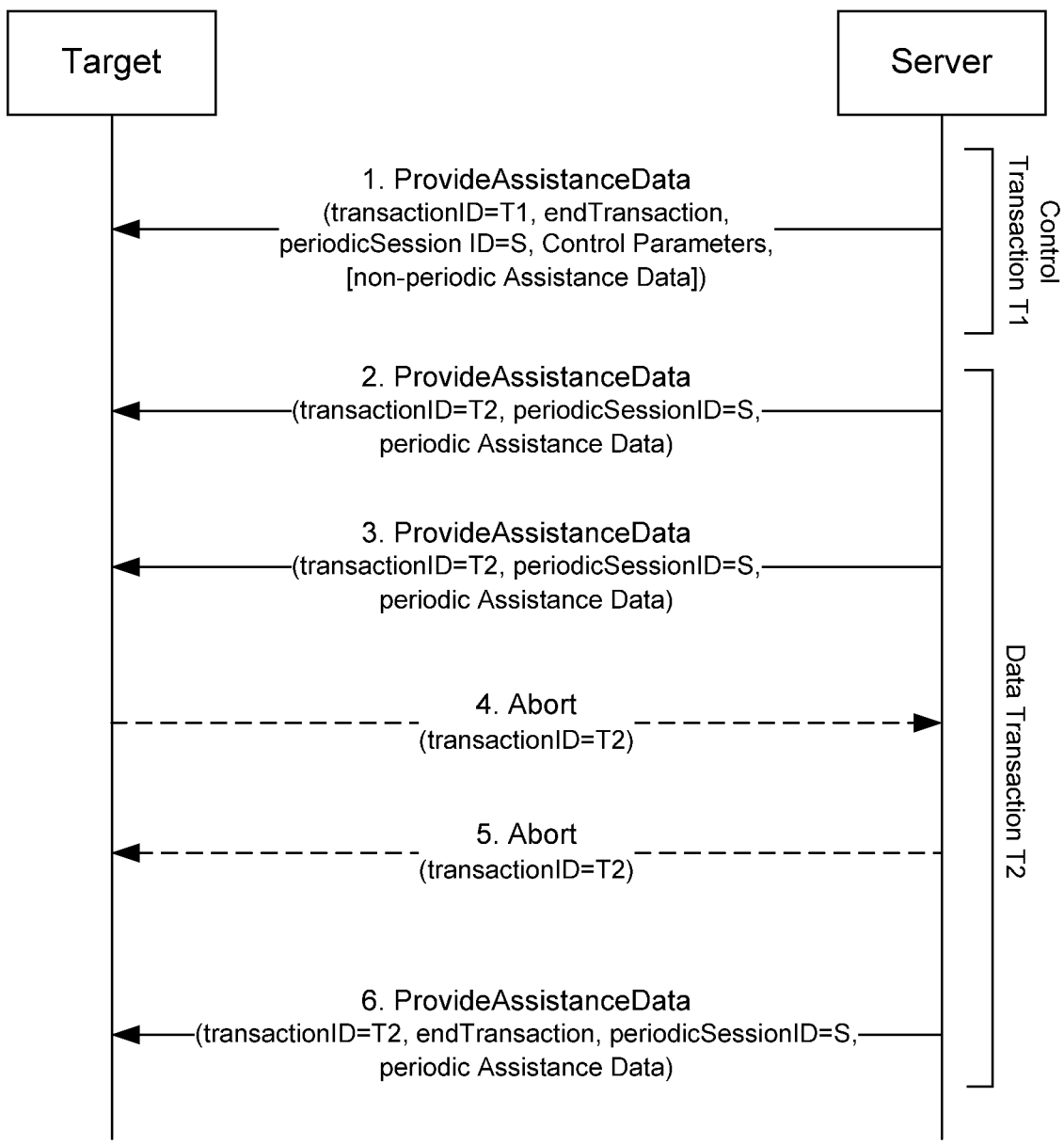
FIG. 21 is a reproduction of Figure 5.2.2a-1 of 3GPP TS 37.355 V17.1.0.

[Figure 5.2.2a-1 of 3GPP TS 37.355 V17.1.0, entitled "LPP Periodic Assistance data delivery procedure", is reproduced as FIG. 21]

1. The server sends a ProvideAssistanceData message to the target using some available transactionID T1 and indicates the end of this transaction. The message contains a periodicSessionID S (different to any other periodicSessionID currently in use between the server and target) in the IE CommonIEsProvideAssistanceData. The message includes positioning method specific assistance data control parameters (e.g., in IE A-GNSS-ProvideAssistanceData) identifying the type of periodic assistance data being delivered together with periodicity conditions for sending it and a duration for ending the assistance data delivery (e.g., in IE GNSS-PeriodicAssistData). The ProvideAssistanceData message may also include non-periodic assistance data (but not any periodic assistance data).

2. When the first periodic message is available, the server sends an unsolicited ProvideAssistanceData message to the target containing the periodicSessionID S and the periodic assistance data announced in step 1. The message uses some available transactionID T2 that may be different to T1.

NOTE 2: The positioning method specific control parameters (e.g., IE GNSS-PeriodicAssistData) are not included in the data transaction.

3. The server may continue to send further ProvideAssistanceData messages to the target containing the periodic assistance data announced in step 2 when each additional periodicity condition occurs.

NOTE 3: The target device expects a ProvideAssistanceData messages at the in Step 2 announced interval(s). If some or all of the assistance data is not available at each periodic interval, an error indication is provided in the positioning method specific IE (e.g., IE A-GNSS-Error).

4. If the target requires the session to end, the target sends an Abort message to the server for transaction T2 that may optionally include an abortCause. Remaining steps are then omitted.

5. If the server requires the session to end, the server sends an Abort message to the target for transaction T2 that may optionally include an abortCause. Remaining steps are then omitted.

6. When the duration or other conditions for ending the periodic assistance data transfer occur, the last ProvideAssistanceData message transferred indicates the end of transaction T2.

5.2.3 Transmission of LPP Request Assistance Data

When triggered to transmit a RequestAssistanceData message, the target device shall:
- 1>set the IEs for the positioning-method-specific request for assistance data to request the data indicated by upper layers.

5.2.4 Reception of LPP Provide Assistance Data

Upon receiving a ProvideAssistanceData message, the target device shall:
- 1>for each positioning method contained in the message:
  - 2>deliver the related assistance data to upper layers.

5.3 Procedures Related to Location Information Transfer

The purpose of the procedures in this clause is to enable the server to request location measurement data and/or a location estimate from the target, and to enable the target to transfer location measurement data and/or a location estimate to a server in the absence of a request.

These procedures instantiate the Location Information Transfer transaction in TS 36.305 [2] and TS 38.305 [40].

NOTE: The service layer (e.g. NAS or OMA SUPL ULP) would be used to transfer information associated with a location request from a target to a server (MO-LR).

5.3.1 Location Information Transfer Procedure

The Location Information Transfer procedure is shown in Figure 5.3.1-1.

Figure 22:
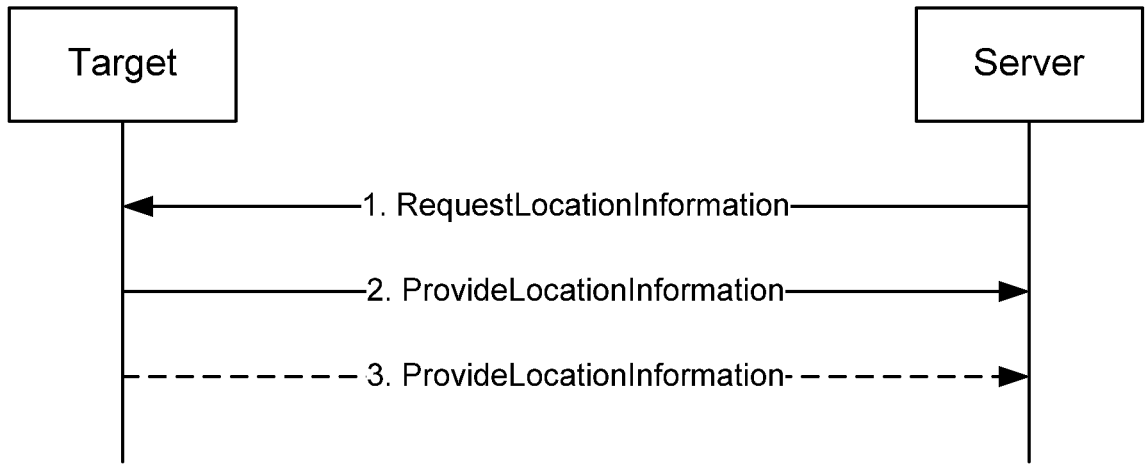
FIG. 22 is a reproduction of Figure 5.3.1-1 of 3GPP TS 37.355 V17.1.0.

Figure 5.3.1-1 of 3GPP TS 37.355 V17.1.0, entitled "LPP Location Information transfer procedure", is reproduced as FIG. 22]

1. The server sends a RequestLocationInformation message to the target to request location information, indicating the type of location information needed and potentially the associated QoS.
2. The target sends a ProvideLocationInformation message to the server to transfer location information. The location information transferred should match or be a subset of the location information requested in step 1 unless the server explicitly allows additional location information. If step 3 does not occur, this message shall set the endTransaction IE to TRUE.
3. If requested in step 1, the target sends additional ProvideLocationInformation messages to the server to transfer location information. The location information transferred should match or be a subset of the location information requested in step 1 unless the server explicitly allows additional location information. The last message shall include the endTransaction IE set to TRUE.

5.3.2 Location Information Delivery Procedure

The Location Information Delivery allows the target to provide unsolicited location information to the server. The procedure is shown in Figure 5.3.2-1.

Figure 23:
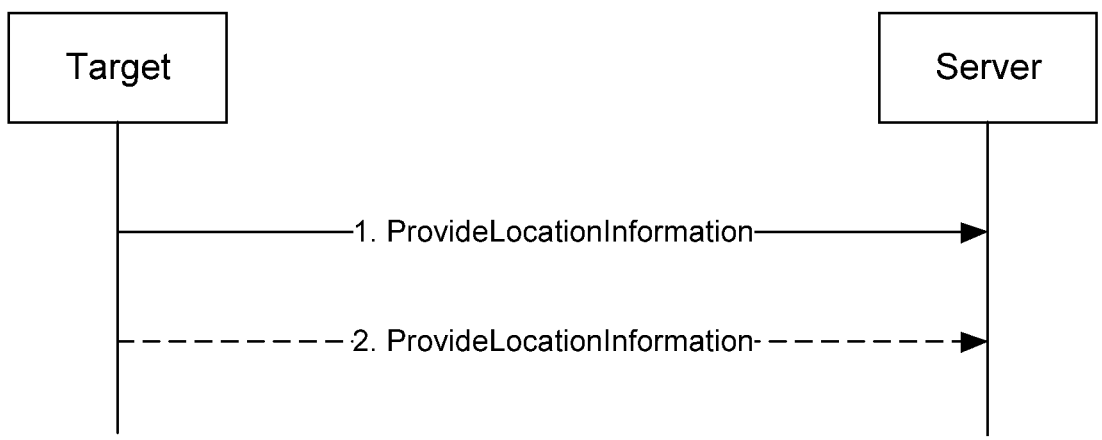
FIG. 23 is a reproduction of Figure 5.3.2-1 of 3GPP TS 37.355 V17.1.0.

[Figure 5.3.2-1 of 3GPP TS 37.355 V17.1.0, entitled "LPP Location Information Delivery procedure", is reproduced as FIG. 23]

1. The target sends a ProvideLocationInformation message to the server to transfer location information. If step 2 does not occur, this message shall set the endTransaction IE to TRUE.
2. The target may send one or more additional ProvideLocationInformation messages to the server containing additional location information data. The last message shall include the endTransaction IE set to TRUE.

5.3.3 Reception of Request Location Information

Upon receiving a RequestLocationInformation message, the target device shall:
- 1>if the requested information is compatible with the target device capabilities and configuration:
  - 2>include the requested information in a ProvideLocationInformation message;
  - 2>set the IE LPP-Transaction/D in the response to the same value as the IE LPP-Transaction/D in the received message;
  - 2>deliver the ProvideLocationInformation message to lower layers for transmission.
- 1>otherwise:
  - 2>if one or more positioning methods are included that the target device does not support:
    - 3>continue to process the message as if it contained only information for the supported positioning methods;
    - 3>handle the signaling content of the unsupported positioning methods by LPP error detection as in 5.4.3.

5.3.4 Transmission of Provide Location Information

When triggered to transmit ProvideLocationInformation message, the target device shall:
- 1>for each positioning method contained in the message:
  - 2>set the corresponding IE to include the available location information;
- 1>deliver the response to lower layers for transmission.

[ . . . ]

RequestCapabilities

The RequestCapabilities message body in a LPP message is used by the location server to request the target device capability information for LPP and the supported individual positioning methods.

```
-- ASN1START
RequestCapabilities ::= SEQUENCE {
critical Extensions           CHOICE {
        c1                    CHOICE {
            requestCapabilities-r9      RequestCapabilities-r9-IEs,
            spare3 NULL, spare2 NULL, spare1 NULL
        },
        criticalExtensionsFuture    SEQUENCE { }
    }
}
RequestCapabilities-r9-IEs ::= SEQUENCE {
    commonIEsRequestCapabilities       CommonIEsRequestCapabilities       OPTIONAL, -- Need ON
    a-gnss-RequestCapabilities         A-GNSS-RequestCapabilities         OPTIONAL, -- Need ON
    otdoa-RequestCapabilities          OTDOA-RequestCapabilities          OPTIONAL, -- Need ON
    ecid-RequestCapabilities           ECID-RequestCapabilities           OPTIONAL, -- Need
```

```
ON
    epdu-RequestCapabilities           EPDU-Sequence                          OPTIONAL,  -- Need
ON
    ...,
    [[    sensor-RequestCapabilities-r13n    Sensor-RequestCapabilities-r13         OPTIONAL,  -- Need
ON
          tbs-RequestCapabilities-r13        TBS-RequestCapabilities-r13            OPTIONAL,  -- Need
ON
          wlan-RequestCapabilities-r13       WLAN-RequestCapabilities-r13           OPTIONAL,  -- Need
ON
          bt-RequestCapabilities-r13         BT-RequestCapabilities-r13             OPTIONAL   -- Need
ON
    ]],
    [[    nr-ECID-RequestCapabilities-r16    NR-ECID-RequestCapabilities-r16        OPTIONAL,  -- Need
ON
          nr-Multi-RTT-RequestCapabilities-r16
                                             NR-Multi-RTT-RequestCapabilities-r16
                                                                                    OPTIONAL,  -- Need
ON
          nr-DL-AoD-RequestCapabilities-r16
                                             NR-DL-AoD-RequestCapabilities-r16      OPTIONAL,  -- Need
ON
          nr-DL-TDOA-RequestCapabilities-r16
                                             NR-DL-TDOA-RequestCapabilities-r16     OPTIONAL,  -- Need
ON
          nr-UL-RequestCapabilities-r16      NR-UL-RequestCapabilities-r16          OPTIONAL   -- Need
ON
    ]]
}
-- ASN1STOP
```

ProvideCapabilities
The ProvideCapabilities message body in a LPP message [30] indicates the LPP capabilities of the target device to the location server.

```
-- ASN1START
ProvideCapabilities ::= SEQUENCE {
    criticalExtensions       CHOICE {
        c1                   CHOICE {
            provideCapabilities-r9       ProvideCapabilities-r9-IEs,
            spare3 NULL, spare2 NULL, spare1 NULL
        },
        criticalExtensionsFuture    SEQUENCE { }
    }
}
ProvideCapabilities-r9-IEs ::= SEQUENCE {
    common IEsProvideCapabilities           CommonIEsProvideCapabilities       OPTIONAL,
    a-gnss-ProvideCapabilities              A-GNSS-ProvideCapabilities         OPTIONAL,
    otdoa-ProvideCapabilities               OTDOA-ProvideCapabilities          OPTIONAL,
    ecid-ProvideCapabilities                ECID-ProvideCapabilities           OPTIONAL,
    epdu-ProvideCapabilities                EPDU-Sequence                      OPTIONAL,
    ...,
    [[    sensor-ProvideCapabilities-r13    Sensor-ProvideCapabilities-r13     OPTIONAL,
          tbs-ProvideCapabilities-r13       TBS-ProvideCapabilities-r13        OPTIONAL,
          wlan-ProvideCapabilities-r13      WLAN-ProvideCapabilities-r13       OPTIONAL,
          bt-ProvideCapabilities-r13        BT-ProvideCapabilities-r13         OPTIONAL
    ]],
    [[    nr-ECID-ProvideCapabilities-r16   NR-ECID-ProvideCapabilities-r16    OPTIONAL,
          nr-Multi-RTT-ProvideCapabilities-r16
                                            NR-Multi-RTT-ProvideCapabilities-r16   OPTIONAL,
          nr-DL-AoD-ProvideCapabilities-r16
                                            NR-DL-AoD-ProvideCapabilities-r16  OPTIONAL,
          nr-DL-TDOA-ProvideCapabilities-r16
                                            NR-DL-TDOA-ProvideCapabilities-r16 OPTIONAL,
          nr-UL-ProvideCapabilities-r16     NR-UL-ProvideCapabilities-r16      OPTIONAL
    ]]
}
-- ASN1STOP
```

RequestAssistanceData
The RequestAssistanceData message body in a LPP message is used by the target device to request assistance data from the location server.

```
-- ASN1START
RequestAssistanceData : := SEQUENCE {
    criticalExtensions          CHOICE {
              c1                CHOICE {
                 requestAssistanceData-r9     RequestAssistanceData-r9-IEs,
                 spare3 NULL, spare2 NULL, spare1 NULL
              },
              criticalExtensionsFuture   SEQUENCE { }
    }
}
RequestAssistanceData-r9-IEs ::= SEQUENCE {
    commonIEsRequestAssistanceData            CommonIEsRequestAssistanceData              OPTIONAL,
    a-gnss-RequestAssistanceData              A-GNSS-RequestAssistanceData                OPTIONAL,
    otdoa-RequestAssistanceData               OTDOA-RequestAssistanceData                 OPTIONAL,
    epdu-RequestAssistanceData                EPDU-Sequence                               OPTIONAL,
    ...,
    [[       sensor-RequestAssistanceData-r14
                                              Sensor-RequestAssistanceData-r14            OPTIONAL,
             tbs-RequestAssistanceData-r14    TBS-RequestAssistanceData-r14               OPTIONAL,
             wlan-RequestAssistanceData-r14   WLAN-RequestAssistanceData-r14              OPTIONAL
    ]],
    [[       nr-Multi-RTT-RequestAssistanceData-r16    NR-Multi-RTT-RequestAssistanceData-r16    OPTIONAL,
             nr-DL-AoD-RequestAssistanceData-r16       NR-DL-AoD-RequestAssistanceData-r16       OPTIONAL,
             nr-DL-TDOA-RequestAssistanceData-r16      NR-DL-TDOA-RequestAssistanceData-r16      OPTIONAL
    ]]
}
-- ASN1STOP
```

ProvideAssistanceData
The ProvideAssistanceData message body in a LPP message is used by the location server to provide assistance data to the target device either in response to a request from the target device or in an unsolicited manner.

```
-- ASN1START
ProvideAssistanceData ::= SEQUENCE {
    criticalExtensions      CHOICE {
           c1               CHOICE {
              provideAssistanceData-r9    ProvideAssistanceData-r9-IEs,
              spare3 NULL, spare2 NULL, spare1 NULL
           },
           criticalExtensionsFuture   SEQUENCE { }
    }
}
ProvideAssistanceData-r9-IEs ::= SEQUENCE {
    commonIEsProvideAssistanceData            CommonIEsProvideAssistanceData        OPTIONAL,   -- Need ON
    a-gnss-ProvideAssistanceData              A-GNSS-ProvideAssistanceData          OPTIONAL,   -- Need ON
    otdoa-ProvideAssistanceData               OTDOA-ProvideAssistanceData           OPTIONAL,   -- Need ON
    epdu-Provide-Assistance-Data              EPDU-Sequence                         OPTIONAL,   -- Need ON
    ...,
    [[
    sensor-ProvideAssistanceData-r14          Sensor-ProvideAssistanceData-r14      OPTIONAL,   -- Need ON
    tbs-ProvideAssistanceData-r14             TBS-ProvideAssistanceData-r14         OPTIONAL,   -- Need ON
    wlan-ProvideAssistanceData-r14            WLAN-ProvideAssistanceData-r14        OPTIONAL    -- Need ON
    ]],
    [[       nr-Multi-RTT-ProvideAssistanceData-r16
                                              NR-Multi-RTT-ProvideAssistanceData-r16    OPTIONAL,   -- Need ON
             nr-DL-AoD-ProvideAssistanceData-r16
                                              NR-DL-AoD-ProvideAssistanceData-r16    OPTIONAL,   -- Need
```

```
ON
        nr-DL-TDOA-ProvideAssistanceData-r16
                                    NR-DL-TDOA-ProvideAssistanceData-r16
                                                                              OPTIONAL  -- Need
ON
  ]]
}
-- ASN1STOP
```

RequestLocationInformation
The RequestLocationInformation message body in a LPP message is used by the location server to request positioning measurements or a position estimate from the target device.

```
-- ASN1START
RequestLocationInformation ::= SEQUENCE {
  criticalExtensions          CHOICE {
          c1              CHOICE {
              requestLocationInformation-r9            RequestLocationInformation-r9-IEs,
              spare3 NULL, spare2 NULL, spare1 NULL
          },
          criticalExtensionsFuture    SEQUENCE { }
  }
}
RequestLocationInformation-r9-IEs :: = SEQUENCE {
  commonIEsRequestLocationInformation
                                    CommonIEsRequestLocationInformation    OPTIONAL,   -- Need
ON
  a-gnss-RequestLocationInformation   A-GNSS-RequestLocationInformation    OPTIONAL,   -- Need
ON
  otdoa-RequestLocationInformation    OTDOA-RequestLocationInformation     OPTIONAL,   -- Need
ON
  ecid-RequestLocationInformation     ECID-RequestLocationInformation      OPTIONAL,   -- Need
ON
  epdu-RequestLocationInformation     EPDU-Sequence                        OPTIONAL,   -- Need
ON
  ...,
  [[
  sensor-RequestLocationInformation-r13
                                    Sensor-RequestLocationInformation-r13
                                                                           OPTIONAL,   -- Need
ON
  tbs-RequestLocationInformation-r13  TBS-RequestLocationInformation-r13   OPTIONAL,   -- Need
ON
  wlan-RequestLocationInformation-r13 WLAN-RequestLocationInformation-r13  OPTIONAL,   -- Need
ON
  bt-RequestLocationInformation-r13   BT-RequestLocationInformation-r13    OPTIONAL    -- Need
ON
  ]],
  [[      nr-ECID-RequestLocationInformation-r16
                                    NR-ECID-RequestLocationInformation-r16
                                                                           OPTIONAL,   -- Need
ON
          nr-Multi-RTT-RequestLocationInformation-r16
                                    NR-Multi-RTT-RequestLocationInformation-r16
                                                                           OPTIONAL,   -- Need
ON
          nr-DL-AoD-RequestLocationInformation-r16
                                    NR-DL-AoD-RequestLocationInformation-r16
                                                                           OPTIONAL,   -- Need
ON
          nr-DL-TDOA-RequestLocationInformation-r16
                                    NR-DL-TDOA-RequestLocationInformation-r16
                                                                           OPTIONAL    -- Need
ON
  ]]
}
-- ASN1STOP
```

| RequestLocationInformation field descriptions |
|---|
| commonIEsRequestLocationInformation
This field specifies the location information type requested by the location server and optionally other configuration information associated with the requested location information. This field should always be included in this version of the protocol. |

ProvideLocationInformation

The ProvideLocationInformation message body in a LPP message is used by the target device to provide positioning measurements or position estimates to the location server.

```
-- ASN1START
ProvideLocationInformation ::= SEQUENCE {
    criticalExtensions          CHOICE {
                    c1              CHOICE {
                        provideLocationInformation-r9       ProvideLocationInformation-r9-IEs,
                        spare3 NULL, spare2 NULL, spare1 NULL
                    },
                    criticalExtensionsFuture    SEQUENCE { }
    }
}
ProvideLocationInformation-r9-IEs :: = SEQUENCE {
    common IEsProvideLocationInformation
                                                CommonIEsProvideLocationInformation     OPTIONAL,
    a-gnss-ProvideLocationInformation           A-GNSS-ProvideLocationInformation       OPTIONAL,
    otdoa-ProvideLocationInformation            OTDOA-ProvideLocationInformation        OPTIONAL,
    ecid-ProvideLocationInformation             ECID-ProvideLocationInformation         OPTIONAL,
    epdu-ProvideLocationInformation             EPDU-Sequence                           OPTIONAL,
    ...,
    [[
    sensor-ProvideLocationInformation-r13
                                                Sensor-ProvideLocationInformation-r13
                                                                                        OPTIONAL,
    tbs-ProvideLocationInformation-r13          TBS-ProvideLocationInformation-r13      OPTIONAL,
    wlan-ProvideLocationInformation-r13         WLAN-ProvideLocationInformation-r13     OPTIONAL,
    bt-ProvideLocationInformation-r13           BT-ProvideLocationInformation-r13       OPTIONAL
    ]],
    [[              nr-ECID-ProvideLocationInformation-r16
                                NR-ECID-ProvideLocationInformation-r16                  OPTIONAL,
                    nr-Multi-RTT-ProvideLocationInformation-r16
                                NR-Multi-RTT-ProvideLocationInformation-r16             OPTIONAL,
                    nr-DL-AoD-ProvideLocationInformation-r16
                                NR-DL-AoD-ProvideLocationInformation-r16                OPTIONAL,
                    nr-DL-TDOA-ProvideLocationInformation-r16
                                NR-DL-TDOA-ProvideLocationInformation-r16               OPTIONAL
    ]]
}
-- ASN1STOP
```

3GPP TS 38.305 introduced the following:

6.4 Signalling Between an LMF and UE 6.4.1 Protocol Layering

Figure 6.4.1-1 shows the protocol layering used to support transfer of LPP messages between an LMF and UE. The LPP PDU is carried in NAS PDU between the AMF and the UE.

Figure 24:
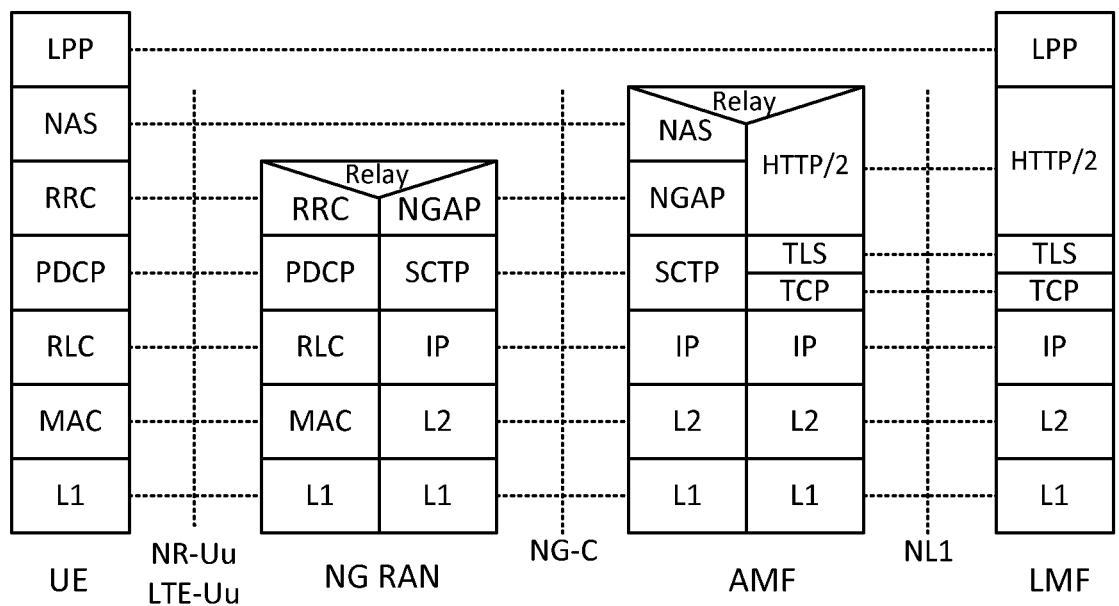
FIG. 24 is a reproduction of Figure 6.4.1-1 of 3GPP TS 38.305 V17.1.0.

[Figure 6.4.1-1 of 3GPP TS 38.305 V17.1.0, entitled "Protocol Layering for LMF to UE Signalling", is reproduced as FIG. 24]

6.4.2 LPP PDU Transfer

Figure 6.4.2-1 shows the transfer of an LPP PDU between an LMF and UE, in the network- and UE-triggered cases. These two cases may occur separately or as parts of a single more complex operation.

Figure 25:
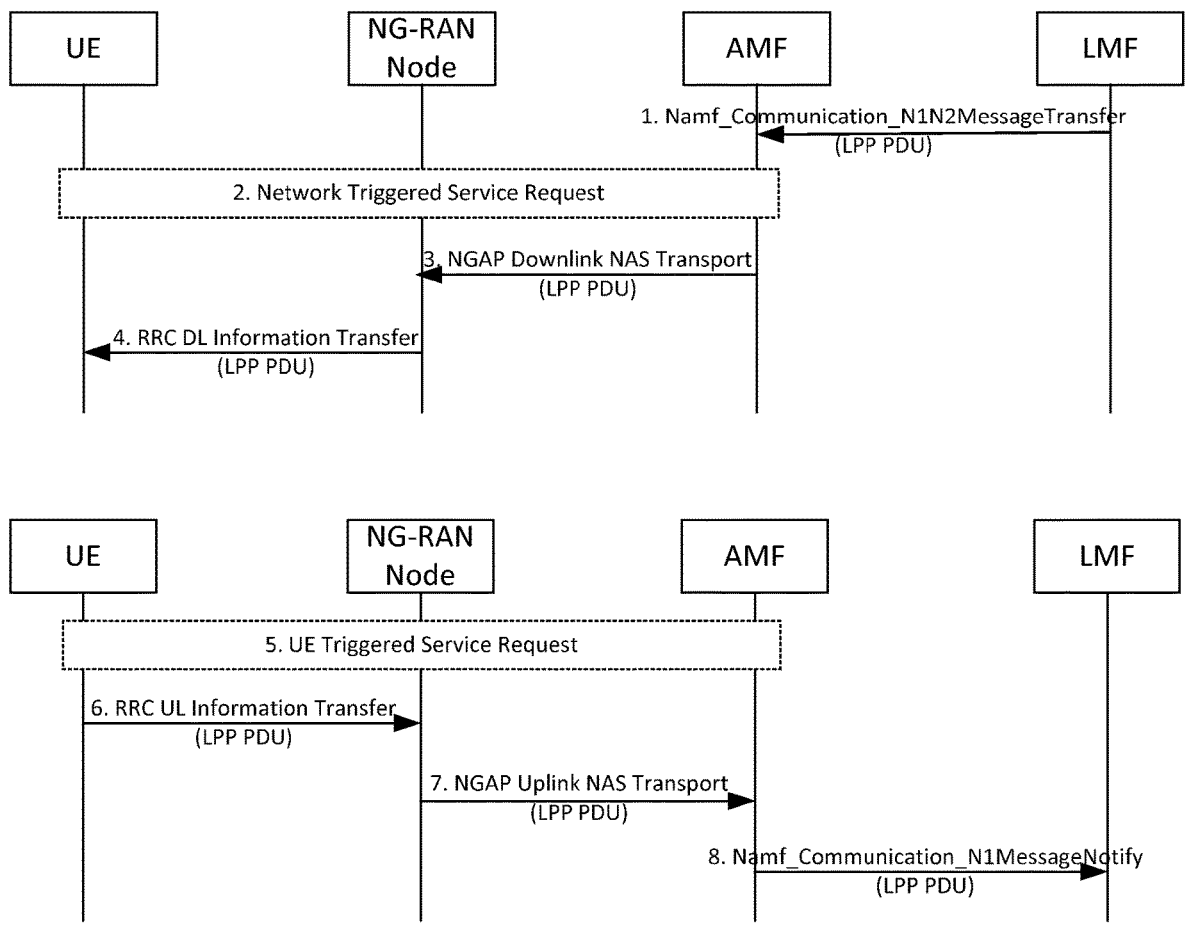
FIG. 25 is a reproduction of Figure 6.4.2-1 of 3GPP TS 38.305 V17.1.0.

[Figure 6.4.2-1 of 3GPP TS 38.305 V17.1.0, entitled "LPP PDU transfer between LMF and UE (network- and UE-triggered cases)", is reproduced as FIG. 25]

1. Steps 1 to 4 may occur before, after, or at the same time as steps 5 to 8. Steps 1 to 4 and steps 5 to 8 may also be repeated. Steps 1 to 4 are triggered when the LMF needs to send an LPP message to the UE as part of some LPP positioning activity. The LMF then invokes the Namf_Communication_N1N2MessageTransfer service operation towards the AMF to request the transfer of a LPP PDU to the UE. The service operation includes the LPP PDU together with the LCS Correlation ID in the N1 Message Container as defined in TS 29.518 [28].

2. If the UE is in CM-IDLE state (e.g. if the NG connection was previously released due to data and signalling inactivity), the AMF initiates a network triggered service request as defined in TS 23.502 [26] in order to establish a signalling connection with the UE and assign a serving NG-RAN node.

3. The AMF includes the LPP PDU in the payload container of a DL NAS Transport message, and a Routing Identifier identifying the LMF in the Additional Information of the DL NAS Transport message defined in TS 24.501 [29]. The AMF then sends the DL NAS Transport message to the serving NG-RAN Node in an NGAP Downlink NAS Transport message defined in TS 38.413 [30]. The AMF need not retain state information for this transfer; it can treat any response in step 7 as a separate non-associated transfer.

4. The NG-RAN Node forwards the DL NAS Transport message to the UE in an RRC DL Information Transfer message.

5. Steps 5 to 8 are triggered when the UE needs to send an LPP PDU to the LMF as part of some LPP positioning activity. If the UE is in CM-IDLE state, the UE instigates a UE triggered service request as defined in TS 23.502 [26] in order to establish a signalling connection with the AMF and assign a serving NG-RAN node.

6. The UE includes the LPP PDU in the payload container of an UL NAS Transport message, and the Routing Identifier, which has been received in step 4, in the Additional Information of the UL NAS Transport message defined in TS 24.501 [29]. The UE then sends the UL NAS Transport message to the serving NG-RAN node in an RRC UL Information Transfer message.

7. The NG-RAN node forwards the UL NAS Transport Message to the AMF in an NGAP Uplink NAS Transport message.

8. The AMF invokes the Namf_Communication_ N1MessageNotify service operation towards the LMF indicated by the Routing Identifier received in step 7. The service operation includes the LPP PDU received in step 7 together with the LCS Correlation ID in the N1 Message Container as defined in TS 29.518 [28].

3GPP TR 23.700-86 introduced the following:

3.1 Terms

For the purposes of the present document, the terms given in TR 21.905 [1] and the following apply. A term defined in the present document takes precedence over the definition of the same term, if any, in TR 21.905 [1].

Ranging: refers to the determination of the distance between two UEs or more UEs and/or the direction of one UE (i.e. Target UE) from another UE (i.e. Reference UE) via PC5 interface. SL Reference UE: A UE, supporting positioning of target UE, e.g. by transmitting and/or receiving reference signals for positioning, providing positioning-related information, etc. using sidelink.

NOTE 1: SL Reference UE is understood as "Anchor UE" in RAN WG1 TR 38.859 [21].

NOTE 2: "Reference UE" mentioned in KIs and Solutions of this TR refers to "SL Reference UE".

Target UE: A UE whose distance, direction and/or position is measured with the support from one or multiple SL Reference UEs using Sidelink in the Ranging based service and Sidelink positioning.

Assistant UE: A UE supporting Ranging/Sidelink Positioning between a SL Reference UE and a Target UE over PC5, when the direct Ranging/Sidelink positioning between the SL Reference UE and Target UE cannot be supported. The measurement/result of Ranging/Sidelink Positioning between the Assistant UE and the SL Reference UE and that between the Assistant UE and the Target UE are determined and used to derive the Ranging/Sidelink Positioning result between Target UE and SL Reference UE.

Located UE: A SL Reference UE of which the location is known or is able to be known using Uu based positioning. A Located UE can be used to determine the location of a Target UE using Sidelink Positioning.

SL Positioning Server UE: A UE offering location calculation, for Sidelink Positioning and Ranging based service. It interacts with other UEsover PC5 as necessary in order to calculate the location of the Target UE. Target UE or SL Reference UE can act as SL Positioning Server UE if location calculation is supported.

SL Positioning Client UE: A third-party UE, other than SL Reference UE and Target UE, which initiates Ranging/Sidelink positioning service request on behalf of the application residing on it.

NOTE 3: The SL Positioning Client UE does not have to support Ranging/Sidelink positioning capability, but a communication between the SL Positioning Client UE and SL Reference UE/Target UE has to be established, either via PC5 or via 5GC, for the transmission of the service request and the result.

Sidelink Positioning: Positioning UE using PC5 to obtain absolute position, relative position, or ranging information.

Positioning: A functionality, which detects a geographical location and optionally, velocity (of e.g. a mobile terminal).

Networkassisted Operation: Operation of Ranging/Sidelink Positioning with the involvement of 5GC NFs for the service request handling and result calculation.

UE-only Operation: Operation of Ranging/Sidelink Positioning in which the service request handling and result calculation are performed by UE.

NOTE 4: For UE-only Operation, the communication among UEs are over PC5.

Relative position: An estimate of the UE position relative to other network elements or relative to other UEs.

Editor's note: Definition on the terminology of Ranging and Sidelink positioning will be aligned with RAN WGs, and will be revisited when there's any conclusion in RAN WGs.

Application Layer ID: an identifier identifying a Ranging/SL Positioning-enabled UE within the context of a specific application, is used by the SL Positioning Client UE to identify the target UE and the SL Reference UE in the service request.

[ . . . ]

4.3 General Reference Architecture 4.3.1 General

Figure 4.3.1-1 shows a reference architecture for Sidelink Positioning and Ranging-based services for non-roaming operation. In this case, the UE A and UE B that are involved in Sidelink Positioning and Ranging-based services have subscription from the same PLMN. The reference architecture also supports the case that UE-A or UE-B or both are not registered to the network or not in coverage. UE C and UE D may be out of coverage, or with partial network coverage. For simplicity, this figure only shows target UE and reference UE (i.e. UE-A, UE-B, UE-C and UE-D), and there could also be Assistant UE, Located UE and SL Positioning Server UE in the architecture as per the solution.

NOTE 1: Other 5GC entities not marked with the SL positioning/Ranging label may still need to be involved in SL positioning/Ranging.

Figure 26:
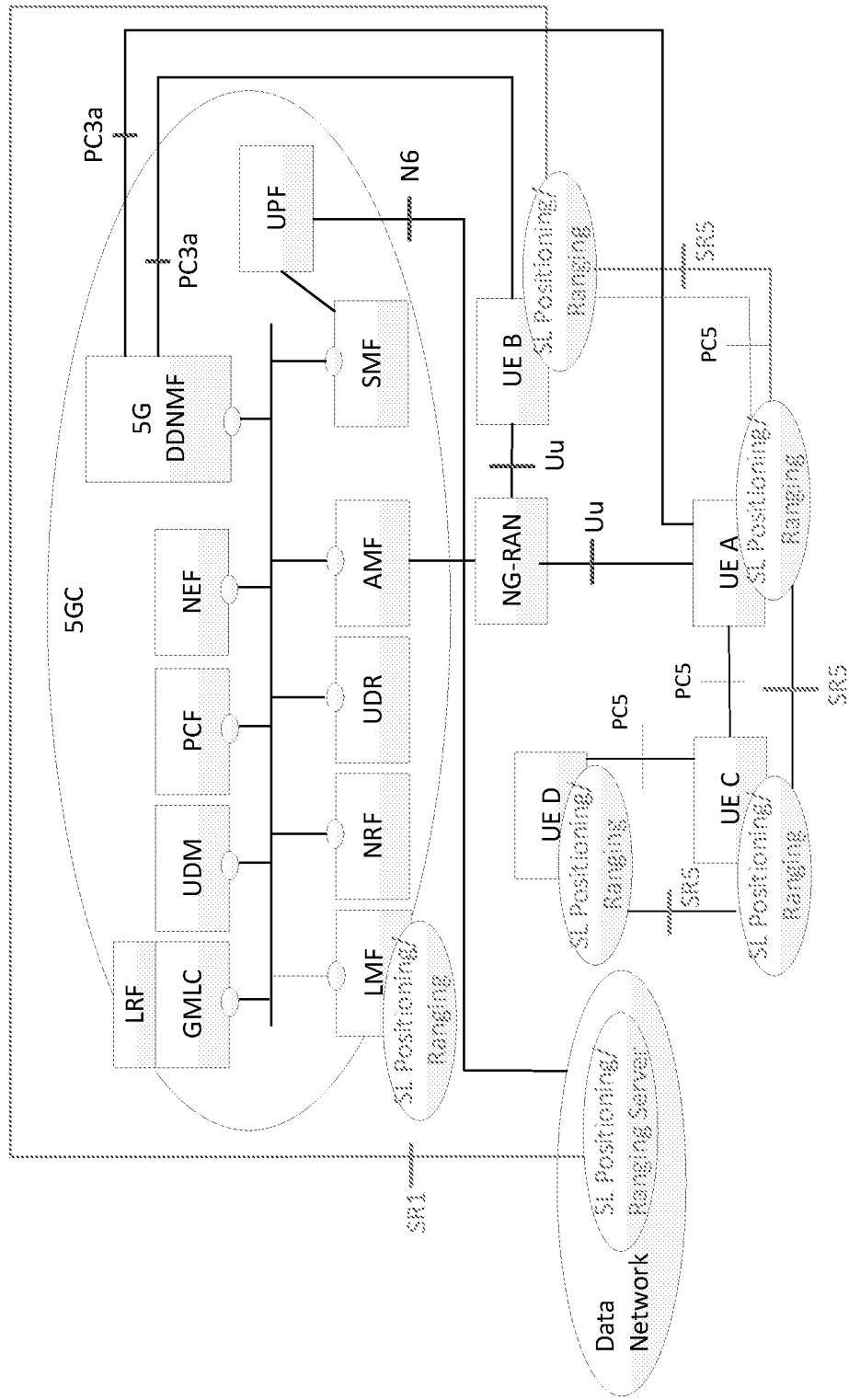
FIG. 26 is a reproduction of Figure 4.3.1-1 of 3GPP TR 23.700-86 V1.0.0.

[Figure 4.3.1-1 of 3GPP TR 23.700-86 V1.0.0, entitled "Reference architecture for Sidelink Positioning and Ranging-based services for non-roaming and same PLMN operation", is reproduced as FIG. 26]

[ . . . ]

4.3.2 Functional Descriptions

Sidelink Positioning and Ranging-based services are supported based on the architectures in clause 4.3.1, with the following reference points:

SR1: The reference point between the UE Sidelink (SL) Positioning and Ranging function in the UE and the SL Positioning/Ranging Server. This reference point is out of scope of this specification. It may be used for the configuration and application layer signaling.

SR5: The reference point between the Sidelink (SL) Positioning and Ranging function in UEs. It is carried over the PC5 reference point.

Editor's note: Whether SR5 will be over PC5-RRC, PC5-D, PC5-U and/or PC5-S will be aligned with RAN WGs.

PC5: The reference point between the UEs. It also supports the Sidelink Positioning and Ranging operation defined by RAN WGs.

[ . . . ]

5.3 Key Issue #3: Ranging/Sidelink Positioning Device Discovery 5.3.1 General Description This KI maps to WT 1.3 of the SID. This KI addresses both UE triggered and network triggered Ranging/Sidelink Positioning.

In most of the cases, the 2 or more UE(s) in a Ranging based service and sidelink positioning cannot always be aware of each other even when they are in proximity.

To enable a Reference observer UE and a target UE to be able to perform measurement and communicate for delivering measurement data, the UEs have to be discovered by each other first.

The discovery procedure is used for a UE to discover or to be discovered by other UE(s) in proximity over the PC5 interface with the aim of performing Ranging and Sidelink Positioning. Reference UE and Target UE are 2 roles in the Ranging based service and Sidelink Positioning, in terms of who provides the reference plane and reference direction. Either one can be discovered by the other.

Ranging/Sidelink Positioning device discovery may be triggered at the UEs themselves and/or based on network instruction (e.g. under network monitoring, when, within which distance/angle or which UE(s) can be discovered).

Following aspects need to be addressed under this key issue:
1. How Reference UEs and Target UEs are discovered by each other to perform Ranging based service and Sidelink Positioning for the case of in coverage, partial coverage and out of coverage for both UE triggered and network triggered Ranging/Sidelink Positioning, with the following considerations:
   How one Target UE and one Reference UE are discovered by each other?
   How one Target UE and multiple Reference UEs are discovered by each other?
   How one Reference UE and multiple target UEs are discovered by each other?
   NOTE 1: ProSe direct discovery procedure should be reused as much as possible.
2 How Ranging/Sidelink Positioning devices' discovery is triggered at UE based on network instruction for the cases of in coverage, partial coverage and out of coverage?
   NOTE 2: It is assumed that both the Reference UE(s) and the target UE are Ranging/SL positioning capable.

5.4 Key Issue #4: Control of Operations for Ranging/Sidelink Positioning 5.4.1 General Description Ranging and sidelink positioning supports a large variety of use cases, including automotive, public safety, and commercial use. These different uses cases may utilize different access technologies for the communication between the UEs, e.g. LTE based V2X, NR based sidelinks and, in later releases, other RAT technologies may be supported over PC5, e.g. newer version of sidelink and non-3GPP RATs. Therefore, it is beneficial to design a common framework and system to support all these types of operations.

The control signalling part of the Ranging and Sidelink Positioning operation may occur between the UEs before and after the transmission of the Ranging/Sidelink positioning signals. The control signalling includes (but is not limited to):

coordination and configuration of the UEs to participate in the ranging/sidelink positioning, e.g. including discovery of the devices, signalling control and configuration information between devices;

exchange of measurement results of Ranging/Sidelink positioning signals between the UEs for ranging/Sidelink positioning calculation.

This key issue is focusing on developing the control signalling for Ranging and Sidelink Positioning operations. Specifically, the key issue addresses:
   What coordination and configuration information are exchanged between the UEs?
   What are the control signalling procedure to exchange the coordination & configuration information and the Ranging/Sidelink positioning signals measurement results between the UEs?
   NOTE 1 Common solution is preferred to be developed if the same control signalling procedure can be supported when the signalling is carried over different RATs in different use cases.
   NOTE 2: Common control signalling protocol is preferred to support the different Ranging/Sidelink positioning signals operation in different spectrums.
   NOTE 3: The solution development may also consider signalling efficiency, overhead, energy efficiency and the robustness.
   NOTE 4: Coordination with RAN WGs is needed to develop an aligned solution.
   NOTE 5: It is desirable to avoid any AS layer impacts to support the control signalling.
      What are the functionality of upper layers, and what parameters need to be exchanged between the upper layers and AS layer for Ranging/Sidelink positioning?

[ . . . ]

6.3 Solution #3: Solution for Direct Ranging Operation 6.3.1 General

This solution resolves Key Issue #4 for Operation controls for Ranging/Sidelink positioning. In particular, this solution tries to solve what coordination and configuration information are exchanged between the UEs, and how to exchange the coordination and configuration information and the ranging results between the UEs.

In general, this solution proposes three steps in the direct Ranging operation:
   The upper layer (e.g. Ranging layer) performs the ranging parameter coordination between the UEs, and the upper layer provides the ranging configuration to the AS layer. The ranging configuration includes the Ranging role (Reference UE or Target UE), one time or period ranging, ranging for distance or direction measurement or both.
   The lower layer (e.g. AS layer) transmits or receives Ranging signalling and performs measurements according to the ranging configuration;
   The UE calculates the ranging results, and the ranging results could be shared between the UEs via the upper layer.

6.3.2 Procedures

Figure 27:
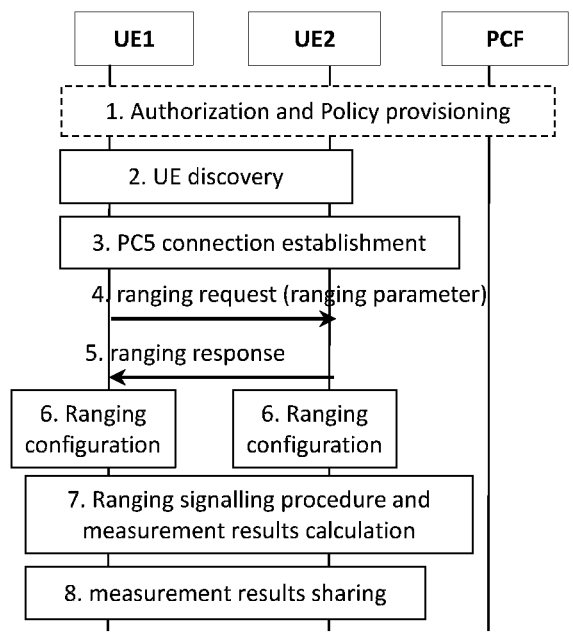
FIG. 27 is a reproduction of Figure 6.3.2-1 of 3GPP TR 23.700-86 V1.0.0.

[Figure 6.3.2-1 of 3GPP TR 23.700-86 V1.0.0, entitled "high-level procedure for Ranging operation control", is reproduced as FIG. 27]
1. UE1 and UE2 may get the ranging authorization policy and parameters from PCF during the registration procedure. The ranging authorization policy and parameters may include whether the UE is authorized as Reference UE or Target UE.

2. When the UE1 gets the ranging request from the application layer, other UE or 5GC NF, UE1 can discovery UE2 by using the solutions for KI #3 Ranging/Sidelink Positioning device discovery.
3. UE1 and UE2 can perform the PC5 connection establishment, as defined in TS 23.304 [4].
NOTE: PC5 connection is established for the signalling interaction of ranging parameters between two UEs. This step is optionally needed only when Ranging/Sidelink positioning is between two UEs.
4. UE1 sends the ranging request to the UE2 to negotiate the ranging parameters, and the ranging request can be a new PC5-S signalling carried by the PC5 connection. The ranging request includes the ranging parameters, e.g. the Ranging role (Reference UE or Target UE), one time or period ranging, ranging for distance or direction measurement or both.
Editor's note: The parameters coordinated between the 2 UEs will be further evaluated.
   UE1 can determinate the Ranging role based on the ranging authorization in step 1 or ranging capability (capability as Reference UE or Target UE). For example, the UE1 decides to act as Reference UE, then the Ranging role means that "I am Reference UE" or "you are Target UE".
   UE1 can get the one time or period ranging, ranging for distance or direction measurement or both from the application layer when the application layer sends the ranging request to the upper layer (e.g. Ranging layer).
5. UE2 sends the ranging response to the UE1. If UE2 wants to change the Ranging role (e.g. UE2 wants to act as Reference UE), for example due to its ranging capability, a new Ranging role is included.
6. The upper layer of each UE provides the ranging configuration to the AS layer. The ranging configuration includes the Ranging role (Reference UE or Target UE), one time or period ranging, ranging for distance or direction measurement or both.
7. The AS layer of each UE transmits or receives Ranging signalling according to the ranging configuration, and the Reference UE calculates the ranging results. For example, for direction measurement, Target UE transmits Ranging signalling and Reference UE receives it accordingly.
   Editor's note: Coordination with RAN WGs is needed on whether and how the ranging configuration is used.
8. The ranging results could be shared between the UEs via e.g. the PC5-S signalling.

6.3.3 Impacts on Services, Entities, and Interfaces
UE:
   Receives the ranging authorization policy and parameters from PCF;
   Inter-layer communication regarding the configuration for ranging operation;
   Inter-UE communication regarding parameters negotiation for ranging service and possibly further sharing of the ranging results.

6.4 Solution #4: Ranging Devices Discovery and Ranging Procedure
6.4.1 Description
This solution is related to the Key Issue #3 on Ranging/Sidelink Positioning device discovery and Key issue #4: Control of Operations for Ranging/Sidelink positioning.
To realize the Ranging/Sidelink Positioning, as explained in KI #4, the signalling between the UEs is needed for the purpose of Ranging/Sidelink Positioning control to exchange the coordination & configuration information and the Ranging/Sidelink positioning signals measurement results, it, is very similar to the LPP procedure between UE and LMF over NAS (e.g. capability transfer, Assistance Data Transfer, Location Information Transfer specified in 6.4 of TS 38.305 [16]). Correspondingly, this solution is proposed to add a Ranging/Sidelink Positioning Protocol layer on top of existing direct communication protocol as specified in clause 6.1 of TS 23.304 [4], and clause 5.2.1 of TS 23.287 [3] for the Ranging/Sidelink Positioning control signalling interaction between UEs.

Figure 28:
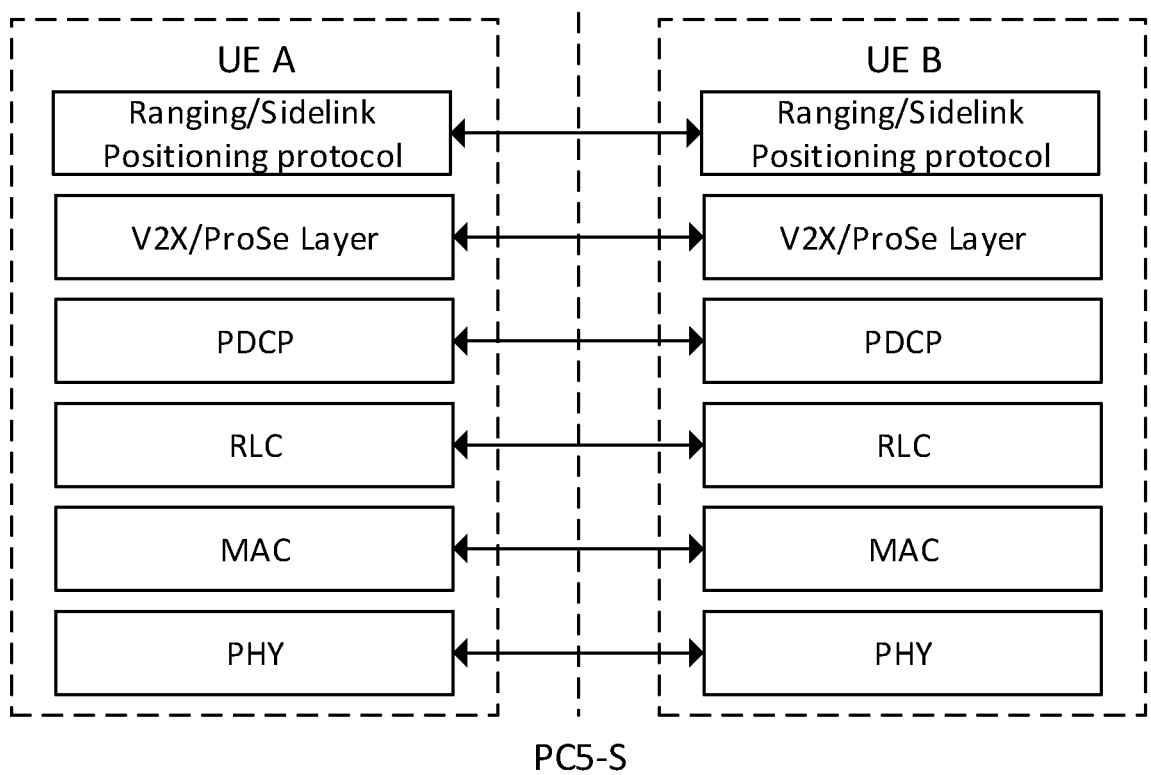
FIG. 28 is a reproduction of Figure 6.4.1-1 of 3GPP TR 23.700-86 V1.0.0.

[Figure 6.4.1-1 of 3GPP TR 23.700-86 V1.0.0, entitled "Ranging/sidelink Positioning protocol over PC5 reference point", is reproduced as FIG. 28]

Similar to LPP over Uu interface, the Ranging/Sidelink Positioning Protocol (RSPP) may include the following procedures as described in clause 6.4.2.4:
   Procedures related to capability transfer for Ranging/Sidelink Positioning between UEs;
   Procedures related to Assistance Data Transfer for Ranging/Sidelink Positioning between UEs;
   Procedures related to Location Information Transfer for Ranging/Sidelink Positioning between UEs.
   NOTE: Details of the RSPP procedures in this solution are expected to be developed in RAN WGs.
   Editor's note: Texts related to RSPP may be further updated once there's any conclusion in RAN Working Groups.
   Editor's note: Whether a new Ranging/Sidelink positioning protocol is defined or an enhancement to LPP to support Ranging/Sidelink positioning is defined will be determined by RAN Working Groups.

6.4.2 Procedures of Ranging/Sidelink Positioning for 5G ProSe
6.4.2.1 General
To realize the control of operations for Ranging/Sidelink positioning, following procedure is assumed to be performed:
   Ranging/Sidelink Positioning device discovery;
   Direct communication establishment for Ranging/Sidelink Positioning protocol procedure;
   Ranging/Sidelink Positioning procedure.
The following procedures are for UEs that support 5G ProSe PC5 reference point as defined in TS 23.304 [4].
   Editor's note: Solutions on device discovery for UE supporting V2X PC5 reference as defined in TS 23.287 [3] may be provided in other solutions.
Existing Model A and Model B direct discovery as specified in clause 6.3.2.1 of TS 23.304 [4] are reused as basis for Ranging/Sidelink Positioning devices discovery.
Existing Unicast mode 5G ProSe Direct Communication establishment procedure as specified in clause 6.4.3 of TS 23.304 [4] are reused.

6.4.2.2 Procedures of Ranging/Sidelink Positioning Between 2 UEs with Model a Discovery

Figure 29:
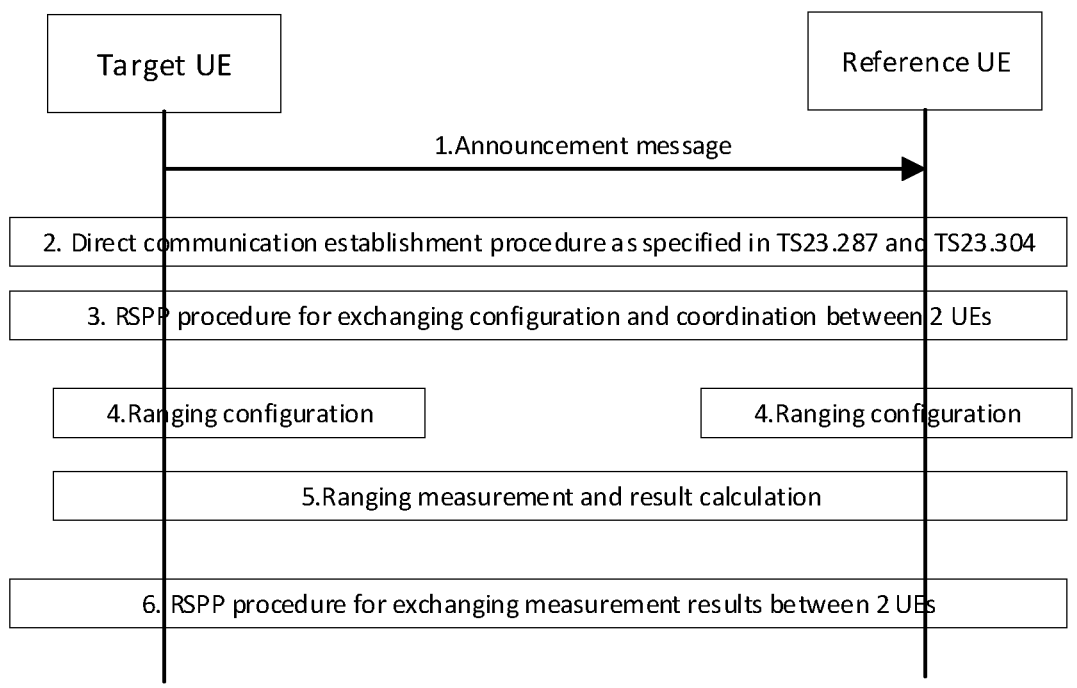
FIG. 29 is a reproduction of Figure 6.4.2.2-1 of 3GPP TR 23.700-86 V1.0.0.

[Figure 6.4.2.2-1 of 3GPP TR 23.700-86 V1.0.0, entitled "High-level procedure of Ranging/Sidelink Positioning with Model A discovery", is reproduced as FIG. 29]

In this procedure, Reference UE and Target UE can take the design of UE Assisted and UE Based Positioning Procedure as specified in clause 6.11.1 of TS 23.273 [11] to enable the Ranging/Sidelink Positioning.
   1. The Target UE sends an Announcement message. The Announcement message may include the Type of Discovery Message, Target UE info, Ranging/Sidelink Positioning service Code, Role indication (target UE) and Target UE capability (e.g. ranging support).
2. Reference UEs monitor the Announcement message. If the Target info is the Reference UE to be discovered, the Reference UEs have the interests on the Ranging service and support the Ranging/Sidelink Positioning capability of the Target UE if any, the Reference UE performs the direct PC5 link establishment procedure with target UE as described in clause 6.4.3.1 of TS 23.304 [4].
3. The Target UE and the Reference UE perform the Ranging/Sidelink Positioning control interaction procedure to exchange the coordination & configuration information, e.g. the Ranging capability and Ranging Assistance Data, as described in clause 6.4.2.4.
NOTE: The PC5 message carrying RSPP message is consider as new kind of PC5-S message in this solution.
Editor's note: How to handle the definition of PC5-S message carrying RSPP message is FFS.
4. Target UE and the Reference UE pass the interacted coordination & configuration information down to the AS layer.
5. Target UE and the Reference UE perform the Ranging/Sidelink Positioning measurement and result calculation.
6. The Target UE and the Reference UE perform the Ranging/Sidelink Positioning control interaction procedure to exchange Ranging/Sidelink Positioning measurement results as described in clause 6.4.2.5, and then provide the measurement results to the RSPP layer.

6.4.2.3 Procedures of Ranging/Sidelink Positioning Between 2 UEs with Model B Discovery

Figure 30:
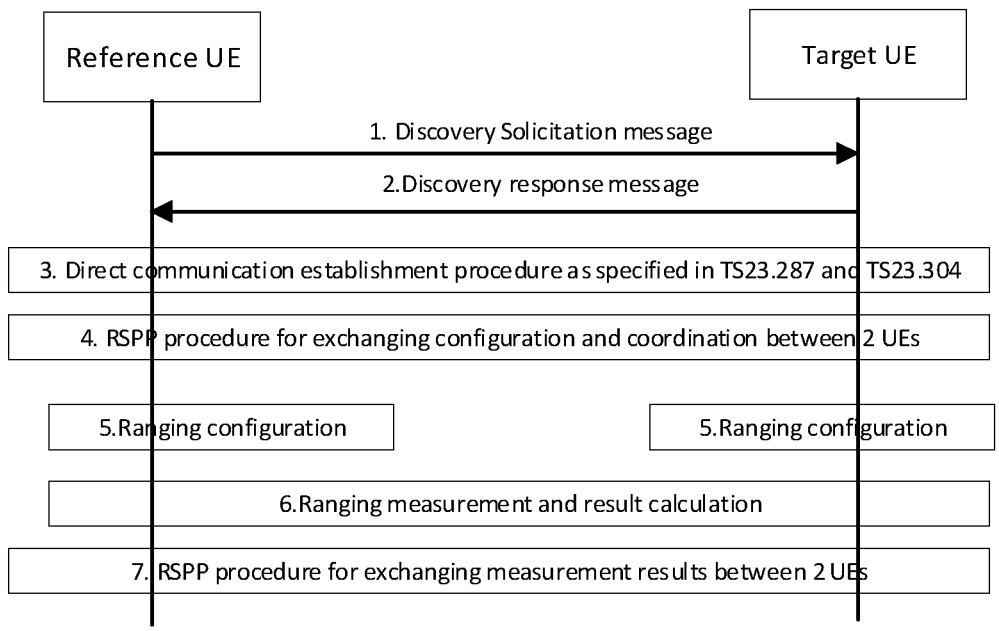
FIG. 30 is a reproduction of Figure 6.4.2.3-1 of 3GPP TR 23.700-86 V1.0.0.

[Figure 6.4.2.3-1 of 3GPP TR 23.700-86 V1.0.0, entitled "High-level procedure of Ranging/Sidelink Positioning with Model B discovery", is reproduced as FIG. 30]

In this procedure, Reference UE and Target UE can take the design of UE Assisted and UE Based Positioning Procedure as specified in clause 6.11.1 of TS 23.273 [11] to enable the Ranging/Sidelink Positioning.
1. The Reference UE sends a Solicitation message. The Solicitation message may include Type of Discovery Message, Ranging/Sidelink Positioning service Code, Reference UE info, Target UE info, Role indication (Reference UE) and Reference UE capability.
2. Target UE monitors the Solicitation message. If the Target UE decides to be discovered and ranged based on the included Target info and the Reference UE capability in the Solicitation message, the Target UE responds to the Reference UE with a Discovery response message. The Discovery response message may include the Target UE capability.
3. After the target UE discovery, the Reference UE performs the PC5 Unicast communication establishment with target UE.
4-7. This step is same as the step 3~6 of Figure 6.4.2.2-1.
NOTE: Reference UE can also initiate the discovery procedure to discover a Target UE.

6.4.2.4 RSPP Procedures to Exchange the Coordination & Configuration Information 6.4.2.4.1 RSPP Procedures to Exchange Ranging Capability

Figure 31:
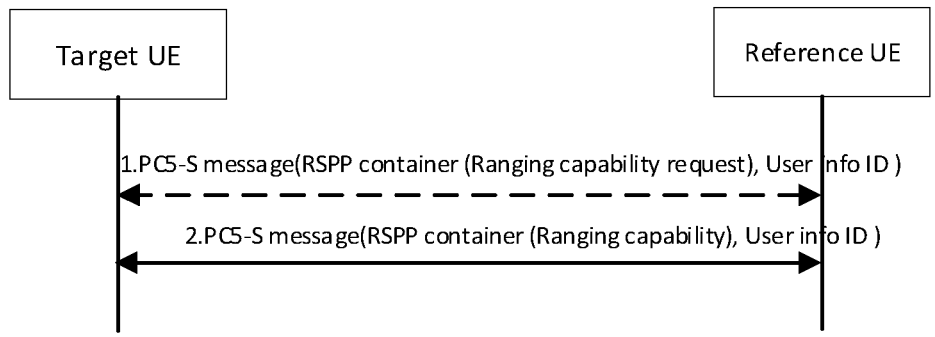
FIG. 31 is a reproduction of Figure 6.4.2.4.1-1 of 3GPP TR 23.700-86 V1.0.0.

[Figure 6.4.2.4.1-1 of 3GPP TR 23.700-86 V1.0.0, entitled "RSPP procedures to exchange Ranging capability", is reproduced as FIG. 31]
1. For the RSPP procedure to exchange Ranging capability, the Target UE or the Reference UE may request the peer UE to provide the Ranging capability. The Ranging capability request is transferred via the PC5-S message.
2. The Target UE or the Reference UE provides its Ranging capability to the peer UE which is transferred via the PC5-S message.

6.4.2.4.2 RSPP Procedures to Exchange Ranging Assistant Data

Figure 32:
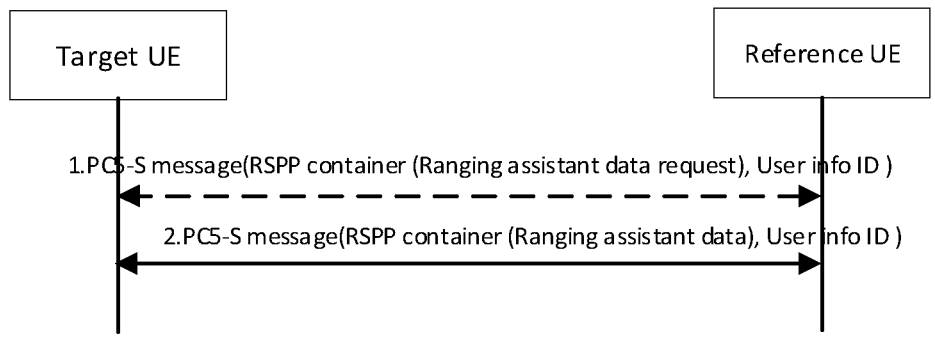
FIG. 32 is a reproduction of Figure 6.4.2.4.2-1 of 3GPP TR 23.700-86 V1.0.0.

[Figure 6.4.2.4.2-1 of 3GPP TR 23.700-86 V1.0.0, entitled "RSPP procedures to exchange Ranging assistant data", is reproduced as FIG. 32]
1. For the RSPP procedure to exchange Ranging assistant data, the Target UE or the Reference UE may request the peer UE to provide the Ranging assistant data. The Ranging assistant data request is transferred via the PC5-S message.
2. The Target UE or the Reference UE provides its Ranging assistant data to the peer UE which is transferred via the PC5-S message.

6.4.2.5 RSPP Procedures to Exchange Ranging/Sidelink Positioning Measurement Results

Figure 33:
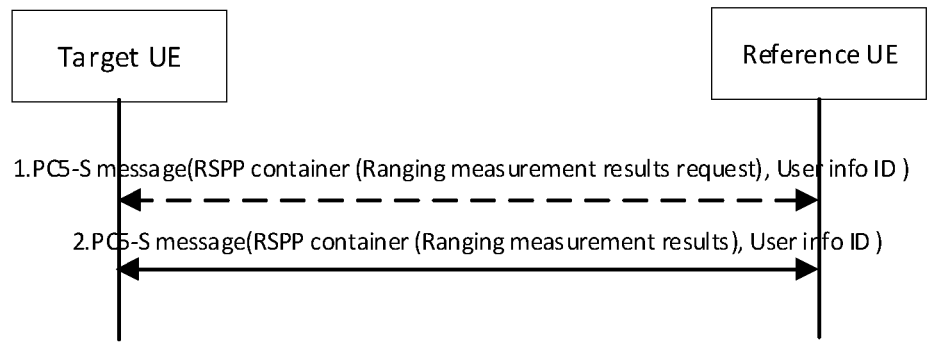
FIG. 33 is a reproduction of Figure 6.4.2.5-1 of 3GPP TR 23.700-86 V1.0.0.

[Figure 6.4.2.5-1 of 3GPP TR 23.700-86 V1.0.0, entitled "RSPP procedures to exchange Ranging/Sidelink Positioning measurement results", is reproduced as FIG. 33]
1. For the RSPP procedure to exchange Ranging/Sidelink Positioning measurement results, the Target UE or the Reference UE may request the peer UE to provide the Ranging/Sidelink Positioning measurement results. The Ranging/Sidelink Positioning measurement result request is transferred via the PC5-S message.
2. The Target UE or the Reference UE provides its Ranging/Sidelink Positioning measurement results to the peer UE which is transferred via the PC5-S message.

6.4.3 Impacts on Existing Nodes and Functionality

Figure 34:
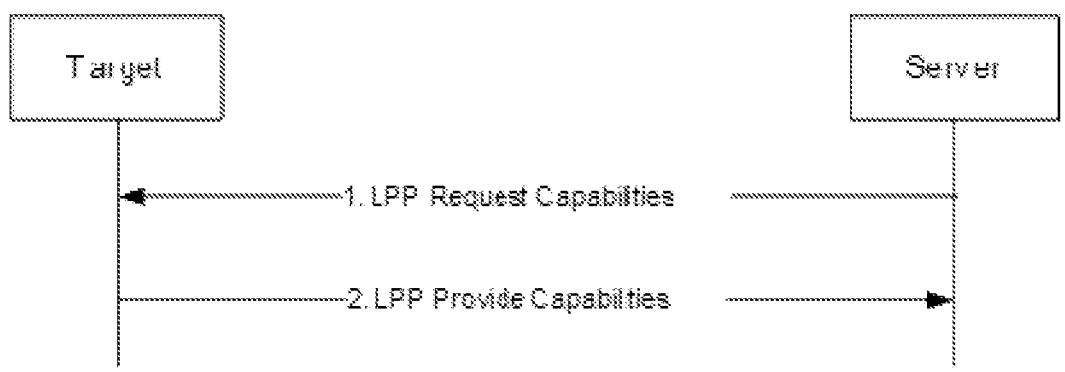
FIG. 34 is a reproduction of Figure 1 of 3GPP email discussion [Post119-e][406][POS].
Figure 35:
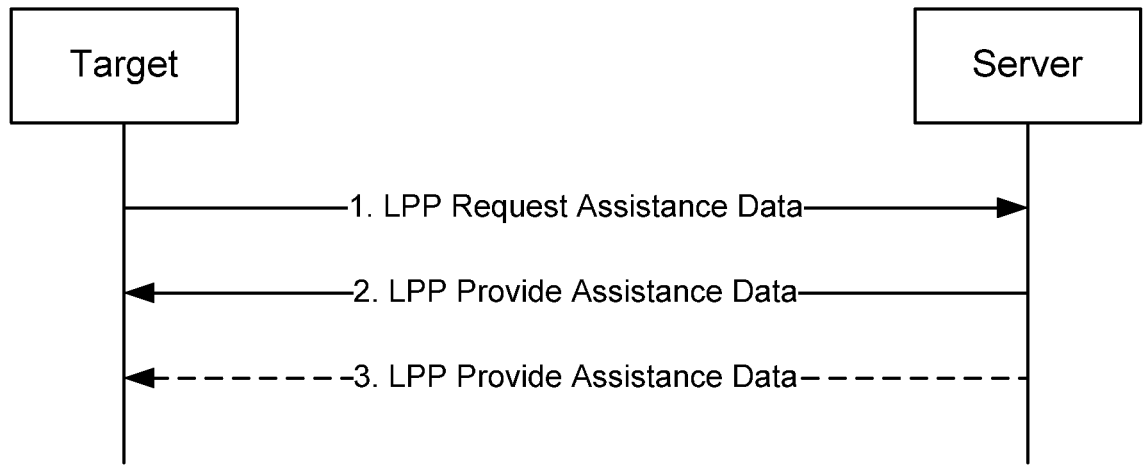
FIG. 35 is a reproduction of Figure 2 of 3GPP email discussion [Post119-e][406][POS].

The solution has impacts on the following entities:
UE(s):
Support the RSPP over PC5 reference point.
Support the PC5-S message carrying RSPP message.
[ . . . ]
3GPP email discussion [Post119-e][406][POS] introduced the following:
Further Details on SLPP/RSPP
While RAN2 did agree to the use of a new protocol for sidelink positioning procedures between UEs over sidelink, details of how the signaling works still need to be discussed. Specifically, it needs to be discussed what underlying functionality shall be supported by SLPP/RSPP for sidelink based positioning. Note that for the purpose of this discussion, we only consider out of coverage scenario (i.e. no CN involvement), since that is the only scenario where usage of SLPP/RSPP is currently agreed to be supported. We also assume one-to-one SL positioning for the time being. Considering the company contributions on this aspect, it seems evident that there is a clear majority that prefer to support at least the following operations:
Procedure 1: Exchange of SL Positioning Capabilities
[Figure 1 of 3GPP email discussion [Post119-e][406][POS], entitled "LPP Capability Transfer procedure", is reproduce as FIG. 34]
Procedure 2: Transfer of Positioning Related Assistance Data
[Figure 2 of 3GPP email discussion [Post119-e][406][POS], entitled "LPP Assistance Data Transfer procedure", is reproduced as FIG. 35]

Figure 36:
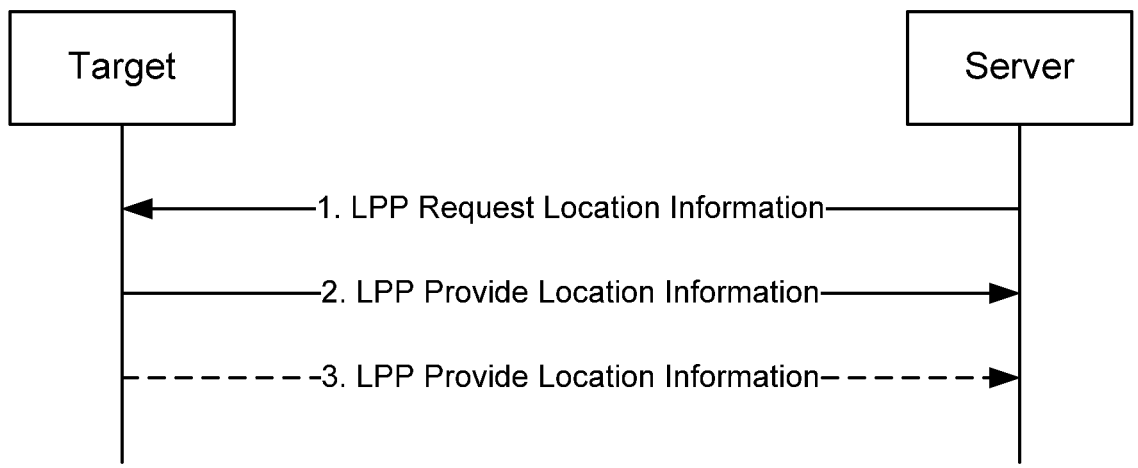
FIG. 36 is a reproduction of Figure 3 of 3GPP email discussion [Post119-e][406][POS].

Procedure 3: Transfer of Location Information (Positioning Measurements and/or Position Estimate)
    [Figure 3 of 3GPP email discussion [Post119-e][406] [POS], entitled "LPP Location Information Transfer procedure", is reproduced as FIG. 36]
[ . . . ]
Summary Almost all companies think that at least procedures 1-5 need to be supported for SLPP/RSPP. One company thinks that since we do not have any agreement on the existence of the UE location server, this should not be discussed yet. There was also some support of procedure 9 (NRPPa like Positioning activation/deactivation procedure), but companies point out that it is also dependent on RAN1 design progress of SL-PRS. Rapporteur thinks that at least procedures 1-5 can be agreed upon.

Proposal 3: In order to enable sidelink positioning, SLPP/RSPP shall support at least the following functionalities:
1. SL Positioning Capability Transfer
2. SL Positioning Assistance Data exchange
3. SL Location Information Transfer
4. Error handling
5. Abort

[ . . . ]
Summary
Based on the comments to the previous question, all supportive companies think that at least procedures 1-5 should be defied following the LPP procedures (and associated signaling) as baseline. So, the following is proposed:

Proposal 4: At least the following procedures shall be defined for SLPP/RSPP using corresponding LPP procedures (and associated signaling) as baseline:
1. SLPP Capability Transfer procedure
2. SLPP Assistance Data Transfer procedure
3. SLPP Location Information Transfer procedure
4. Error handling
5. Abort

[ . . . ]
The discussion above can be summarized in the form of the following proposals:

Proposal 1: For sidelink positioning procedures between UE and LMF for the case of hybrid (Uu+PC5) based positioning in case of in-coverage, RAN2 is proposed to discuss and select between the following options:
1. Extension of LPP, whereby new signaling shall be defined to support hybrid Uu and PC5 based positioning, i.e. extend the existing LPP to support sidelink based positioning between UE and LMF
2. Enhancement of LPP whereby SLPP/RSPP signaling can be transported within LPP transparently, i.e. use the newly defined SLPP/RSPP to support sidelink based positioning and use the existing LPP to support Uu based positioning; and the SLPP/RSPP is carried as a container in LPP Proposal 2: For sidelink positioning procedures between UE and LMF for the case of PC5-only based positioning in case of in-coverage, RAN2 is proposed to discuss and select between the following options:
1. Extension of LPP, whereby new signaling shall be defined to support PC5 based positioning, i.e., extend the existing LPP to support sidelink based positioning between UE and LMF
2. Enhancement of LPP whereby SLPP/RSPP signaling can be transported within LPP transparently, i.e. use the newly defined SLPP/RSPP to support sidelink based positioning and SLPP/RSPP signaling is carried as a container in LPP Proposal 3: In order to enable sidelink positioning, SLPP/RSPP shall support at least the following functionalities:
6. SL Positioning Capability Transfer
7. SL Positioning Assistance Data exchange
8. SL Location Information Transfer
9. Error handling
10. Abort Proposal 4: At least the following procedures shall be defined for SLPP/RSPP using corresponding LPP procedures (and associated signaling) as baseline:
6. SLPP Capability Transfer procedure
7. SLPP Assistance Data Transfer procedure
8. SLPP Location Information Transfer procedure
9. Error handling
10. Abort Proposal 5: Unicast/one-to-one operation is assumed as baseline for exchange of sidelink positioning signaling.

Figure 37:
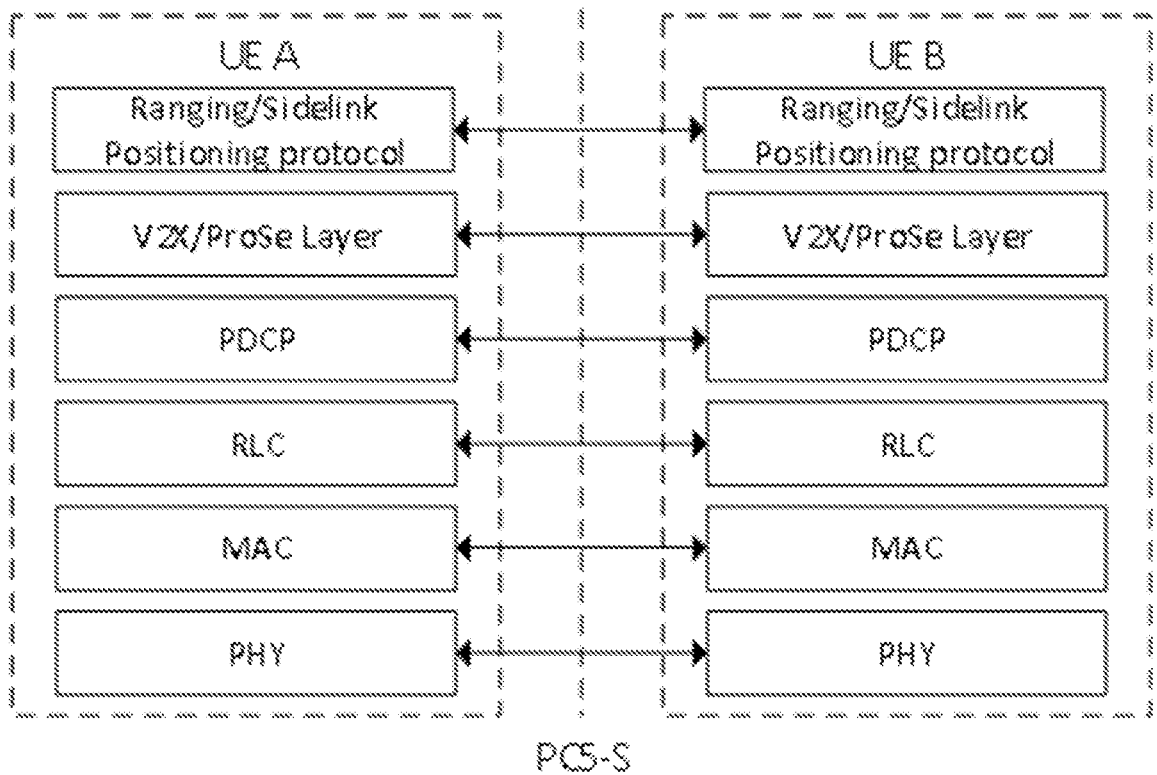
FIG. 37 is a reproduction of Figure 5 of 3GPP R2-2207586.

Proposal 6: RAN2 shall focus on applicability of at least the following positioning signaling for groupcast/broadcast (in addition to unicast). FFS the specific use case and any security aspects:
    SL positioning capability transfer
    SL positioning assistance data
    3GPP R2-2207586 introduced the following:
        [Figure 5 of 3GPP R2-2207586, entitled "Ranging/sidelink Positioning protocol over PC5 reference point", is reproduced as FIG. 37]

In the FIG. 5 that SA2 provides, it is to set RSPP beyond the UE's PC5-S layer and take it as a NAS layer, then the RSPP signaling may be transparent and in a container to the AS layer. We think introducing the RSPP layer is good for the further extension of sidelink positioning function. Thus, RSPP, PC5-S and PC5-RRC can be options to carry the control signaling of sidelink positioning. To be specific, capability transfer is to let UEs save/remember the context of other UEs without asking constantly, so it does not necessary to process in AS layer. Furthermore, the position calculation function may only exist in NAS layer rather than AS layer, so measurement report should be sent to NAS layer for processing. Therefore, capability transfer and measurement report should be conveyed by NAS layer, which are better embedded in RSPP layer as it is dedicated for sidelink positioning.

For assistance data transfer, things may be different. The assistance data contains two major components: assistance data for UE location calculation (e.g. other anchor UE's coordinates) and SL-PRS configuration. The former component can also be transmitted by NAS layer since it will not change so fast with time. For the second component, if SL-PRS configuration comes from gNB for mode 1 UE, or comes from pre-configuration for mode 2 UE, then UE's RRC layer will save and process this SL-PRS configuration. under this case if only RSPP layer can deliver the SL-PRS configuration, UE's RRC/PC5-RRC layer may have to send SL-PRS configuration it acquires to the NAS layer, then to the other UE, which is not a normal design and will cause unnecessary signaling between UE's different layers. Therefore, we think for SL-PRS configuration interaction between UEs, one possible way is to convey SL-PRS by PC5-RRC.

Observation 1: RSPP, PC5-S and PC5-RRC can be options to carry the control signaling of sidelink positioning.

Proposal 5: In sidelink positioning between UEs, support to convey capability interaction, anchor UE location interaction and measurement report by NAS layer, i.e., RSPP message.

Proposal 6: In sidelink positioning between UEs, support to convey SL-PRS configuration by AS layer, i.e., PC5-RRC signaling.

2.4.1.2 Cst Type

In Rel-17, sidelink communication supports broadcast, groupcast and unicast. The NAS and AS layer control signaling are finally conveyed by PSSCH, therefore it is worth to discuss the possible cast type of different signalings from different layers. We think capability transfer can be broadcast, groupcast or unicast to suit different scenarios, for example at the beginning of D2D discovery, target UE's capability may be broadcast or groupcast; for a pair of UEs that already have V2X unicast link, capability transfer via RSPP/PC5 signaling can be unicast. For measurement report, we think at least unicast is necessary because location information is privacy data of a UE. For assistance data exclude SL-PRS configuration, it is possible to use broadcast, groupcast or unicast, because the anchor UE's location can be seen as a common information and is no harm to be known by other neighbor UEs; If the SL-PRS configuration is conveyed in PC5-RRC, that means it at least supports unicast. However, considering the case that out of coverage UE will need to sense neighbor UE's PRS configuration if periodic SL-PRS is supported, the SL-PRS configuration should also support broadcast or groupcast.

[Table 1 of 3GPP R2-2207586, entitled "Suggested cast type of different SL positioning control signaling", is reproduced as FIG. 38]

Proposal 7: In Rel-18 sidelink positioning, support RAN2 to consider the cast type of capability interaction, measurement report and assistance data interaction.

[ . . . ]

According to 3GPP TS 23.304 and TS 24.554, Rel-17 UE in capable of New RAT/Radio (NR) Sidelink (SL) can perform unicast link establishment procedure to establish a unicast link (or called layer-2 link, PC5-S connection, or PC5-RRC connection) with a peer UE. Basically, an initiating UE could send a Direct Communication Request message (i.e. PROSE DIRECT LINK ESTABLISHMENT REQUEST message) for requesting establishment of an unicast link to a target UE with the initiating UE's Layer 2 Identifier (L2ID) as Source L2ID and the target UE's L2ID as Destination L2ID or a default Destination L2ID. The target UE can learn the initiating UE's L2ID by receiving the Direct Communication Request message with the initiating UE's L2ID as Source L2ID. In case the Direct Communication Request message is sent with the default Destination L2ID, the initiating UE can learn the target UE's L2ID by receiving a Security Mode Command message (i.e. PROSE DIRECT LINK SECURITY MODE COMMAND message) with the target UE's L2ID as Source L2ID.

The initiating UE could receive the Security Mode Command message from the target UE for establishing a security context (including e.g. security key(ies), security algorithm) for protecting (e.g. ciphering and/or integrity protection) the unicast link, and then send a Security Mode Complete message (i.e. PROSE DIRECT LINK SECURITY MODE COMPLETE message) to the target UE. Transmission of the Security Mode Complete message is protected based on the security context (i.e. the Security Mode Complete message is ciphered before it is sent). And then, the target UE could send a Direct Communication Accept message (i.e. PROSE DIRECT LINK ESTABLISHMENT ACCEPT message) to the initiating UE for completing the unicast link establishment procedure. Transmission of the Direct Communication Accept message is protected based on the security context (i.e. the Direct Communication Accept message is ciphered before it is sent).

According to 3GPP TR 23.700-86, 5GC architecture would be enhanced to enable Ranging-based services and sidelink positioning for commercial, Vehicle-to-Everything (V2X) and public safety use cases in in-coverage, partial coverage, and out-of-coverage of 5G network, which include ranging device discovery and service operation procedures between two UEs, between one UE and multiple UEs or via the assistance of another UE.

Figure 39:
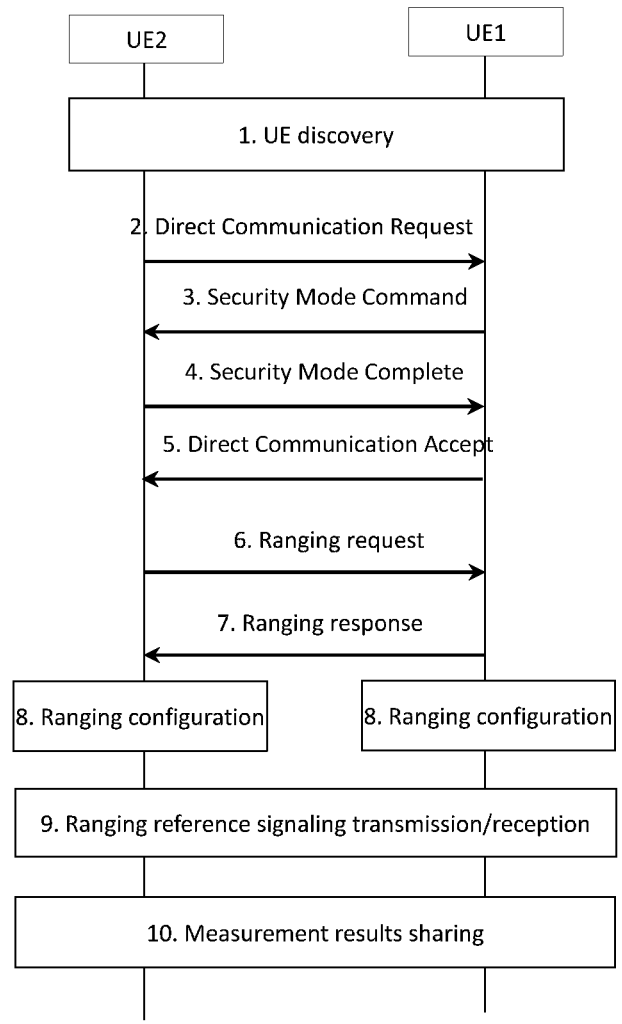
FIG. 39 is a message flow chart according to one exemplary embodiment.

In order to support SL positioning and ranging on top of specifications for Rel-17 NR SL capable UE, flow chart of positioning and ranging operation control could be studied. FIG. 39 could illustrate an example of the flow chart (on top of Figure 6.3.2-1 (reproduced as FIG. 27) in Solution #3 of 3GPP TR 23.700-86) and details on each step could be described below:

1. UE1 and UE2 are capable of SL positioning/ranging. UE1 could be in capable of a SL reference UE and/or a SL target UE, and UE2 could be in capable of a SL target UE and/or a SL reference UE. UE2 could be aware of UE1 in proximity of UE2 via one or more sidelink discovery messages received from UE1. UE1 could be also aware of UE2 in proximity of UE1 via one or more sidelink discovery messages received from UE2.
2. UE2 could initiate a layer-2 link establishment procedure with UE1. UE2 could send a first PC5-S message for request of establishing a layer-2 link with UE1. The first PC5-S message could be a Direct Communication Request message.
3. Upon reception of the first PC5-S message from UE2, UE1 could initiate a security context establishment procedure with UE2. UE1 could send a second PC5-S message for establishing a security context associated with the layer-2 link to UE2. The second PC5-S message could be a Security Mode Command message.
4. In response to reception of the second PC5-S message, UE2 could send a third PC5-S message for completing establishment of the security context to UE1. The third PC5-S message could be a Security Mode Complete message.
5. UE1 could send a fourth PC5-S message for completing establishment of the layer-2 link to UE2. The fourth PC5-S message could be a Direct Communication Accept message.
6. In order to initiate SL positioning/ranging related function, UE2 could send a fifth PC5-S message to UE1. The fifth PC5-S message could be a Ranging Request message. Such Ranging Request message could include information indicating UE2 is to be a role of a SL target UE (or a SL reference UE). Such Ranging Request message could include (requested) SL positioning/ranging related parameter(s) e.g. one time or periodic measurement, ranging for distance and/or direction, positioning reference signalling (PRS) configuration, and/or etc.
7. In response to reception of the fifth PC5-S message, UE1 could send a sixth PC5-S message to UE2. The sixth PC5-S message could be a Ranging Response message. Such Ranging Response message could include information indicating UE1 is to be a role of a SL reference UE (or a SL target UE). Such Ranging Response message could include (accepted) SL positioning/ranging related parameter(s) e.g. one time or periodic measurement, ranging for distance and/or direction, positioning reference signalling (PRS) configuration, and/or etc.

8. Both UE1 and UE2 could apply SL positioning/ranging related configurations based on the (requested/accepted) SL positioning/ranging related parameter(s).

9. It is possible that measurement/location result of UE2 could be calculated by UE2. UE1 could send/broadcast/transmit one or more SL positioning/ranging related reference signalling (e.g. assistance data, PRS signalling, and/or etc.) based on the SL positioning/ranging related configurations. UE2 could receive/monitor the one or more SL positioning/ranging related reference signalling based on the SL positioning/ranging related configurations.

It is also possible that measurement/location result of UE2 could be calculated by UE1. UE2 could send/broadcast/transmit one or more SL positioning/ranging related reference signalling (e.g. assistance data, PRS signalling, and/or etc.) based on the SL positioning/ranging related configurations. UE1 could receive/monitor the one or more SL positioning/ranging related reference signalling based on the SL positioning/ranging related configurations.

Such assistance data (sent from SL reference UE to SL target UE) could be upper layer information used for assisting SL target UE's location calculation. SL target UE's location calculation could rely on SL reference UE's location information. Thus, such assistance data could include SL reference UE's location information. It is also possible that SL target UE's location could be calculated/determined by SL reference UE. Thus, such assistance data could include SL target UE's location information.

Such PRS signalling could be sent on a radio frame for measuring strength and/or quality of radio signal for SL ranging determination.

10. Based on the received/monitored one or more SL positioning/ranging related reference signalling, UE1/UE2 could calculate measurement/location result which could be shared with peer one. Such measurement/location result could include/contain UE2's location information, strength/quality of PRS signalling and/or etc. Such measurement/location result could be sent via PC5-S message, PC5-RRC message and/or etc.

Figure 40:
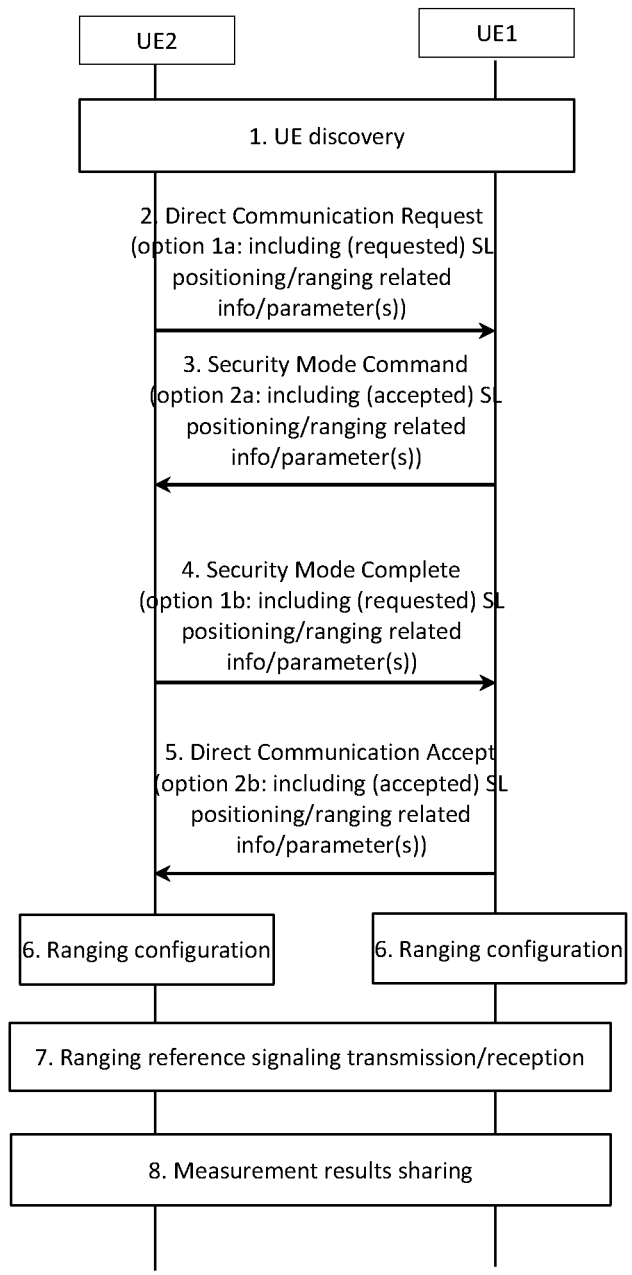
FIG. 40 is a message flow chart according to one exemplary embodiment.

In term of signalling overhead reduction, the content of such Ranging Request message (including e.g. the information indicating UE2 to be a role of a SL target/reference UE and/or the SL positioning/ranging related parameters) could be included in Direct Communication Request message (i.e. the option 1a in step 2 as shown in FIG. 40). If the content of such Ranging Request message should be protected, the content of such Ranging Request message could be alternatively included in Security Mode Complete message (i.e. the option 1b in step 4 as shown in FIG. 40).

Similarly, the content of such Ranging Response message (including e.g. the information indicating UE1 to be a role of a SL reference/target UE and/or the SL positioning/ranging related parameters) could be included in Security Mode Command message (i.e. the option 2a in step 3 as shown in FIG. 40). If the content of such Ranging Response message should be protected, the content of such Ranging response message could be alternatively included in Direct Communication Accept message (i.e. the option 2b in step 5 as shown in FIG. 40).

Regarding above embodiments, steps 6, 7, 8 in FIG. 40 could refer to steps 8, 9, 10 in FIG. 39, respectively.

Figure 41:
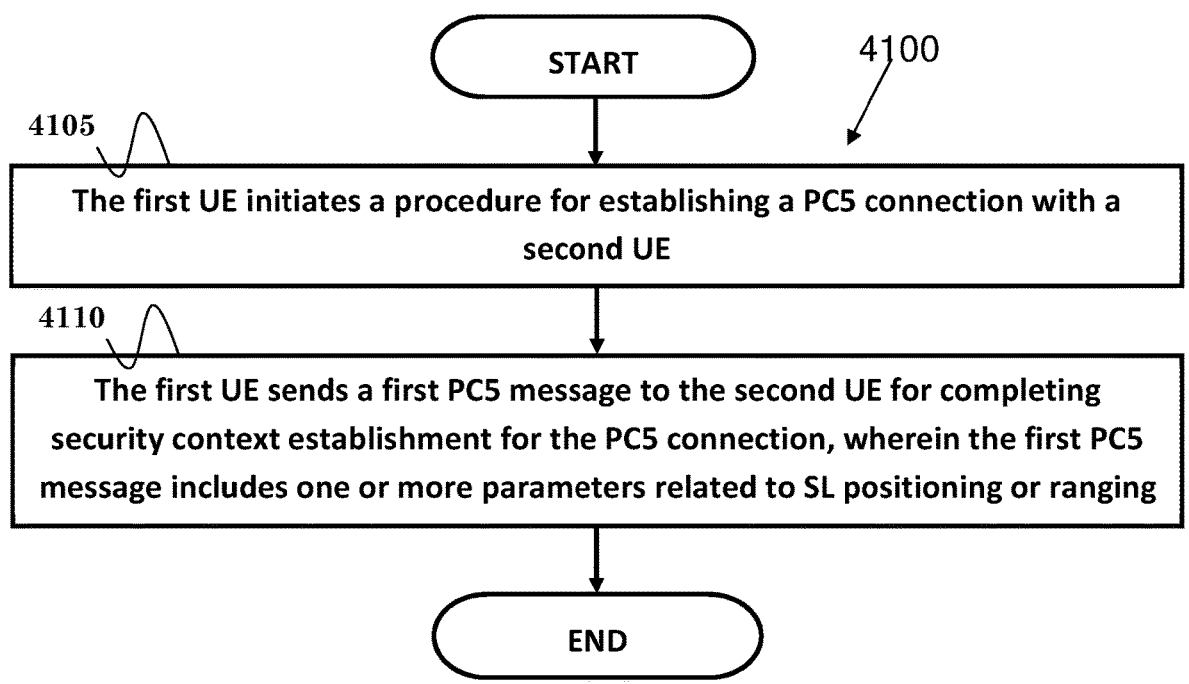
FIG. 41 is a flow chart according to one exemplary embodiment.

FIG. 41 is a flow chart 4100 of a method for a first UE. In step 4105, the first UE initiates a procedure for establishing a PC5 connection with a second UE. In step 4110, the first UE sends a first PC5 message to the second UE for completing security context establishment for the PC5 connection, wherein the first PC5 message includes one or more parameters related to SL positioning or ranging.

In one embodiment, the first UE could send a second PC5 message to the second UE for request of establishing the PC5 connection. The first UE could receive a third PC5 message from the second UE for initiating the security context establishment for the PC5 connection. The first UE could receive a fourth PC5 message from the second UE for completing the PC5 connection establishment.

In one embodiment, the first PC5 message may be a Security Mode Complete message or a ProSe Direct Link Security Mode Complete message. The second PC5 message may be a Direct Communication Request message or a ProSe Direct Link Establishment Request message. The third PC5 message may be a Security Mode Command message or a ProSe Direct Link Security Mode Command message. The fourth PC5 message may be a Direct Communication Accept message or a ProSe Direct Link Establishment Accept message.

In one embodiment, the first UE may be a SL target UE and the second UE is a SL reference/anchor UE. The first UE may be a SL reference/anchor UE and the second UE is a SL target UE.

In one embodiment, the one or more parameters related to SL positioning/ranging could at least include/indicate that the first UE is in a role of SL reference/anchor UE or the first UE expects/desires to use the second UE in a role of SL target UE. The one or more parameters related to SL positioning/ranging could at least include/indicate that the first UE is in a role of SL target UE or the first UE expects/desires to use the second UE in a role of SL reference/anchor UE. The one or more parameters related to SL positioning/ranging could at least include/indicate one time or periodic measurement, and/or ranging for distance/direction.

In one embodiment, the PC5 connection may be a PC5-S connection, a PC5-RRC connection, a layer-2 link or a unicast link.

Referring back to FIGS. 3 and 4, in one exemplary embodiment of a method for a first UE, the first UE 300 includes a program code 312 stored in the memory 310. The CPU 308 could execute program code 312 to enable the first UE (i) to initiate a procedure for establishing a PC5 connection with a second UE, and (ii) to send a first PC5 message to the second UE for completing security context establishment for the PC5 connection, wherein the first PC5 message includes one or more parameters related to SL positioning or ranging. Furthermore, the CPU 308 can execute the program code 312 to perform all of the above-described actions and steps or others described herein.

Figure 42:
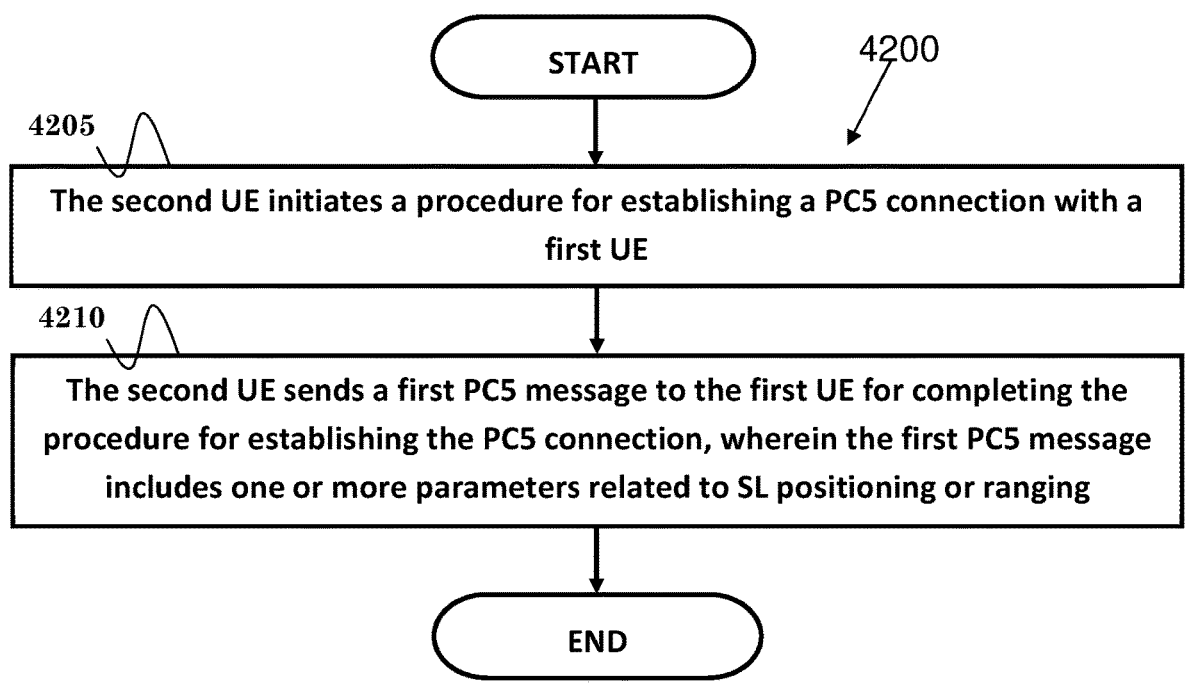
FIG. 42 is a flow chart according to one exemplary embodiment.

FIG. 42 is a flow chart 4200 of a method for a second UE. In step 4205, the second UE initiates a procedure for establishing a PC5 connection with a first UE. In step 4210, the second UE sends a first PC5 message to the first UE for completing the procedure for establishing the PC5 connection, wherein the first PC5 message includes one or more parameters related to SL positioning or ranging.

In one embodiment, the second UE could receive a second PC5 message from the first UE for request of establishing the PC5 connection. The second UE could transmit a third PC5 message to the first UE for initiating security context establishment for the PC5 connection. The second UE could receive a fourth PC5 message from the first UE for completing the security context establishment.

In one embodiment, the first PC5 message may be a Direct Communication Accept message or a ProSe Direct Link Establishment Accept message. The second PC5 message may be a Direct Communication Request message or a ProSe Direct Link Establishment Request message. The third PC5 message may be a Security Mode Command message or a ProSe Direct Link Security Mode Command message. The fourth PC5 message may be a Security Mode Complete message or a ProSe Direct Link Security Mode Complete message.

In one embodiment, the first UE may be a SL target UE and the second UE is a SL reference/anchor UE. The first UE may be a SL reference/anchor UE and the second UE is a SL target UE.

In one embodiment, the one or more parameters related to SL positioning/ranging could at least include/indicate that the second UE is in a role of SL target UE or the second UE agrees to become a role of SL target UE for the first UE. The one or more parameters related to SL positioning/ranging could at least include/indicate that the second UE is in a role of SL reference/anchor UE or the second UE agrees to become a role of SL reference/anchor UE for the first UE. The one or more parameters related to SL positioning/ranging could at least include/indicate one time or periodic measurement, and/or ranging for distance/direction.

In one embodiment, the PC5 connection may be a PC5-S connection, a PC5-RRC connection, a layer-2 link or a unicast link.

Referring back to FIGS. 3 and 4, in one exemplary embodiment of a method for a second UE, the second UE 300 includes a program code 312 stored in the memory 310. The CPU 308 could execute program code 312 to enable the second UE (i) to initiate a procedure for establishing a PC5 connection with a first UE, and (ii) to send a first PC5 message to the first UE for completing the procedure for establishing the PC5 connection, wherein the first PC5 message includes one or more parameters related to SL positioning or ranging. Furthermore, the CPU 308 can execute the program code 312 to perform all of the above-described actions and steps or others described herein.

Possibly, layer-2 link (direct link) establishment procedure introduced in 3GPP TS 23.304 and TS 24.554 could be reused for establishing a layer-2 link between SL target UE and SL reference UE for supporting SL positioning/ranging. According to 3GPP TS 24.554, a target UE in the direct link establishment procedure shall include PQFI(s), the corresponding PC5 QoS parameters and optionally the ProSe identifier(s) in the ProSe Direct Link Establishment Accept message, if the target UE is not acting as a 5G ProSe layer-2 UE-to-network relay UE. Similarly, a target UE in the direct link security mode control procedure shall include the PQFI and the corresponding PC5 QoS parameters in the ProSe Direct Link Security Mode Complete message, if the direct communication is not for 5G ProSe direct communication between the 5G ProSe layer-2 remote UE and the 5G ProSe layer-2 UE-to-network relay UE.

In other words, if a layer-2 link establishment procedure is initiated for establishing a layer-2 link for SL positioning/ranging, the ProSe Direct Link Security Mode Complete message within this layer-2 link establishment procedure shall include (requested) QoS information (i.e. the (requested) QoS information shall be present in the ProSe Direct Link Security Mode Complete message), and the ProSe Direct Link Establishment Accept message within this layer-2 link establishment procedure shall include (accepted) QoS information (i.e. the (accepted) QoS information shall be present in the ProSe Direct Link Establishment Accept message). Said QoS information could contain e.g. PQFI, PC5 QoS parameters, PC5 QoS profile, etc. Said PC5 QoS parameters could be derived based on PC5 QoS mapping rules and said PQFI could be assigned after receiving sidelink service data or request from the upper layers.

According to 3GPP email discussion [Post119-e][406] [POS] and R2-2207586, each Sidelink Position Protocol (SLPP) or Ranging and Sidelink Positioning Protocol (RSPP) message could be used to carry e.g. assistance data, location information, measurement result, and/or etc. Similar with LPP message being included in RRC container (as discussed in 3GPP TS 38.305), SLPP/RSPP message following LPP concept could be included in PC5-RRC container. Since SLPP/RSPP message is not traffic of a sidelink service, UE has no such PC5 Quality of Service (QoS) mapping rules for deriving PC5 QoS parameters for SLPP/RSPP message transfer. In this situation, UE has no such QoS information to be included in the ProSe Direct Link Security Mode Complete message and the ProSe Direct Link Establishment Accept message within the layer-2 link establishment procedure for SL positioning/ranging.

In order to perform a layer-2 link establishment followed by SLPP/RSPP message transfer, it would be required to specify default/specific QoS information for SL positioning/ranging. By this way, within the layer-2 link establishment procedure for SL positioning/ranging, (SL target/reference) UE (e.g. UE2 in FIG. 39) is able to set the ProSe Direct Link Security Mode Complete message with default/specific QoS information for SL positioning/ranging. Similarly, (SL target/reference) UE (e.g. UE1 in FIG. 39) is able to set the ProSe Direct Link Establishment Accept message with default/specific QoS information for SL positioning/ranging.

Figure 43:
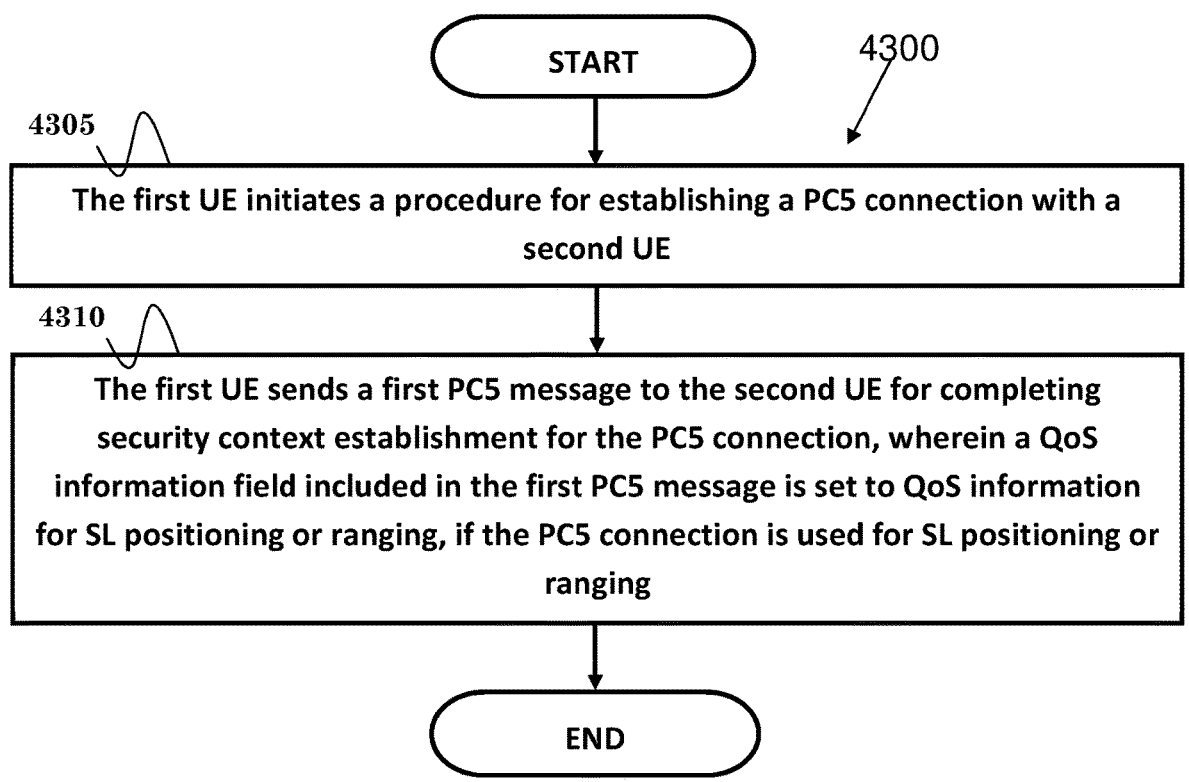
FIG. 43 is a flow chart according to one exemplary embodiment.

FIG. 43 is a flow chart 4300 of a method for a first UE. In step 4305, the first UE initiates a procedure for establishing a PC5 connection with a second UE. In step 4310, the first UE sends a first PC5 message to the second UE for completing security context establishment for the PC5 connection, wherein a QoS information field included in the first PC5 message is set to QoS information for SL positioning or ranging, if the PC5 connection is used for SL positioning or ranging.

In one embodiment, the first UE could send a second PC5 message to the second UE for request of establishing the PC5 connection. The first UE could receive a third PC5 message from the second UE for initiating the security context establishment for the PC5 connection. The first UE could receive a fourth PC5 message from the second UE for completing the PC5 connection establishment.

In one embodiment, the first PC5 message may be a Security Mode Complete message or a ProSe Direct Link Security Mode Complete message. The second PC5 message may be a Direct Communication Request message or a ProSe Direct Link Establishment Request message.

In one embodiment, the third PC5 message may be a Security Mode Command message or a ProSe Direct Link Security Mode Command message. The fourth PC5 message may be a Direct Communication Accept message or a ProSe Direct Link Establishment Accept message.

In one embodiment, the first UE may be a SL target UE and the second UE is a SL reference/anchor UE. The first UE may be a SL reference/anchor UE and the second UE is a SL target UE. The QoS information for SL positioning or ranging may be a default QoS information for SL positioning or ranging specified or pre-configured in the first UE, or is provisioned by a network to the first UE.

In one embodiment, the network could include a AMF, a PCF and/or a base station. The PC5 connection may be a PC5-S connection, a PC5-RRC connection, a layer-2 link or a unicast link.

Referring back to FIGS. 3 and 4, in one exemplary embodiment of a method for a first UE, the first UE 300 includes a program code 312 stored in the memory 310. The CPU 308 could execute program code 312 to enable the first UE (i) to initiate a procedure for establishing a PC5 connection with a second UE, and (ii) to send a first PC5 message to the second UE for completing security context establishment for the PC5 connection, wherein a QoS information field included in the first PC5 message is set to QoS information for SL positioning or ranging, if the PC5 connection is used for SL positioning or ranging. Furthermore, the CPU 308 can execute the program code 312 to perform all of the above-described actions and steps or others described herein.

Figure 44:
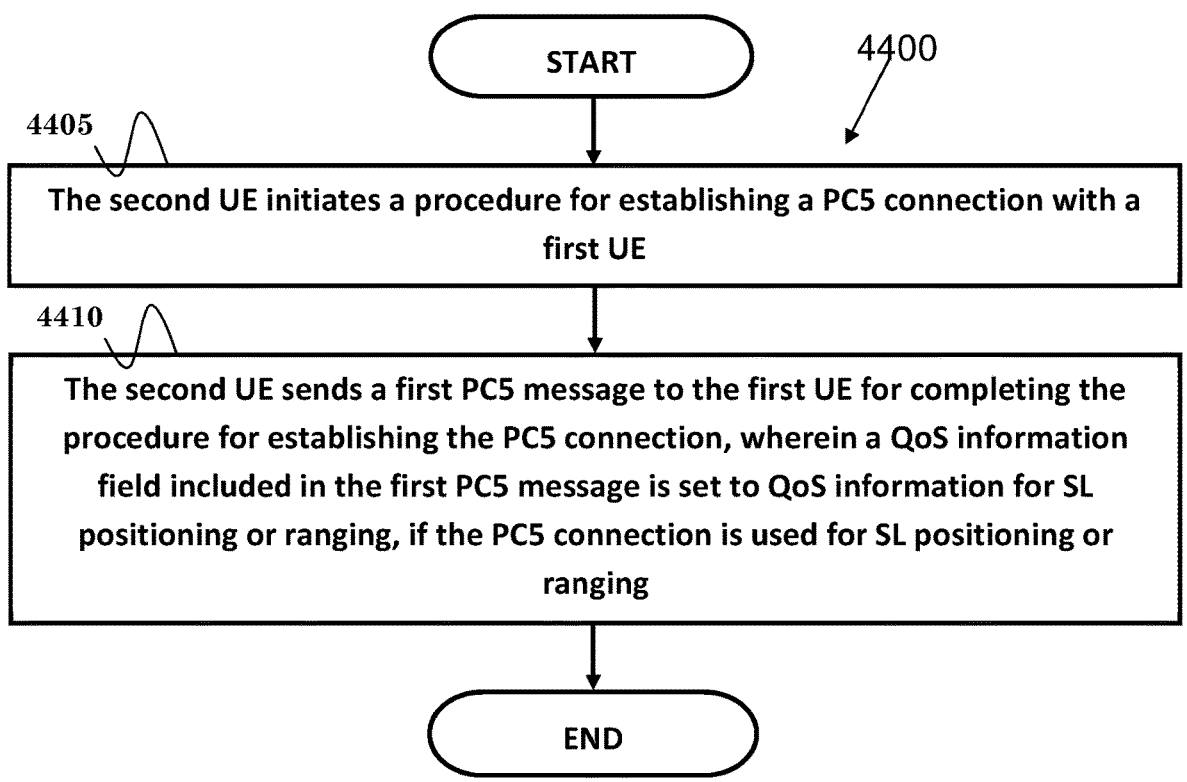
FIG. 44 is a flow chart according to one exemplary embodiment.

FIG. 44 is a flow chart 4400 of a method for a second UE. In step 4405, the second UE initiates a procedure for establishing a PC5 connection with a first UE. In step 4410, the second UE sends a first PC5 message to the first UE for completing the procedure for establishing the PC5 connection, wherein a QoS information field included in the first PC5 message is set to QoS information for SL positioning or ranging, if the PC5 connection is used for SL positioning or ranging.

In one embodiment, the second UE could receive a second PC5 message from the first UE for request of establishing the PC5 connection. The second UE could transmit a third PC5 message to the first UE for initiating security context establishment for the PC5 connection. The second UE could receive a fourth PC5 message from the first UE for completing the security context establishment.

In one embodiment, the first PC5 message may be a Direct Communication Accept message or a ProSe Direct Link Establishment Accept message. The second PC5 message may be a Direct Communication Request message or a ProSe Direct Link Establishment Request message. The third PC5 message may be a Security Mode Command message or a ProSe Direct Link Security Mode Command message. The fourth PC5 message may be a Security Mode Complete message or a ProSe Direct Link Security Mode Complete message.

In one embodiment, the first UE may be a SL target UE and the second UE is a SL reference/anchor UE. The first UE may be a SL reference/anchor UE, and the second UE may be a SL target UE. The QoS information for SL positioning or ranging may be a default QoS information for SL positioning or ranging specified or pre-configured in the first UE, or may be provisioned by a network to the first UE.

In one embodiment, the network includes a AMF, a PCF and/or a base station. The PC5 connection may be a PC5-S connection, a PC5-RRC connection, a layer-2 link or a unicast link.

Referring back to FIGS. 3 and 4, in one exemplary embodiment of a method for a second UE, the second UE 300 includes a program code 312 stored in the memory 310. The CPU 308 could execute program code 312 to enable the second UE (i) to initiate a procedure for establishing a PC5 connection with a first UE, and (ii) to send a first PC5 message to the first UE for completing the procedure for establishing the PC5 connection, wherein a QoS information field included in the first PC5 message is set to QoS information for SL positioning or ranging, if the PC5 connection is used for SL positioning or ranging. Furthermore, the CPU 308 can execute the program code 312 to perform all of the above-described actions and steps or others described herein.

Alternatively, instead of specifying default/specific QoS information for SL positioning/ranging, (SL target/reference) UE (e.g. UE2 in FIG. 39) could not (need to) include any QoS information in the ProSe Direct Link Security Mode Complete message (i.e. QoS information is absent in the ProSe Direct Link Security Mode Complete message), if/when the layer-2 link establishment procedure is initiated for SL positioning/ranging. Similarly, (SL target/reference) UE (e.g. UE1 in FIG. 2) could not (need to) include any QoS information in the ProSe Direct Link Establishment Accept message (i.e. QoS information is absent in the ProSe Direct Link Establishment Accept message), if/when the layer-2 link establishment procedure is initiated for SL positioning/ranging. In this alternative, signalling overhead could be reduced.

Figure 45:
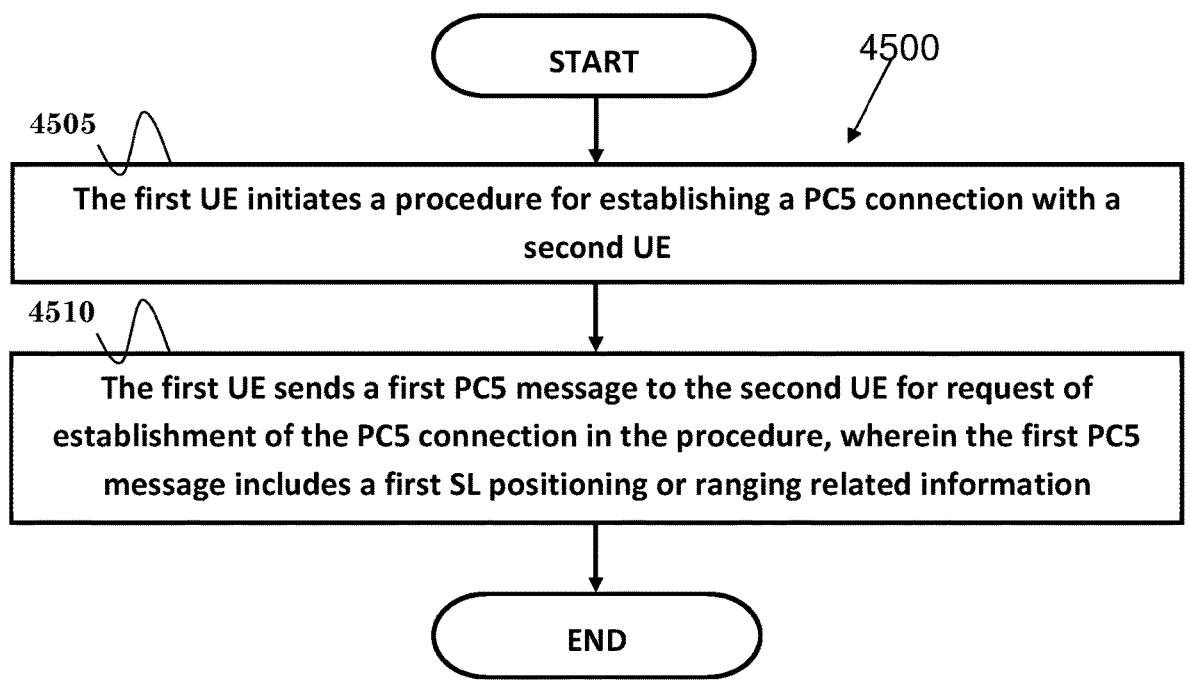
FIG. 45 is a flow chart according to one exemplary embodiment.

FIG. 45 is a flow chart 4500 of a method for a first UE. In step 4505, the first UE initiates a procedure for establishing a PC5 connection with a second UE. In step 4510, the first UE sends a first PC5 message to the second UE for request of establishment of the PC5 connection in the procedure, wherein the first PC5 message includes a first SL positioning or ranging related information.

In one embodiment, the first UE could receive a second PC5 message from the second UE for completing the PC5 connection establishment, wherein the second PC5 message includes a second SL positioning or ranging related information. The second SL positioning or ranging related information could at least indicate that the second UE is in a role of SL reference or anchor UE or the second UE agrees to become a role of SL reference or anchor UE for the first UE. The first PC5 message may be a Direct Communication Request message or a ProSe Direct Link Establishment Request message, and the second PC5 message may be a Direct Communication Accept message or a ProSe Direct Link Establishment Accept message.

In one embodiment, the first SL positioning or ranging related information could at least indicate that the first UE is in a role of SL target UE or the first UE expects to use the second UE in a role of SL reference or anchor UE.

Referring back to FIGS. 3 and 4, in one exemplary embodiment of a method for a first UE, the first UE 300 includes a program code 312 stored in the memory 310. The CPU 308 could execute program code 312 to enable the first UE (i) to initiate a procedure for establishing a PC5 connection with a second UE, and (ii) to send a first PC5 message to the second UE for request of establishment of the PC5 connection in the procedure, wherein the first PC5 message includes a first SL positioning or ranging related information. Furthermore, the CPU 308 can execute the program code 312 to perform all of the above-described actions and steps or others described herein.

Figure 46:
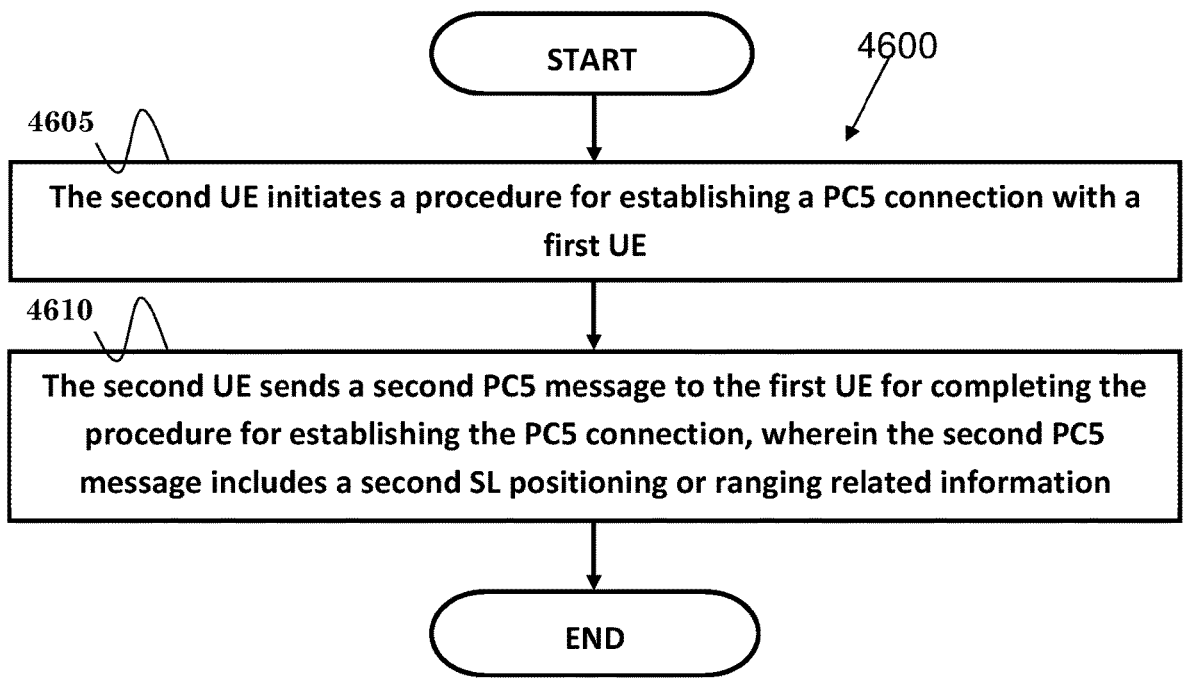
FIG. 46 is a flow chart according to one exemplary embodiment.

FIG. 46 is a flow chart 4600 of a method for a second UE. In step 4605, the second UE initiates a procedure for establishing a PC5 connection with a first UE. In step 4610, the second UE sends a second PC5 message to the first UE for completing the procedure for establishing the PC5 connection, wherein the second PC5 message includes a second SL positioning or ranging related information.

In one embodiment, the second UE could receive a first PC5 message from the first UE for request of establishment of the PC5 connection in the procedure, wherein the first PC5 message includes a first SL positioning or ranging related information. The second SL positioning or ranging related information could at least indicate that the second UE is in a role of SL reference or anchor UE or the second UE agrees to become a role of SL reference or anchor UE for the first UE. The first PC5 message may be a Direct Communication Request message or a ProSe Direct Link Establishment Request message, and the second PC5 message may be a Direct Communication Accept message or a ProSe Direct Link Establishment Accept message.

In one embodiment, the first SL positioning or ranging related information could at least indicate that the first UE is in a role of SL target UE or the first UE expects to use the second UE in a role of SL reference or anchor UE.

Referring back to FIGS. 3 and 4, in one exemplary embodiment of a method for a second UE, the first UE 300 includes a program code 312 stored in the memory 310. The CPU 308 could execute program code 312 to enable the second UE (i) to initiate a procedure for establishing a PC5 connection with a first UE, and (ii) to send a second PC5 message to the first UE for completing the procedure for establishing the PC5 connection, wherein the second PC5 message includes a second SL positioning or ranging related information. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the inven-

The invention claimed is:

1. A method for a first User Equipment (UE), comprising:
   initiating a procedure for establishing a PC5 connection with a second UE;
   sending a first PC5 message to the second UE for request of establishment of the PC5 connection in the procedure, wherein the first PC5 message includes a first Sidelink (SL) positioning or ranging related parameter indicating the first UE supporting a role of SL target UE; and
   performing an SL Positioning Protocol and Ranging or Sidelink Positioning Protocol (SLPP/RSPP) message transfer with the second UE using the established PC5 connection, wherein the SLPP/RSPP message transfer is used for sidelink positioning operation.

2. The method of claim 1, further comprising:
   the first UE receives a second PC5 message from the second UE for completing the PC5 connection establishment, wherein the second PC5 message includes a second SL positioning or ranging related parameter.

3. The method of claim 2, wherein the second SL positioning or ranging related parameter at least indicates that the second UE supports a role of SL reference or anchor UE or the second UE agrees to become a role of SL reference or anchor UE for the first UE.

4. The method of claim 2, wherein the first PC5 message is a Direct Communication Request message or a ProSe Direct Link Establishment Request message, and the second PC5 message is a Direct Communication Accept message or a ProSe Direct Link Establishment Accept message.

5. The method of claim 1, wherein the SLPP/RSPP message transfer contains at least one of capability transfer, assistance data transfer, and location information transfer for sidelink positioning.

6. A first User Equipment (UE), comprising:
   a processor; and
   a memory operatively coupled to the processor, wherein the processor is configured to execute a program code stored in the memory to:
   initiate a procedure for establishing a PC5 connection with a second UE;
   send a first PC5 message to the second UE for request of establishment of the PC5 connection in the procedure, wherein the first PC5 message includes a first Sidelink (SL) positioning or ranging related parameter indicating the first UE supporting a role of SL target UE; and
   perform an SL Positioning Protocol and Ranging or Sidelink Positioning Protocol (SLPP/RSPP) message transfer with the second UE using the established PC5 connection, wherein the SLPP/RSPP message transfer is used for sidelink positioning operation.

7. The first UE of claim 6, wherein the processor is further configured to execute a program code stored in the memory to:
   receive a second PC5 message from the second UE for completing the PC5 connection establishment, wherein the second PC5 message includes a second SL positioning or ranging related parameter.

8. The first UE of claim 7, wherein the second SL positioning or ranging related parameter at least indicates that the second UE supports a role of SL reference or anchor UE or the second UE agrees to become a role of SL reference or anchor UE for the first UE.

9. The first UE of claim 7, wherein the first PC5 message is a Direct Communication Request message or a ProSe Direct Link Establishment Request message, and the second PC5 message is a Direct Communication Accept message or a ProSe Direct Link Establishment Accept message.

10. The first UE of claim 6, wherein the SLPP/RSPP message transfer contains at least one of capability transfer, assistance data transfer, and location information transfer for sidelink positioning.

11. A method for a second User Equipment (UE), comprising:
    receiving a first PC5 message to perform a procedure for establishing a PC5 connection with a first UE from the first UE, wherein the first PC5 message includes a first Sidelink (SL) positioning or ranging related parameter indicating the first UE supporting a role of SL target UE;
    sending a second PC5 message to the first UE for completing the procedure for establishing the PC5 connection, wherein the second PC5 message includes a second SL positioning or ranging related parameter indicating the second UE supporting a role of SL reference or anchor UE; and
    performing an SL Positioning Protocol or Ranging or Sidelink Positioning Protocol (SLPP/RSPP) message transfer with the first UE using the established PC5 connection, wherein the SLPP/RSPP message transfer is used for sidelink positioning operation.

12. The method of claim 11, wherein the first PC5 message is a Direct Communication Request message or a ProSe Direct Link Establishment Request message, and the second PC5 message is a Direct Communication Accept message or a ProSe Direct Link Establishment Accept message.

13. The method of claim 11, wherein the first SL positioning or ranging related parameter at least indicates that the first UE supports a role of SL target UE or the first UE expects to use the second UE as a role of SL reference or anchor UE.

14. The method of claim 11, wherein the SLPP/RSPP message transfer contains at least one of capability transfer, assistance data transfer, and location information transfer for sidelink positioning.

15. A second User Equipment (UE), comprising:
    a processor; and
    a memory operatively coupled to the processor, wherein the processor is configured to execute a program code stored in the memory to:
    receive a first PC5 message to perform a procedure for establishing a PC5 connection with a first UE from the first UE, wherein the first PC5 message includes a first Sidelink (SL) positioning or ranging related parameter indicating the first UE supporting a role of SL target UE;
    send a second PC5 message to the first UE for completing the procedure for establishing the PC5 connection, wherein the second PC5 message includes a second SL positioning or ranging related parameter indicating the second UE suporting a role of SL reference or anchor UE; and
    perform an SL Positioning Protocol and Ranging or Sidelink Positioning Protocol (SLPP/RSPP) message transfer with the first UE using the established PC5 connection, wherein the SLPP/RSPP message transfer is used for sidelink positioning operation.

16. The second UE of claim 15, wherein the first PC5 message is a Direct Communication Request message or a ProSe Direct Link Establishment Request message, and the second PC5 message is a Direct Communication Accept message or a ProSe Direct Link Establishment Accept message.

17. The second UE of claim 15, wherein the first SL positioning or ranging related parameter at least indicates that the first UE supports a role of SL target UE or the first UE expects to use the second UE as a role of SL reference or anchor UE.

18. The second UE of claim 15, wherein the SLPP/RSPP message transfer contains at least one of capability transfer, assistance data transfer, and location information transfer for sidelink positioning.

* * * * *